(12) United States Patent
Napau et al.

(10) Patent No.: US 11,529,892 B2
(45) Date of Patent: Dec. 20, 2022

(54) GEARBOX FOR VEHICLE SEAT ADJUSTMENT MECHANISM

(71) Applicant: FISHER & COMPANY, INCORPORATED, St. Clair Shores, MI (US)

(72) Inventors: Mircea Napau, Sterling Heights, MI (US); Doina Napau, Sterling Heights, MI (US); Ileana Dacia Napau, Cugir (RO); Ioan Napau, Rochester Hills, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 0 days.

(21) Appl. No.: 17/553,445

(22) Filed: Dec. 16, 2021

(65) Prior Publication Data

US 2022/0105833 A1 Apr. 7, 2022

Related U.S. Application Data

(63) Continuation-in-part of application No. 17/236,639, filed on Apr. 21, 2021.

(Continued)

(51) Int. Cl.
*B60N 2/06* (2006.01)
*B60N 2/02* (2006.01)
*B60N 2/90* (2018.01)

(52) U.S. Cl.
CPC ........... *B60N 2/067* (2013.01); *B60N 2/0232* (2013.01); *B60N 2/933* (2018.02); *B60N 2002/0236* (2013.01)

(58) Field of Classification Search
CPC ..... F16H 2057/02082; F16H 2025/209; F16H 2025/2031; F16H 57/039; F16H 25/20; B60N 2/92; B60N 2/067
See application file for complete search history.

(56) References Cited

U.S. PATENT DOCUMENTS

| 546,249 A | 9/1895 | Regan |
| 657,542 A | 9/1900 | Ingersoll |

(Continued)

FOREIGN PATENT DOCUMENTS

| CN | 87101620 A | 9/1988 |
| CN | 1109566 A | 10/1995 |

(Continued)

OTHER PUBLICATIONS

Office Action regarding Chinese Patent Application No. 202010104705.3 dated Feb. 7, 2022.

(Continued)

*Primary Examiner* — David M Fenstermacher
(74) *Attorney, Agent, or Firm* — Harness, Dickey & Pierce, P.L.C.

(57) ABSTRACT

A vehicle seat adjustment mechanism may include a gearbox, a first gear, a second gear, and a spindle screw. The first gear is received in the gearbox and is rotatable relative to the gearbox about a first axis. The second gear is received in the gearbox and is rotatable relative to the gearbox about a second axis that is perpendicular to the first axis. The first and second gears are meshingly engaged with each other. The spindle screw is meshingly engaged with the second gear and extends through the second gear along the second axis. The spindle screw may have trapezoidal threads.

20 Claims, 46 Drawing Sheets

Related U.S. Application Data

(60) Provisional application No. 63/019,054, filed on May 1, 2020.

(56) References Cited

U.S. PATENT DOCUMENTS

| | | |
|---|---|---|
| 978,371 A | 12/1910 | Harrison |
| 1,192,627 A | 7/1916 | Hatlee |
| 1,694,031 A | 12/1928 | Braren |
| 1,770,035 A | 7/1930 | Heap et al. |
| 2,168,164 A | 8/1939 | Kittredge |
| 2,170,951 A | 8/1939 | Perry |
| 2,250,259 A | 7/1941 | Foote, Jr. |
| 2,475,504 A | 7/1949 | Jackson |
| 2,508,121 A | 5/1950 | McIver |
| 2,609,713 A | 9/1952 | Martin |
| 2,972,910 A | 2/1961 | Menge, Sr. |
| 2,995,226 A | 8/1961 | Gilder |
| 3,013,447 A | 12/1961 | Hils et al. |
| 3,037,400 A | 6/1962 | Sundt |
| 3,144,791 A | 8/1964 | Menge, Sr. |
| 3,319,482 A | 5/1967 | Campbell et al. |
| 3,427,901 A | 2/1969 | Wildhaber |
| 3,451,290 A | 6/1969 | Wildhaber |
| 3,965,773 A | 6/1976 | Bert et al. |
| 4,023,441 A | 5/1977 | Osterwalder |
| 4,228,698 A | 10/1980 | Winiasz |
| 4,269,075 A | 5/1981 | Crist et al. |
| 4,452,102 A | 6/1984 | Shaffer |
| 4,720,073 A | 1/1988 | Mann et al. |
| 4,721,337 A | 1/1988 | Tomita |
| 4,802,374 A * | 2/1989 | Hamelin ............... B60N 2/067 74/89.32 |
| 4,805,866 A | 2/1989 | Aihara et al. |
| 4,884,844 A | 12/1989 | Kershaw et al. |
| 4,930,367 A | 6/1990 | Nagasawa |
| 4,967,615 A | 11/1990 | Mills |
| 5,030,184 A | 7/1991 | Rennerfelt |
| 5,094,420 A | 3/1992 | Aihara et al. |
| 5,099,717 A | 3/1992 | Ochiai et al. |
| 5,222,402 A | 6/1993 | White et al. |
| 5,259,257 A | 11/1993 | Mouri |
| 5,314,158 A | 5/1994 | Mouri |
| 5,349,878 A | 9/1994 | White et al. |
| 5,425,683 A | 6/1995 | Bang |
| 5,505,668 A | 4/1996 | Koriakov-Savoysky et al. |
| 5,598,746 A | 2/1997 | Chen |
| 5,701,783 A | 12/1997 | Lin |
| 5,816,555 A | 10/1998 | Ito et al. |
| 5,865,506 A | 2/1999 | Sakamoto |
| 5,868,470 A * | 2/1999 | Hyder ................... B60N 2/233 297/362.14 |
| 6,032,550 A | 3/2000 | Rugh |
| 6,138,974 A | 10/2000 | Okada et al. |
| D437,334 S | 2/2001 | Song |
| 6,220,642 B1 | 4/2001 | Ito et al. |
| 6,260,672 B1 | 7/2001 | Frohnhaus et al. |
| 6,260,922 B1 | 7/2001 | Frohnhaus et al. |
| 6,261,199 B1 | 7/2001 | Schlangen |
| 6,322,146 B1 | 11/2001 | Fisher, Jr. |
| 6,548,332 B2 | 4/2003 | Peng et al. |
| 6,742,409 B2 | 6/2004 | Blanchard |
| 6,915,998 B2 | 7/2005 | Borbe et al. |
| 7,041,024 B2 | 5/2006 | Becker et al. |
| 7,048,244 B2 | 5/2006 | Hauck |
| 7,051,986 B1 | 5/2006 | Taubmann et al. |
| 7,143,513 B2 | 12/2006 | Taubmann et al. |
| 7,198,243 B2 * | 4/2007 | Hofschulte .......... B60N 2/0232 248/429 |
| 7,313,982 B2 | 1/2008 | Wisner et al. |
| 7,322,257 B2 | 1/2008 | Becker et al. |
| 7,340,974 B2 | 3/2008 | Landskron et al. |
| 7,437,962 B2 | 10/2008 | Taubmann et al. |
| 7,571,666 B2 | 8/2009 | Borbe et al. |
| 7,703,347 B2 | 4/2010 | Porinsky et al. |
| 7,887,020 B2 | 2/2011 | Ferguson et al. |
| 8,061,228 B2 | 11/2011 | Becker et al. |
| 8,087,974 B2 | 1/2012 | Maeda et al. |
| 8,113,074 B2 | 2/2012 | Wohrle et al. |
| 8,128,051 B2 | 3/2012 | Koga et al. |
| 8,171,823 B2 | 5/2012 | Koga et al. |
| 8,382,058 B2 * | 2/2013 | Sovis ................... B60N 2/0232 248/424 |
| 8,453,529 B2 | 6/2013 | Birker et al. |
| 8,485,489 B2 | 7/2013 | Hofschulte et al. |
| 8,826,756 B2 | 9/2014 | Hoffmann et al. |
| 8,864,231 B2 | 10/2014 | Shimoda et al. |
| 8,904,895 B2 | 12/2014 | Woehrle et al. |
| 9,180,795 B2 | 11/2015 | Flieger et al. |
| 9,205,763 B2 | 12/2015 | Anticuar et al. |
| 9,415,713 B2 | 8/2016 | Line et al. |
| 9,689,464 B2 | 6/2017 | Hamakita |
| 9,694,724 B2 | 7/2017 | Nagata et al. |
| 9,827,879 B2 | 11/2017 | Fujita et al. |
| 9,902,295 B2 | 2/2018 | Napau et al. |
| 10,024,392 B2 | 7/2018 | Napau et al. |
| 10,195,975 B2 | 2/2019 | Becker et al. |
| 10,220,730 B2 | 3/2019 | Nagata et al. |
| 10,300,812 B2 | 5/2019 | Flieger et al. |
| 10,486,554 B2 | 11/2019 | Napau et al. |
| 10,493,867 B2 * | 12/2019 | Hoffmann ............. B60N 2/067 |
| 10,500,985 B2 * | 12/2019 | Laumeier ............... F16C 17/12 |
| 10,737,591 B2 | 8/2020 | Ito |
| 10,843,591 B2 | 11/2020 | Becker et al. |
| 10,933,771 B2 | 3/2021 | Geiges et al. |
| 10,953,772 B2 | 3/2021 | Napau et al. |
| 11,273,506 B2 | 3/2022 | Napau et al. |
| 2003/0168566 A1 * | 9/2003 | Ito ....................... B60N 2/067 248/429 |
| 2004/0206195 A1 | 10/2004 | Landskron et al. |
| 2004/0221670 A1 | 11/2004 | Becker et al. |
| 2004/0254041 A1 | 12/2004 | Becker et al. |
| 2005/0082890 A1 | 4/2005 | Taubmann et al. |
| 2005/0116132 A1 | 6/2005 | Sakamaki |
| 2005/0126333 A1 | 6/2005 | Dohles et al. |
| 2005/0146174 A1 | 7/2005 | Maddelein et al. |
| 2005/0253036 A1 | 11/2005 | Li et al. |
| 2005/0269478 A1 | 12/2005 | Woehrle et al. |
| 2006/0084547 A1 | 4/2006 | Dill et al. |
| 2006/0117885 A1 | 6/2006 | Robson et al. |
| 2006/0213302 A1 | 9/2006 | Hoffmann et al. |
| 2006/0249644 A1 | 11/2006 | Folliot et al. |
| 2007/0029893 A1 | 2/2007 | Schuler et al. |
| 2007/0108360 A1 | 5/2007 | Ito et al. |
| 2007/0209873 A1 | 9/2007 | Wolf |
| 2007/0241602 A1 | 10/2007 | Thiel et al. |
| 2008/0261743 A1 | 10/2008 | Junkers |
| 2009/0045661 A1 | 2/2009 | Stoessel et al. |
| 2010/0139425 A1 | 6/2010 | Schulz et al. |
| 2010/0237216 A1 | 9/2010 | Napau et al. |
| 2010/0320352 A1 | 12/2010 | Weber |
| 2011/0079699 A1 | 4/2011 | Tarusawa et al. |
| 2011/0308340 A1 | 12/2011 | Bosecker et al. |
| 2012/0325033 A1 | 12/2012 | Bosecker et al. |
| 2013/0180348 A1 * | 7/2013 | Andres ................. B60N 2/0232 74/89.14 |
| 2013/0333496 A1 | 12/2013 | Boutouil et al. |
| 2014/0238188 A1 | 8/2014 | Ito |
| 2015/0020955 A1 | 1/2015 | Hoffmann et al. |
| 2015/0210187 A1 | 7/2015 | Harleb et al. |
| 2015/0283924 A1 | 10/2015 | Boutouil et al. |
| 2015/0360587 A1 | 12/2015 | Hoffmann et al. |
| 2016/0257223 A1 | 9/2016 | Markel et al. |
| 2017/0059017 A1 | 3/2017 | Napau et al. |
| 2017/0203677 A1 | 7/2017 | Becker et al. |
| 2018/0065507 A1 | 3/2018 | Napau et al. |
| 2018/0334054 A1 | 11/2018 | Higuchi et al. |
| 2019/0152347 A1 | 5/2019 | Becker et al. |
| 2019/0202322 A1 | 7/2019 | Napau et al. |
| 2020/0215936 A1 | 7/2020 | Teer et al. |

(56) References Cited

U.S. PATENT DOCUMENTS

| | | |
|---|---|---|
| 2020/0262317 A1 | 8/2020 | Napau et al. |
| 2021/0016375 A1 | 1/2021 | Napau et al. |

FOREIGN PATENT DOCUMENTS

| | | |
|---|---|---|
| CN | 1251411 A | 4/2000 |
| CN | 1309750 A | 8/2001 |
| CN | 101448674 A | 6/2009 |
| CN | 201350516 Y | 11/2009 |
| CN | 101528502 B | 8/2012 |
| CN | 103095041 A | 5/2013 |
| CN | 103101455 A | 5/2013 |
| CN | 103498891 A | 1/2014 |
| CN | 204226562 U | 3/2015 |
| CN | 104520140 A | 4/2015 |
| CN | 104802666 A | 7/2015 |
| CN | 204774719 U | 11/2015 |
| CN | 204774722 U | 11/2015 |
| CN | 105270212 A | 1/2016 |
| CN | 105599643 A | 5/2016 |
| CN | 207078030 U | 3/2018 |
| CN | 208306408 U | 1/2019 |
| CN | 208324966 U | 1/2019 |
| DE | 1755740 A1 | 1/1972 |
| DE | 3107455 A1 | 10/1982 |
| DE | 19815283 A1 | 10/1999 |
| DE | 19861100 A1 | 2/2000 |
| DE | 19911432 A1 | 9/2000 |
| DE | 10139631 A1 | 3/2003 |
| DE | 10250994 A1 | 8/2003 |
| DE | 10247204 A1 | 4/2004 |
| DE | 10203983 B4 | 5/2004 |
| DE | 10327103 A1 | 12/2004 |
| DE | 102004013543 A1 | 10/2005 |
| DE | 102005044467 B3 | 3/2007 |
| DE | 202008016335 U1 | 3/2009 |
| DE | 102009006815 A1 | 8/2009 |
| DE | 102013009846 A1 | 12/2013 |
| DE | 10362326 B4 | 2/2014 |
| DE | 102015205440 A1 | 9/2016 |
| DE | 102017100934 A1 | 7/2017 |
| DE | 102017008036 A1 | 3/2018 |
| EP | 0450324 A2 | 10/1991 |
| EP | 0617213 A1 | 9/1994 |
| EP | 0848672 B1 | 12/1999 |
| EP | 0992711 A2 | 4/2000 |
| EP | 1068093 A1 | 1/2001 |
| EP | 1167113 A1 | 1/2002 |
| EP | 1026027 B1 | 3/2004 |
| EP | 1442923 A2 | 8/2004 |
| EP | 1601550 B1 | 10/2012 |
| FR | 679410 A | 4/1930 |
| FR | 2517018 A3 | 5/1983 |
| FR | 2872747 A1 | 1/2006 |
| FR | 2882975 A1 | 9/2006 |
| GB | 2389066 A | 12/2003 |
| GB | 2404704 A | 2/2005 |
| JP | S62184939 A | 8/1987 |
| JP | H08197988 A | 8/1996 |
| JP | 2010112553 A | 5/2010 |
| JP | 2015134513 A | 7/2015 |
| JP | 2018203208 A | 12/2018 |
| KR | 20090071616 A | 7/2009 |
| KR | 101470180 B1 | 12/2014 |
| KR | 101501384 B1 | 3/2015 |
| KR | 101518647 B1 | 5/2015 |
| KR | 101708126 B1 | 2/2017 |
| WO | WO-8606036 A1 | 10/1986 |
| WO | WO-9709192 A1 | 3/1997 |
| WO | WO-03074209 A2 | 9/2003 |
| WO | WO-2009092946 A2 | 7/2009 |
| WO | WO-2010116125 A1 | 10/2010 |
| WO | WO-2011098161 A1 | 8/2011 |
| WO | WO-2011137989 A1 | 11/2011 |
| WO | WO-2012150050 A1 | 11/2012 |
| WO | WO-2013010888 A2 | 1/2013 |
| WO | WO-2015161714 A1 | 10/2015 |
| WO | WO-2018221977 A1 | 12/2018 |

OTHER PUBLICATIONS

Notice of Allowance regarding U.S. Appl. No. 17/236,639 dated Apr. 18, 2022.

Dicker Jr. et al., "Worms and Worm Gears." Theory of Machines and Mechanisms, 3rd ed., Oxford University Press, 2003, pp. 306-310.

International Search Report regarding International Application No. PCT/US2016/048649, dated Nov. 28, 2016.

Written Opinion of the International Searching Authority regarding International Application No. PCT/US2016/048649, dated Nov. 28, 2016.

International Search Report regarding International Application No. PCT/US2016/048634, dated Dec. 21, 2016.

Written Opinion of the International Searching Authority regarding International Application No. PCT/US2016/048634, dated Dec. 21, 2016.

Office Action regarding German Patent Application No. 102017008036. 4, dated Apr. 5, 2018.

Office Action regarding Korean Patent Application No. 10-2017-0114314, dated Sep. 28, 2018.

Office Action regarding Korean Patent Application No. 10-2017-0114314, dated Mar. 27, 2019.

International Search Report regarding International Application No. PCT/US2019/021870, dated Jun. 25, 2019.

Written Opinion of the International Searching Authority regarding International Application No. PCT/US2019/021870, dated Jun. 25, 2019.

Office Action regarding Chinese Patent Application No. 201710791607. X, dated Aug. 5, 2019.

Office Action regarding Korean Patent Application No. 10-2017-0114314, dated Sep. 9, 2019.

Office Action regarding Chinese Patent Application No. 201710791607. X, dated Apr. 21, 2020.

International Search Report regarding International Application No. PCT/US2020/012857, dated Apr. 29, 2020.

Written Opinion of the International Searching Authority regarding International Application No. PCT/US2020/012857, dated Apr. 29, 2020.

Office Action regarding German Patent Application No. 102017008036. 4, dated Jul. 17, 2020.

Office Action regarding German Patent Application No. 102020200205. 3, dated Aug. 20, 2020. Partial translation provided by Bardehle Pagenberg Partnerschaft mbB.

Office Action regarding German Patent Application No. 112019000026. 8, dated Sep. 25, 2020. Partial translation provided by Bardehle Pagenberg Partnerschaft mbB.

Office Action regarding Chinese Patent Application No. 201710791607. X, dated Dec. 22, 2020.

Office Action regarding German Patent Application No. 102017100934. 5, dated Jan. 27, 2021. Translation provided by Witte, Weller & Partner Patentanwälte mbB.

Office Action regarding Korean Patent Application No. 10-2019-7026939, dated Feb. 19, 2021. Translation provided by KORYO IP & Law.

Office Action for U.S. Appl. No. 17/062,931, dated Sep. 9, 2021.

Office Action regarding Chinese Patent Application No. 202010075280.8 dated Nov. 26, 2021.

Office Action regarding German Patent Application No. 1020170080364, dated May 24, 2022.

Office Action for U.S. Appl. No. 16/737,991, dated May 27, 2022.

* cited by examiner

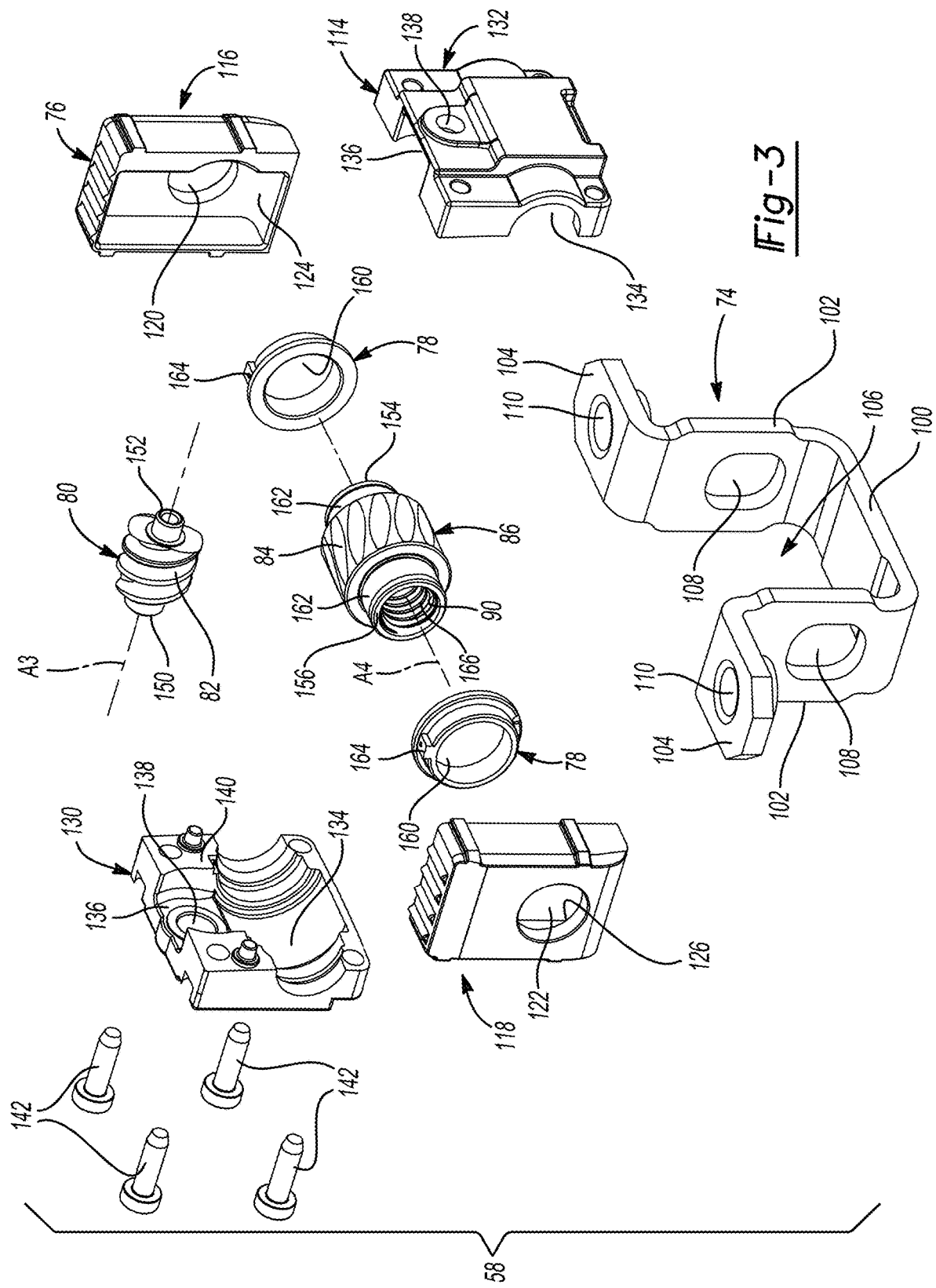

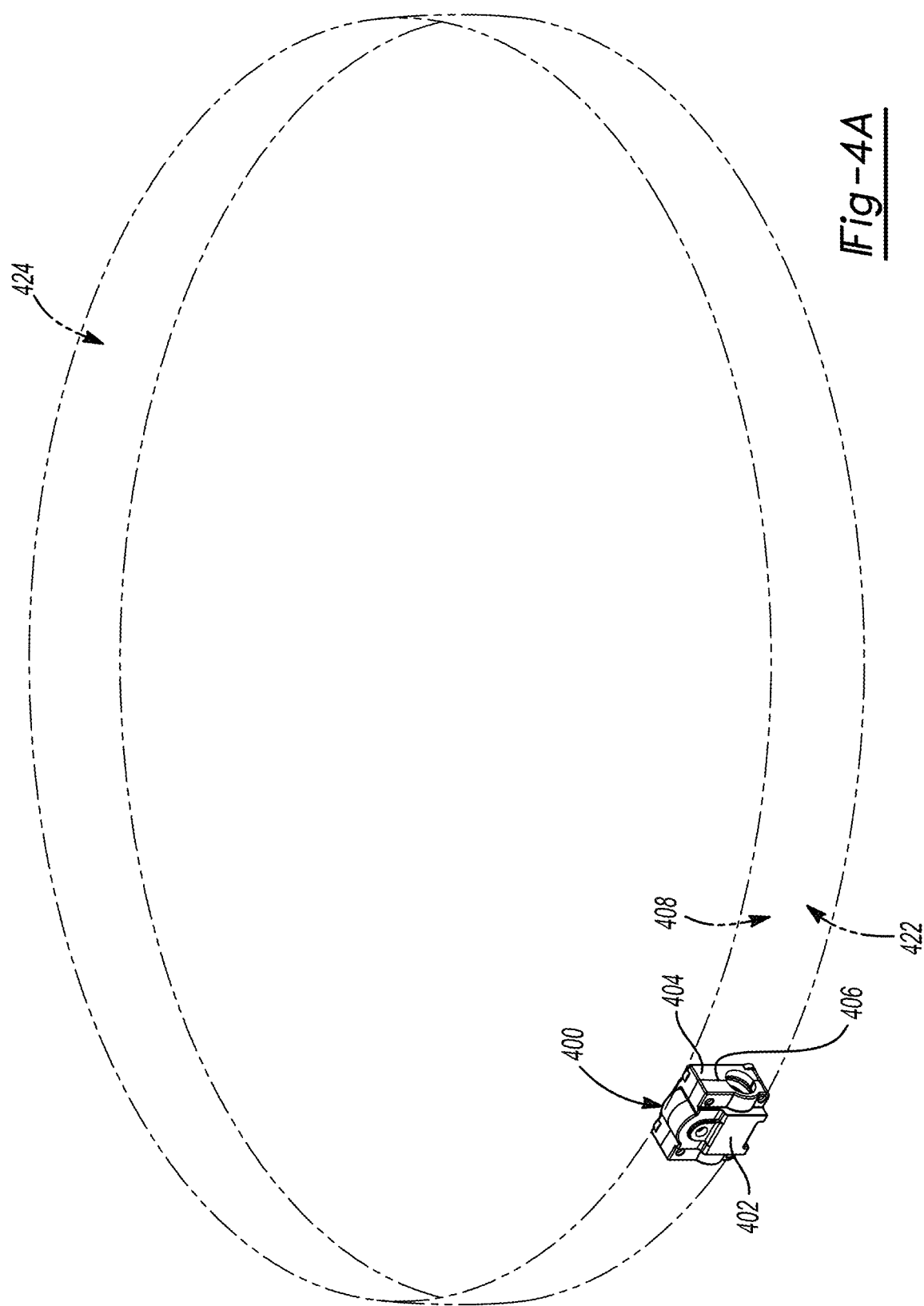

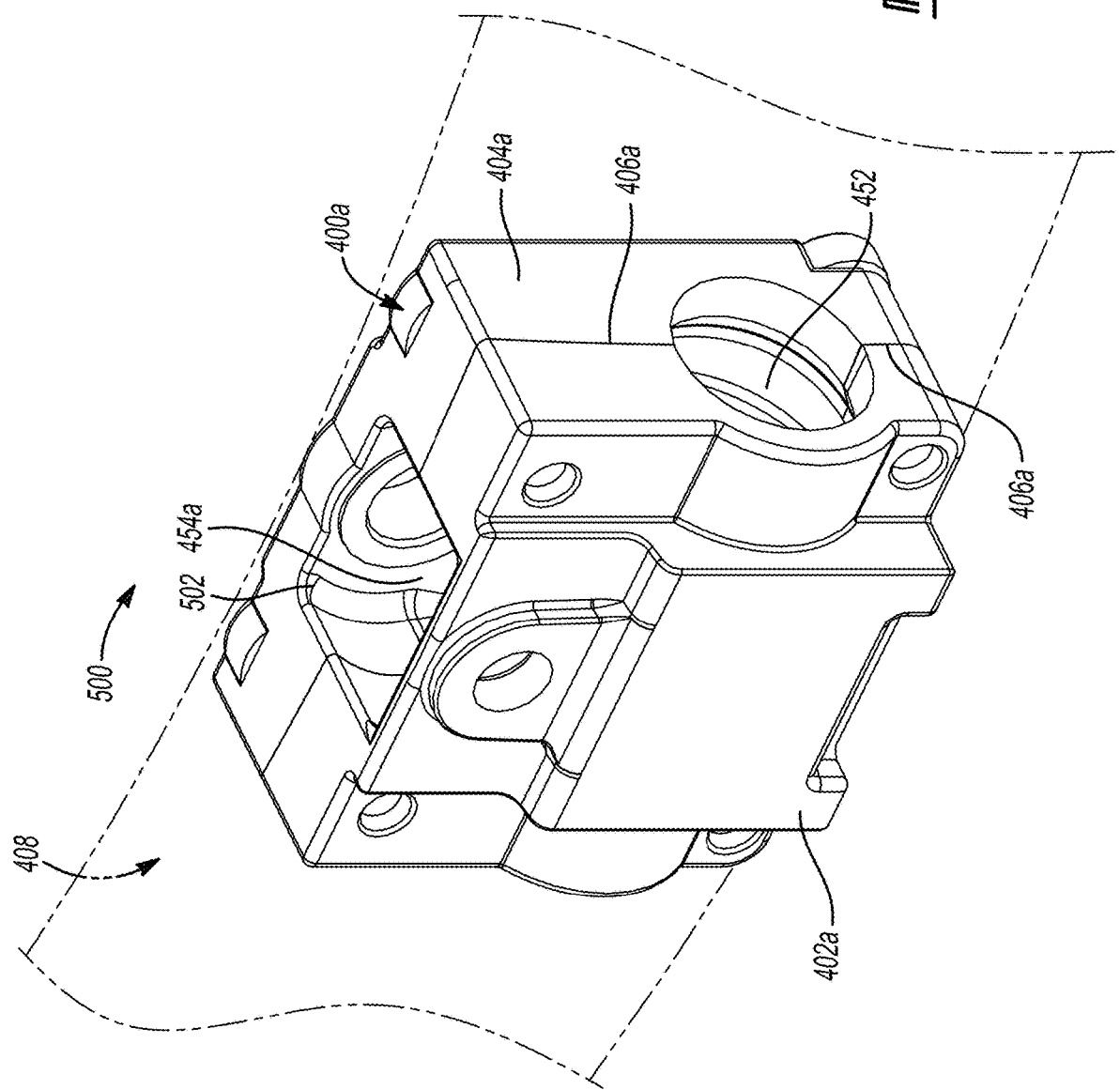

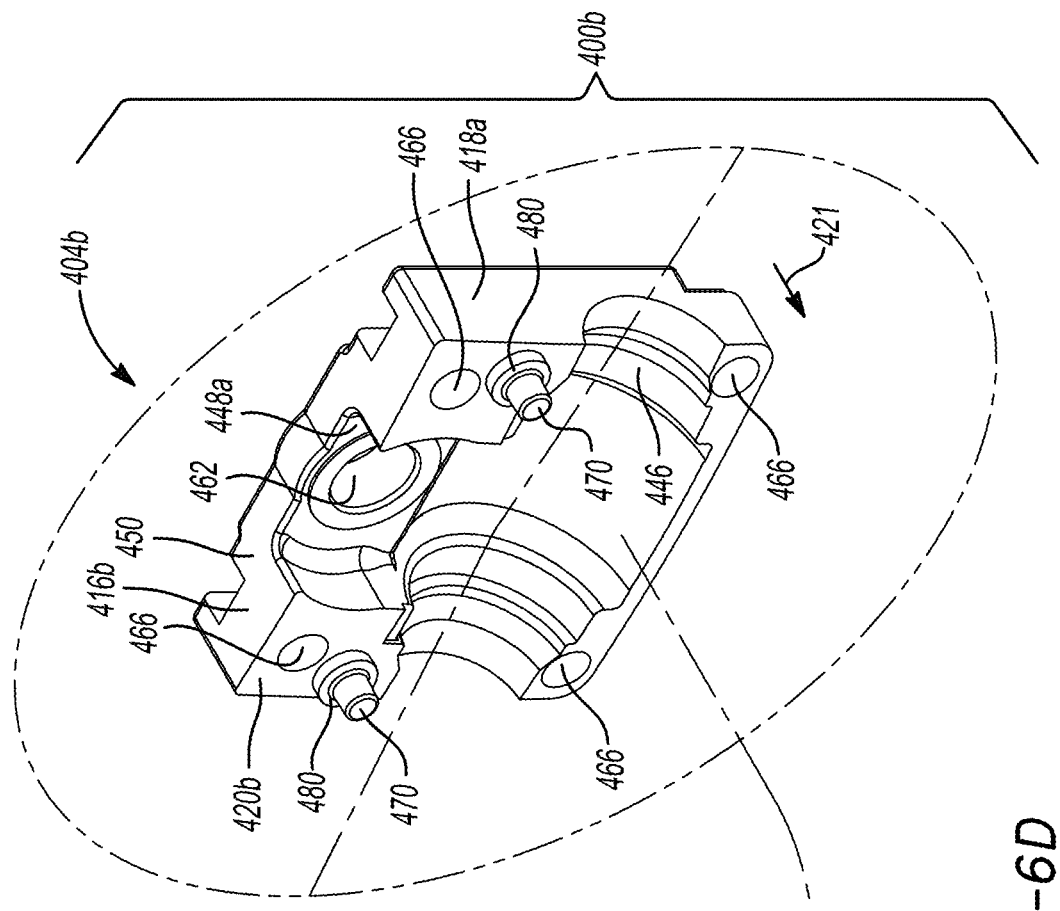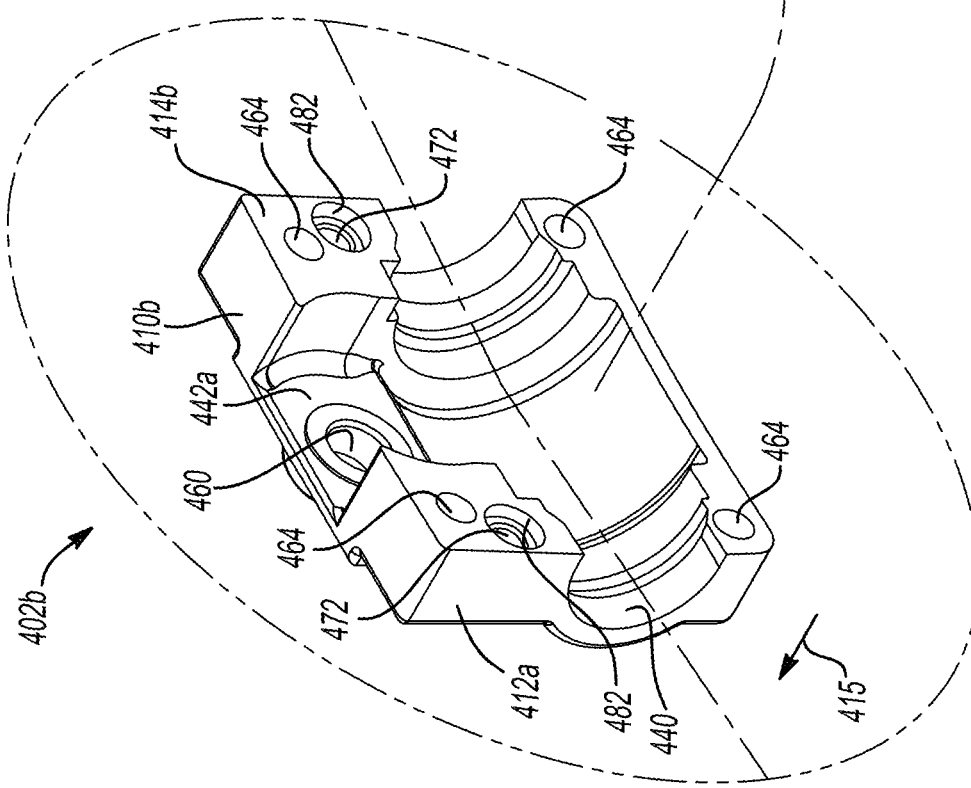
Fig-6D

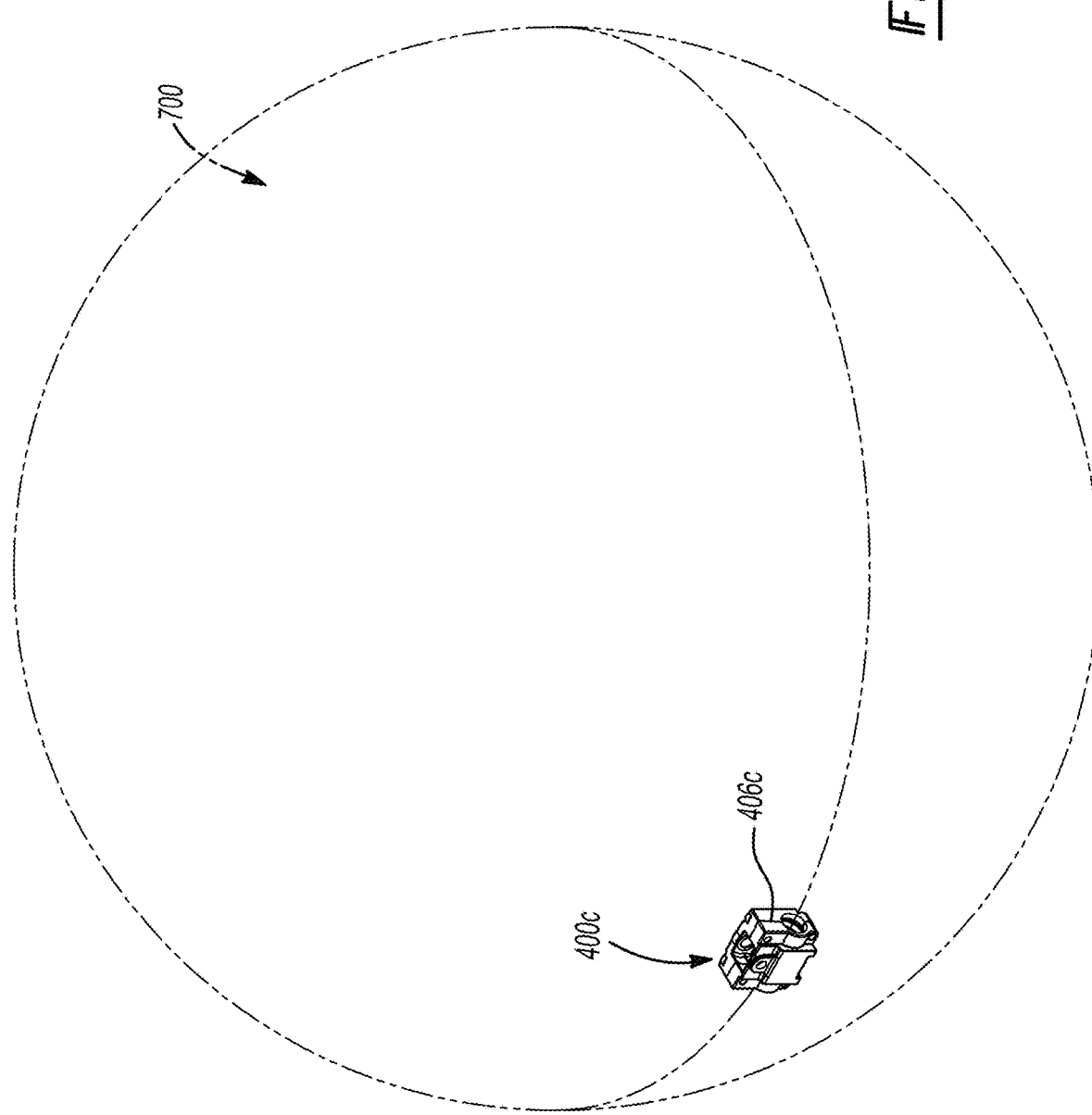

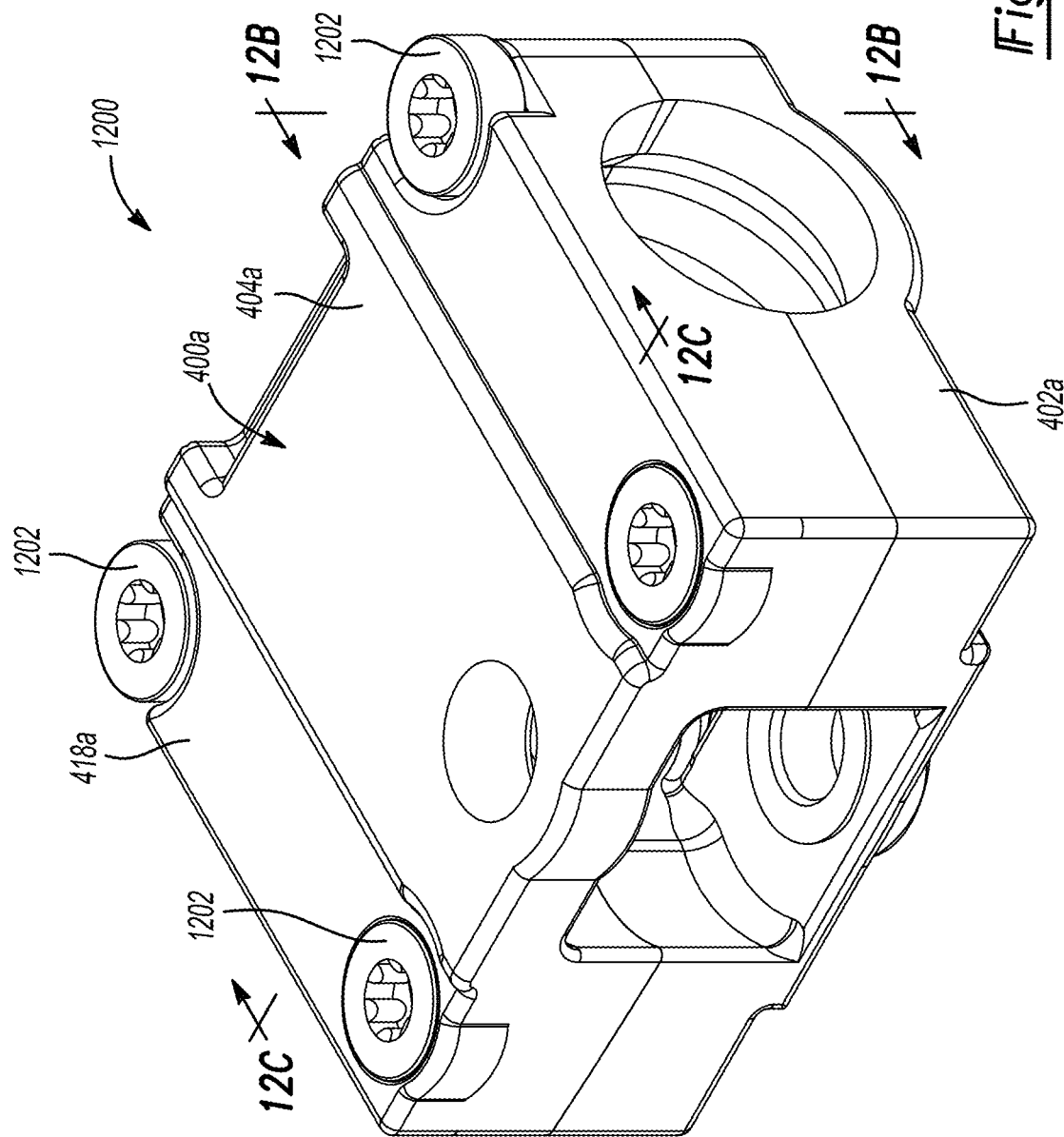

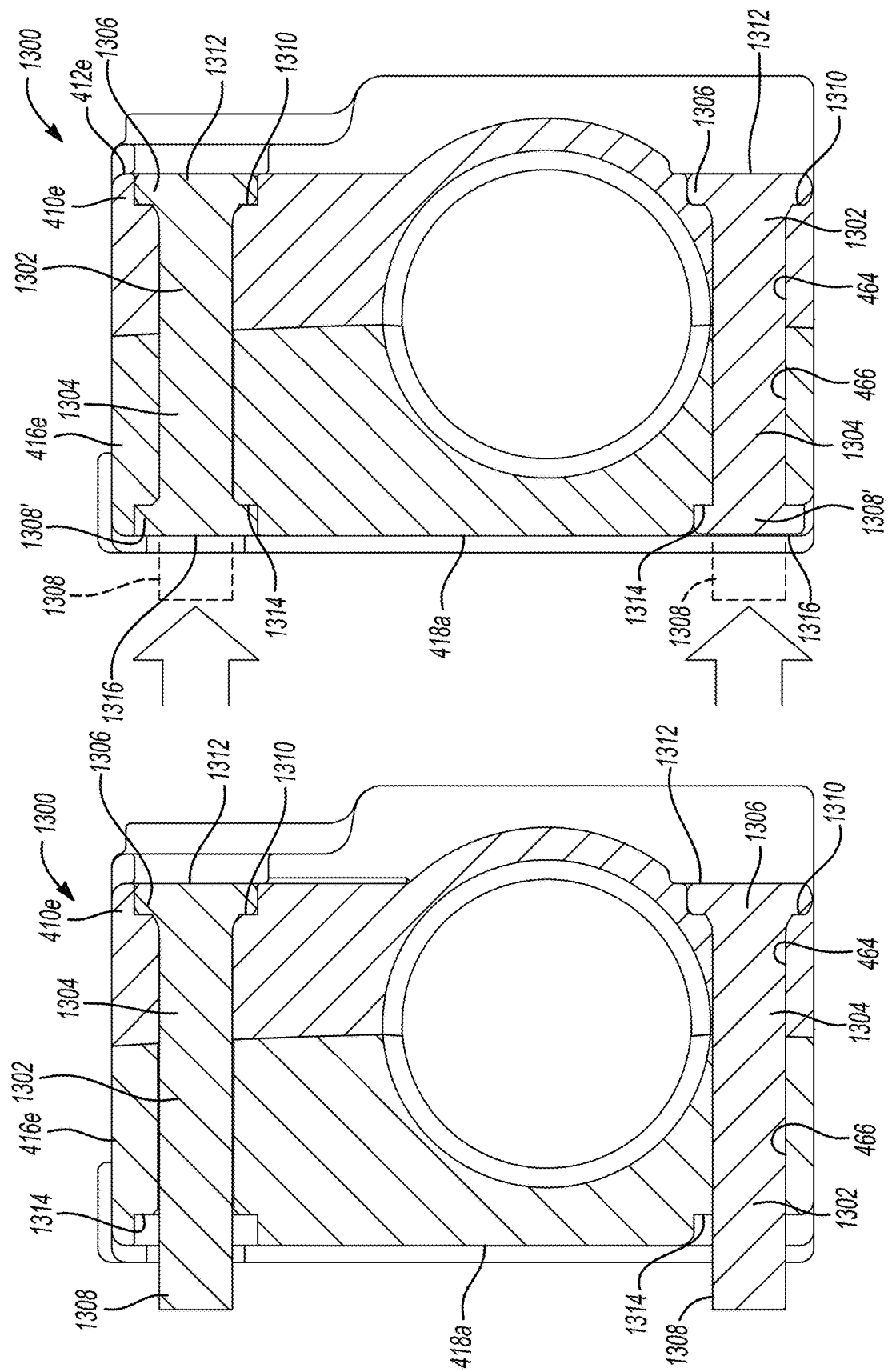

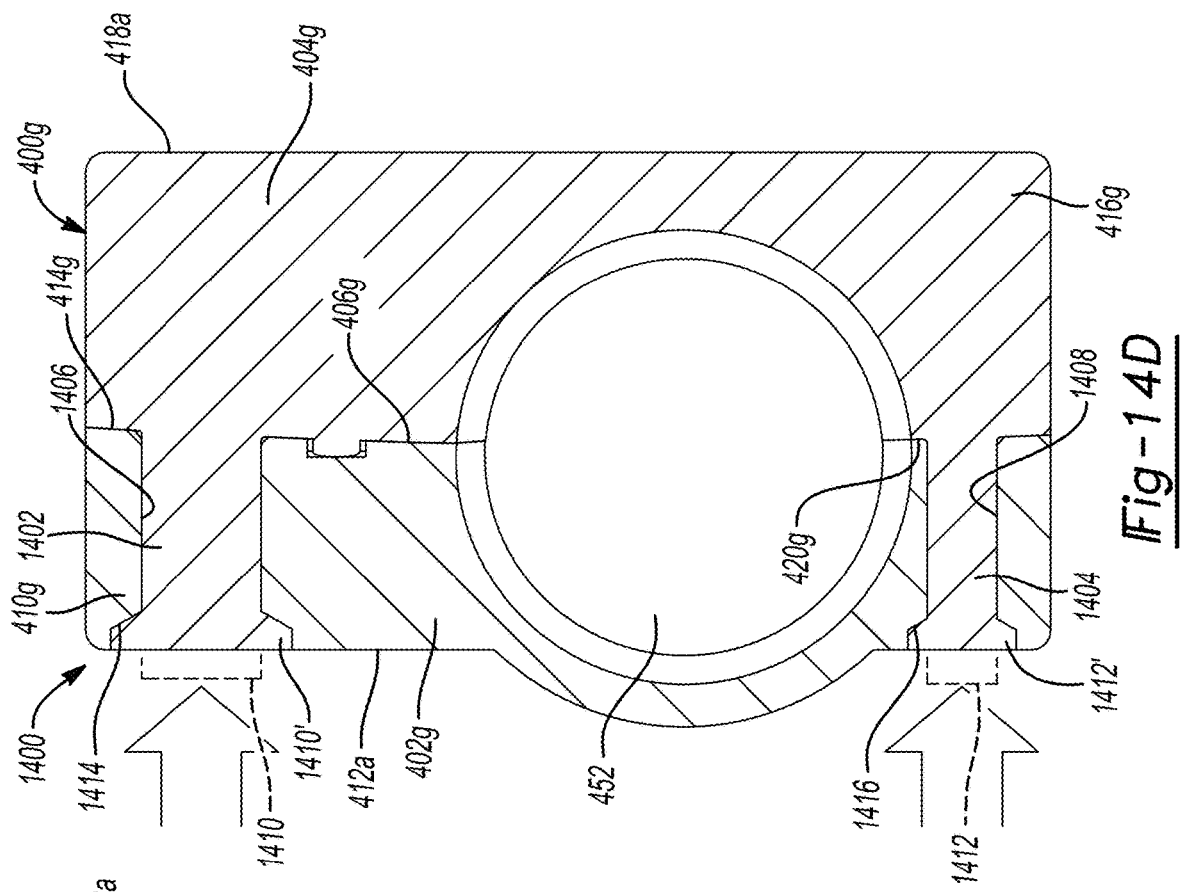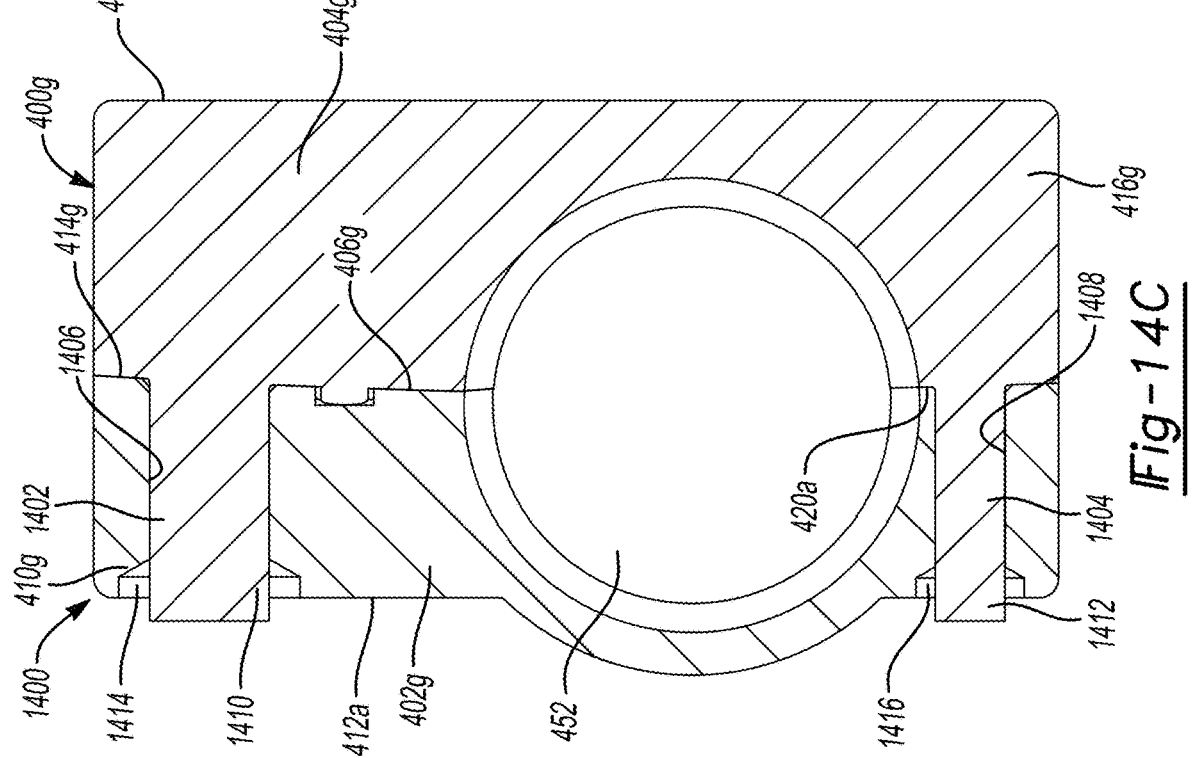

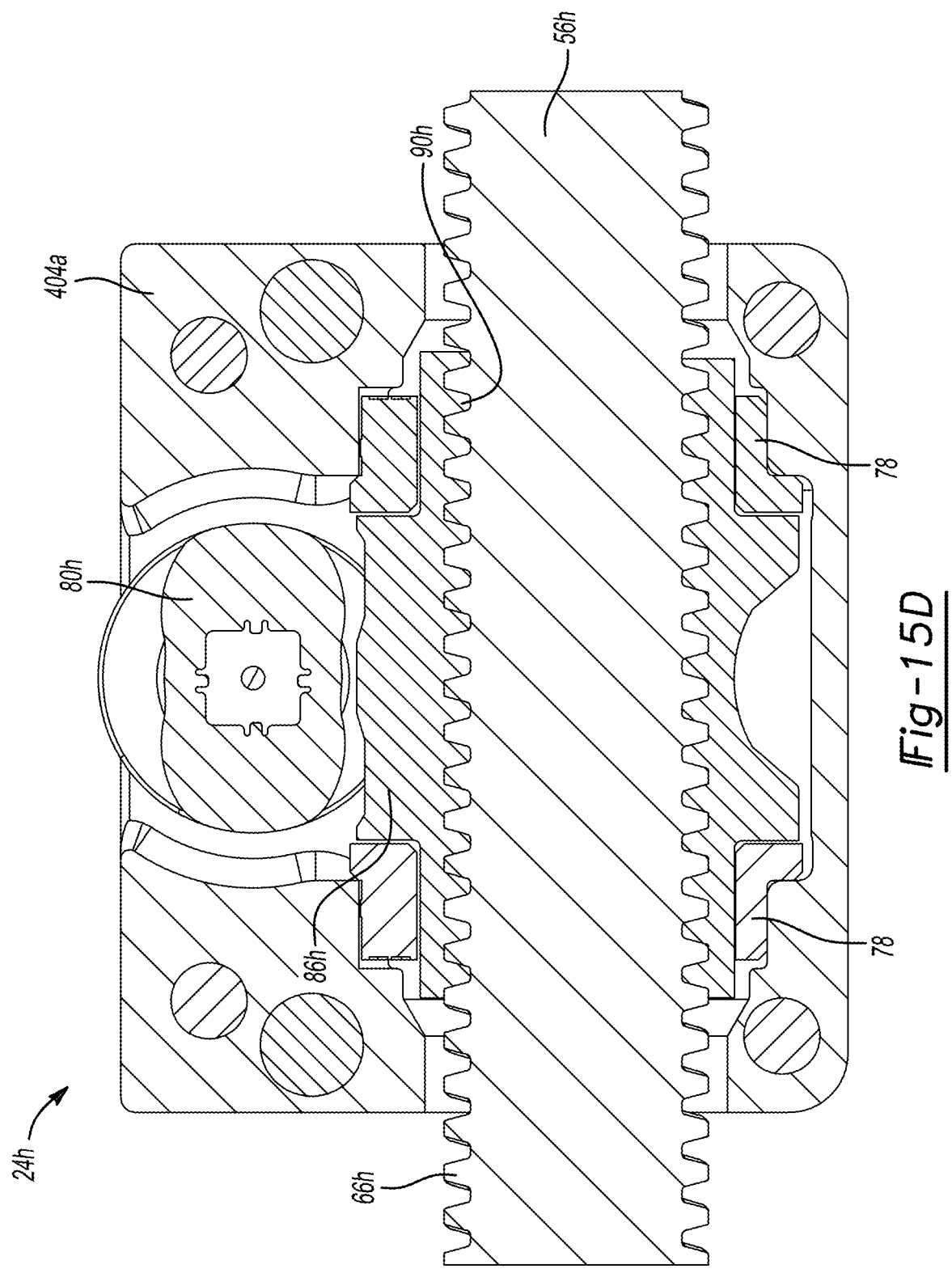

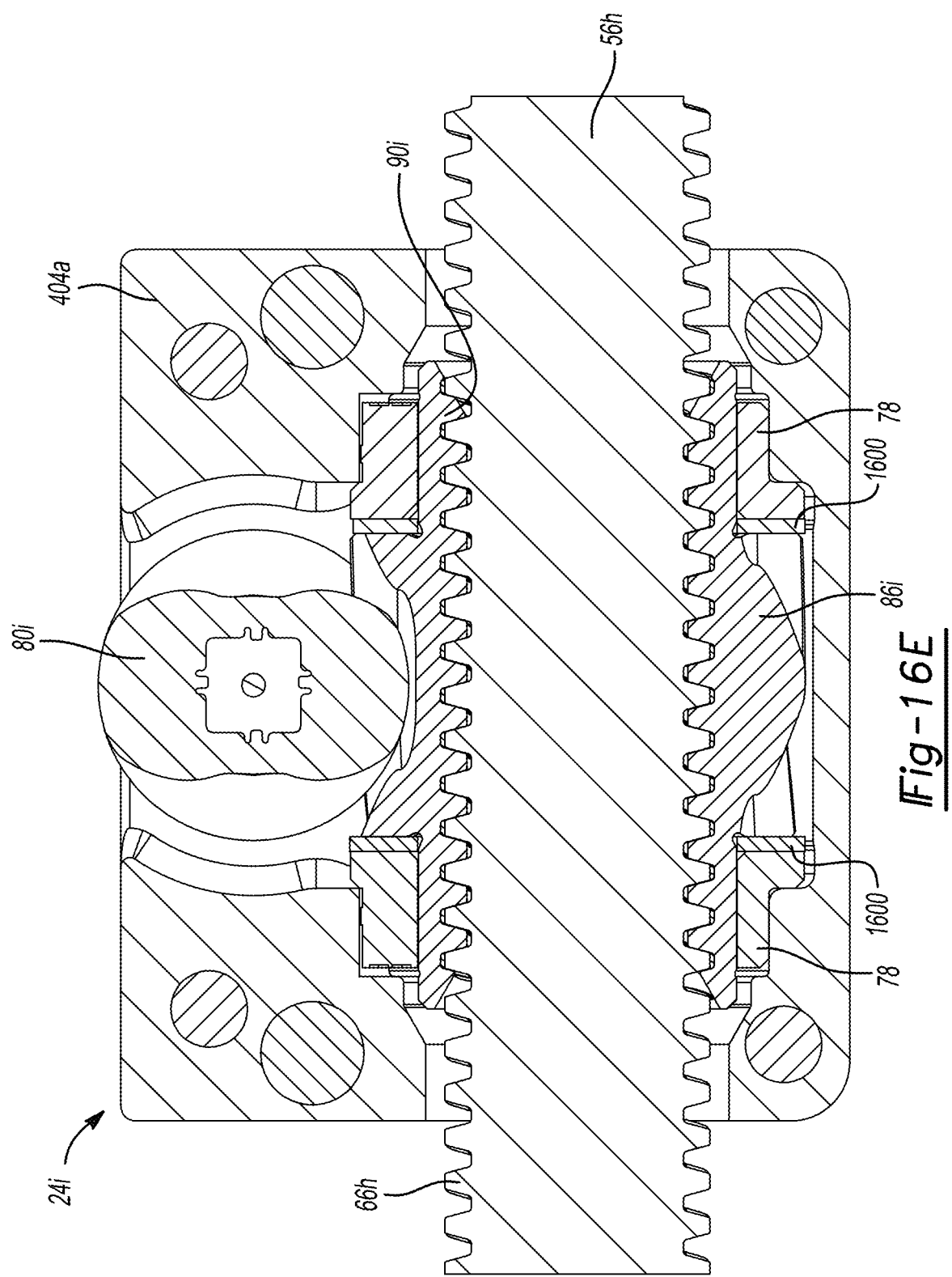

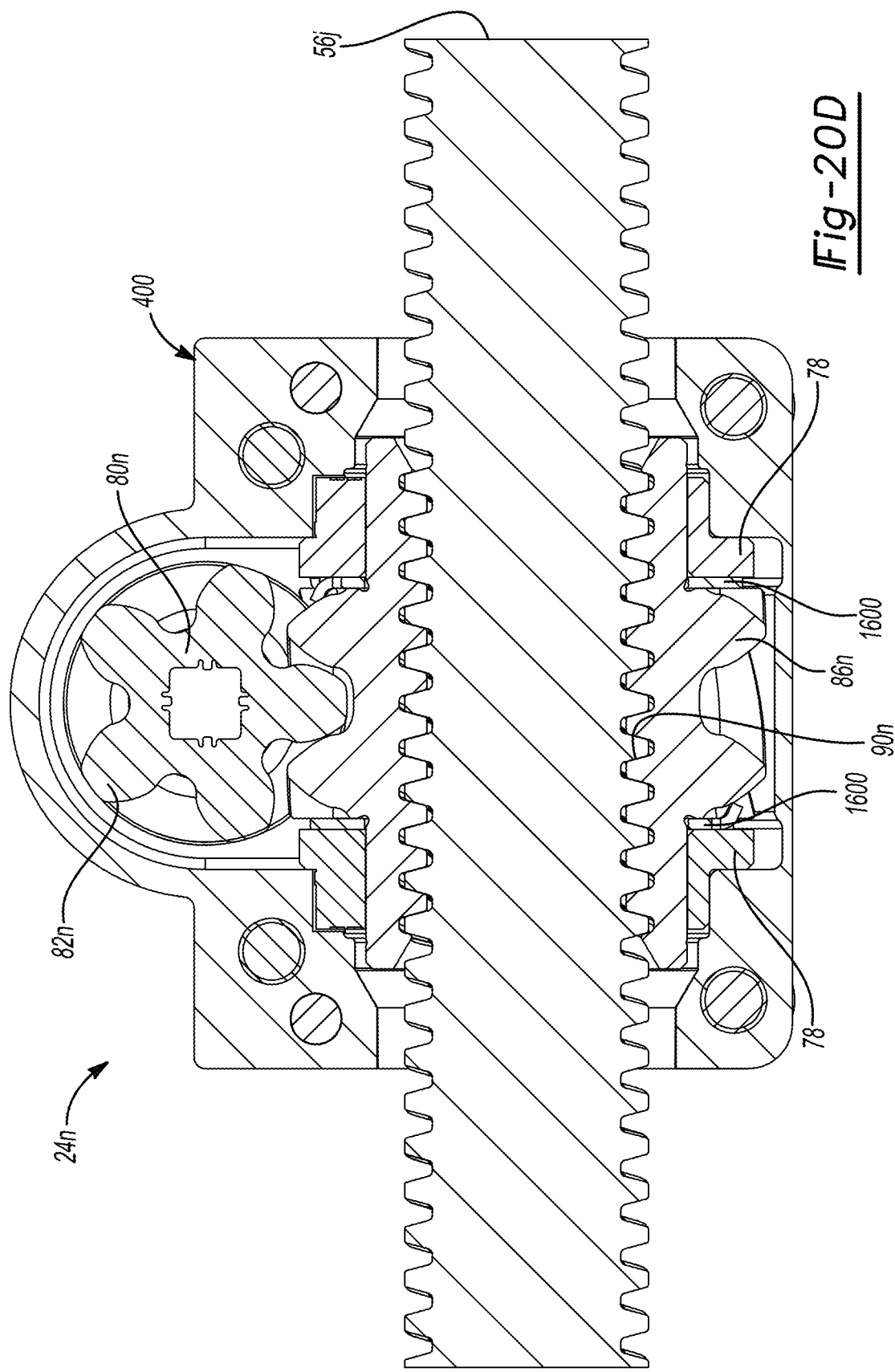

GEARBOX FOR VEHICLE SEAT ADJUSTMENT MECHANISM

CROSS-REFERENCE TO RELATED APPLICATIONS

This application is a continuation-in-part of U.S. patent application Ser. No. 17/236,639 filed on Apr. 21, 2021, which claims the benefit of U.S. Provisional Application No. 63/019,054 filed on May 1, 2020. The entire disclosures of the above applications are incorporated herein by reference.

FIELD

The present disclosure relates to generally to gear drives case assemblies for vehicle seat adjusters and more particularly to a bi-directionally self-centered case for an orthogonal gear drive (e.g., of enveloping or helical type) used in adjusting longitudinal position of a vehicle seat.

BACKGROUND

This section provides background information related to the present disclosure and is not necessarily prior art.

Vehicles such as automobiles are commonly equipped with seat adjuster mechanisms, that can primarily adjust the height, tilt and/or longitudinal position of the driver or/and passenger seat, to accommodate occupants of different size and height as well as to provide a comfortable seating position to suit the occupant's preference. Such seat adjusters may be manually or powered operated.

Power operated seat adjusters are driven by electric motors, their size being directly linked to the torque they must provide to produce the required motion. Thus, if a reasonably high reduction gear ratio can be achieved in very limited space, smaller and faster electric motors can be used to providing the same level of mechanical power needed for the required function. Electric motors with increased speed and capable of delivering a certain level of torque, used in certain applications require a limited reduction gear ratio but in a very compact dimensional space.

Electric motor-driven adjusting devices offer various advantages over manual adjustment devices. User comfort may be enhanced. Electric motor-driven adjusting devices also provide an electric interface which lends itself to automation, e.g., under the control of a controller of a vehicle which may automatically control the motor to bring the seat to a desired state. In spite of the benefits offered by electric motor-driven adjusting devices, packaging is an issue in many seats.

Typically, a power operated seat length adjuster is actuated by an occupant-controlled switch and includes a bi-directional electric motor, mounted centrally or intermediately between the vehicle seat pair of track assemblies, that rotates two flex drive shafts extending outwardly from the motor to two gearbox blocks fixedly mounted inside of each upper or inner track assemblies. Each gearbox block includes a worm-worm gear or a worm-helical gear drive assembly, having the drive member actuated through the flex drive shaft and the driven member integral with an internal threaded spindle nut.

Each spindle drive assembly includes the already mentioned rotatable spindle nut that threadingly receives a lead screw extending longitudinally along and fixed to the lower or outer track assembly. Through these two drives, the electric motor rotational movement is orthogonally offset to move fore/and aft linearly the upper tracks relative to the lower tracks, along spindle screws axes. The vehicle seat is attached to on a frame supported by the seat pair of mobile upper tracks disposed parallel to one another, while the pair of lower tracks is fastened to the vehicle chassis. Typically, two drive shafts, gear boxes, lead screws, and drive nuts are employed in a power length adjuster drive, one set for each seat track assembly, driven by only one bi-directional electric motor.

SUMMARY

This section provides a general summary of the disclosure and is not a comprehensive disclosure of its full scope or all of its features.

A gearbox for a vehicle seat adjustment mechanism in accordance with the principles of the present disclosure is provided. The gearbox includes a first portion and a second portion. The first portion includes a first body. The first body defines a first longitudinal recess and a first peripheral recess in fluid communication with the first longitudinal recess. The first body includes a first curved surface. The first curved surface is concave. The second portion includes a second body. The second body defines a second longitudinal recess and a second peripheral recess in fluid communication with the second longitudinal recess. The second body includes a second curved surface. The second curved surface is convex. The second curved surface has an equal and opposite curvature compared to the first curved surface. In an assembled configuration, the first curved surface is in contact with the second curved surface. In the assembled configuration, the first longitudinal recess communicates with the second longitudinal recess to define a longitudinal passage. In the assembled configuration, the first peripheral recess communicates with the second peripheral recess to define a peripheral receptacle.

In one implementation, the first curved surface and the second curved surface both define (i) a portion of an ellipsoidal surface, (ii) a portion of a conical surface, or (iii) a portion of a spherical surface.

In one implementation, the first curved surface and the second curved surface both define a portion of an ellipsoidal surface. The ellipsoidal surface has a first radius in a range of 190 mm to 200 mm and a second radius in a range of 240 to 250 mm.

In one implementation, the first curved surface and the second curved surface both define a portion of a conical surface. The conical surface defines an average opening angle in a range of 165° to 172°.

In one implementation, the first curved surface and the second curved surface both define a portion of a spherical surface. The spherical surface has a radius in a range of 190 mm to 200 mm.

In one implementation, one of the first portion and the second portion includes a frusto-conical projection extending from a respective one of the first curved surface and the second curved surface. The other of the first portion and the second portion includes a frusto-conical receptacle defined by a respective one of the first curved surface and the second curved surface. In the assembled configuration, the frusto-conical receptacle receives the frusto-conical projection.

In one implementation, the one of the first portion and the second portion further includes an annular projection extending from the respective one of the first curved surface and the second curved surface. The annular projection is disposed around a base of the frusto-conical projection. The annular projection is coaxial with the frusto-conical projection. The other of the first portion and the second portion further includes an annular depression defined by a respective one of the first curved surface and the second curved surface. The annular depression is coaxial with the frusto-conical receptacle. In the assembled configuration, the annular depression receives the annular projection.

In one implementation, the frusto-conical projection includes a first frusto-conical projection and a second frusto-conical projection. The frusto-conical receptacle includes a first frusto-conical receptacle and a second frusto-conical receptacle. The annular projection includes a first annular projection and a second annular projection. The annular depression includes a first annular depression and a second annular depression.

In one implementation, the gearbox further includes an elastic layer. The elastic layer is disposed on at least one of the first curved surface or the second curved surface.

In one implementation, one of the first portion and the second portion includes an integral rivet. The integral rivet extends from a respective one of the first curved surface and the second curved surface. The other one of the first portion and the second portion includes an aperture defined in a respective one of the first curved surface and the second curved surface, the aperture is configured to receive a portion of the integral rivet.

In one implementation, the gearbox further includes a plurality of fasteners. The plurality of fasteners is configured to couple the first portion and the second portion to each other.

In one implementation, the gearbox is configured to house at least a portion of a cross-axis gear system and a spindle screw. The cross-axis gear system includes a first gear in operative communication with a second gear. The second gear is in operative communication with the spindle screw.

In one implementation, the gearbox is a universal gearbox. The gear system is configured to operate at any one of: (i) a comfort speed has a linear adjusting speed ranging from 17 mm/s to 22 mm/s, (ii) a high speed has a linear adjusting speed ranging from 55 mm/s to 60 mm/s, or (iii) a ultra-high speed has a linear adjusting speed ranging from 85 mm/s to 90 mm/s.

In one implementation, the first gear is a cylindrical worm gear and the second gear is one of a helical gear or a single enveloping worm gear.

In another form, the present disclosure provides another vehicle seat adjustment assembly that includes a gearbox, a gear system, and a spindle screw. The gearbox assembly includes a first portion and a second portion. The first portion includes a first body. The first body defines a first longitudinal recess and a first peripheral recess in fluid communication with the first longitudinal recess. The first body includes a first curved surface. The first curved surface is concave. The second portion includes a second body. The second body defines a second longitudinal recess and a second peripheral recess. The second body includes a second curved surface. The second longitudinal recess cooperates with the first longitudinal recess to define a longitudinal passage. The second peripheral recess cooperates with the first peripheral recess to define a peripheral receptacle. The second curved surface is convex, has an equal and opposite curvature compared to the first curved surface, and is in contact with the first curved surface. The gear system includes a first gear and a second gear. The first gear is disposed at least partially within the peripheral receptacle. The first gear includes a first external thread. The first gear is configured to rotate about a first axis. The second gear is disposed at least partially within the longitudinal passage. The second gear includes external teeth and an internal thread. The second gear defines a gear passage. The external teeth are in operative communication with the first external thread. The second gear is configured to rotate about a second axis perpendicular to the first axis. The spindle screw extends through the gear passage. The spindle screw includes a second external thread. The second external thread is in operative communication with the internal thread.

In one implementation, the first curved surface and the second curved surface both define (i) a portion of an ellipsoidal surface, (ii) a portion of a conical surface, or (iii) a portion of a spherical surface.

In one implementation, the second gear is one of (i) a helical gear or (ii) a single enveloping worm gear.

In one implementation, the second external thread is a trapezoidal thread, and the spindle screw has a 3 mm lead, a 1.5 mm pitch, and one of a (i) 8 mm nominal diameter and (ii) a 9 mm nominal diameter. In another implementation, the second external thread is a trapezoidal thread, and the spindle screw has a 4 mm lead, a 2 mm pitch, and one of (i) a 11 mm nominal diameter and (ii) a 12 mm nominal diameter.

In one implementation, the gear system is configured to operate at one of: (i) a comfort speed has a linear adjusting speed ranging from 17 mm/s to 22 mm/s, (ii) a high speed has a linear adjusting speed ranging from 55 mm/s to 60 mm/s, or (iii) a ultra-high speed has a linear adjusting speed ranging from 85 mm/s to 90 mm/s.

In one implementation, one of the first portion and the second portion includes a frusto-conical projection and an annular projection extending from a respective one of the first curved surface and the second curved surface. The annular projection is disposed around a base of the frusto-conical projection and coaxial with the frusto-conical projection. The other of the first portion and the second portion includes a frusto-conical receptacle and an annular depression defined by a respective one of the first curved surface and the second curved surface. The annular depression coaxial with the frusto-conical receptacle. The frusto-conical receptacle is configured to receive the frusto-conical projection and the annular depression is configured to receive the annular projection.

In another form, the present disclosure provides a vehicle seat adjustment mechanism that includes a gearbox, a first gear, a second gear, and a spindle screw. The first gear is received in the gearbox and is rotatable relative to the gearbox about a first axis. The second gear is received in the gearbox and is rotatable relative to the gearbox about a second axis that is perpendicular to the first axis. The first and second gears are meshingly engaged with each other. The spindle screw is meshingly engaged with the second gear and extends through the second gear along the second axis. The spindle screw is selected from the group consisting of: a first spindle screw having trapezoidal threads and defined by Tr 8×3 (P1.5) (8 mm nominal diameter, 3 mm lead, and 1.5 mm pitch), a second spindle screw having trapezoidal threads and defined by Tr 9×3 (P1.5) (9 mm nominal diameter, 3 mm lead, and 1.5 mm pitch), a third spindle screw having trapezoidal threads and defined by Tr 11×4 (P2) (11 mm nominal diameter, 4 mm lead, and 2 mm pitch), and a fourth spindle screw having trapezoidal threads and defined by Tr 12×4 (P2) (12 mm nominal diameter, 4 mm lead, and 2 mm pitch).

In some implementations, the vehicle seat adjustment mechanism further comprises a motor driving the first gear, wherein the motor has a maximum rotational velocity of 5,500 revolutions per minute.

In some implementations, the gearbox, the first gear, and the second gear are configured to move along the second axis at one of: (i) a comfort speed having a linear adjusting speed ranging from 17 mm/s to 22 mm/s, (ii) a high speed having a linear adjusting speed ranging from 55 mm/s to 60 mm/s, or (iii) a ultra-high speed having a linear adjusting speed ranging from 85 mm/s to 90 mm/s.

In some implementations, the first gear is a cylindrical worm gear and the second gear is one of a helical gear or a single enveloping worm gear.

In some implementations, a gear ratio of the first gear to the second gear is selected from the group consisting of: 3.333, 3.25, 3.2, 2.833, 2.8, 2.75, 2.6, 2.4, and 2.2.

In some implementations, a gear ratio of the first gear to the second gear is selected from the group consisting of: 8.5, 7.5, 6.5, 5.667, 5.333, 4.667, 4.333, 3.667, and 3.333.

The vehicle seat adjustment mechanism can be incorporated into a seat track assembly including a lower seat track and an upper seat track that is configured to engage the lower seat track and slide along a length of the lower seat track, wherein the gearbox is configured to be mounted to the upper seat track.

In some implementations, the gearbox includes: a first portion including a first body, the first body defining a first longitudinal recess and a first peripheral recess in fluid communication with the first longitudinal recess; and a second portion including a second body, the second body define a second longitudinal recess and a second peripheral recess in fluid communication with the second longitudinal recess.

In some implementations, the first body includes a first curved surface that is concave, the second body includes a second curved surface, the second curved surface being convex and having an equal and opposite curvature compared to the first curved surface, and in an assembled configuration: the first curved surface is in contact with the second curved surface, the first longitudinal recess communicates with the second longitudinal recess to define a longitudinal passage, and the first peripheral recess communicates with the second peripheral recess to define a peripheral receptacle.

In some implementations, the first curved surface and the second curved surface both define (i) a portion of an ellipsoidal surface, (ii) a portion of a conical surface, or (iii) a portion of a spherical surface.

In some implementations, one of the first portion and the second portion includes a frusto-conical projection extending from a respective one of the first curved surface and the second curved surface, the other of the first portion and the second portion includes a frusto-conical receptacle defined by a respective one of the first curved surface and the second curved surface, and in the assembled configuration, the frusto-conical receptacle receives the frusto-conical projection.

In some implementations, the one of the first portion and the second portion further includes an annular projection extending from the respective one of the first curved surface and the second curved surface, the annular projection being disposed around a base of the frusto-conical projection and coaxial with the frusto-conical projection, the other of the first portion and the second portion further includes an annular depression defined by a respective one of the first curved surface and the second curved surface, the annular depression coaxial with the frusto-conical receptacle, and in the assembled configuration, the annular depression receives the annular projection.

In some implementations, the frusto-conical projection includes a first frusto-conical projection and a second frusto-conical projection, the frusto-conical receptacle includes a first frusto-conical receptacle and a second frusto-conical receptacle, the annular projection includes a first annular projection and a second annular projection, and the annular depression includes a first annular depression and a second annular depression.

In some implementations, the vehicle seat adjustment mechanism includes an elastic layer disposed on at least one of the first curved surface or the second curved surface.

In some implementations, one of the first portion and the second portion includes an integral rivet extending from a respective one of the first curved surface and the second curved surface, and the other one of the first portion and the second portion includes an aperture defined in a respective one of the first curved surface and the second curved surface, the aperture being configured to receive a portion of the integral rivet.

In some implementations, the spindle screw is the first spindle screw and has a minimum axial strength of 19 kN.

In some implementations, the spindle screw is the second spindle screw and has a minimum axial strength of 25 kN.

In some implementations, the spindle screw is the third spindle screw and has a minimum axial strength of 37 kN.

In some implementations, the spindle screw is the fourth spindle screw and has a minimum axial strength of 45 kN.

The present disclosure also provides a vehicle seat adjustment mechanism that includes a gearbox, a first gear, a second gear, a motor, and a spindle screw. The first gear is received in the gearbox and rotatable relative to the gearbox about a first axis. The second gear received in the gearbox and rotatable relative to the gearbox about a second axis that is perpendicular to the first axis. The first and second gears are meshingly engaged with each other. The motor drives the first gear and has a maximum rotational velocity of 5,500 revolutions per minute. The spindle screw is meshingly engaged with the second gear and extending through the second gear along the second axis. The spindle screw is selected from the group consisting of: a first spindle screw having trapezoidal threads and defined by Tr 8×3 (P1.5) (8 mm nominal diameter, 3 mm lead, and 1.5 mm pitch), a second spindle screw having trapezoidal threads and defined by Tr 9×3 (P1.5) (9 mm nominal diameter, 3 mm lead, and 1.5 mm pitch), a third spindle screw having trapezoidal threads and defined by Tr 11×4 (P2) (11 mm nominal diameter, 4 mm lead, and 2 mm pitch), and a fourth spindle screw having trapezoidal threads and defined by Tr 12×4 (P2) (12 mm nominal diameter, 4 mm lead, and 2 mm pitch). The gearbox includes: a first portion including a first body, the first body defining a first longitudinal recess and a first peripheral recess in fluid communication with the first longitudinal recess; and a second portion including a second body, the second body define a second longitudinal recess and a second peripheral recess in fluid communication with the second longitudinal recess. The first body includes a first curved surface that is concave. The second body includes a second curved surface that is convex and having an equal and opposite curvature compared to the first curved surface. In an assembled configuration: the first curved surface is in contact with the second curved surface, the first longitudinal recess communicates with the second longitudinal recess to define a longitudinal passage, and the first peripheral recess communicates with the second peripheral recess to define a peripheral receptacle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 3 is an exploded perspective view of an adjustment subassembly of the power seat length adjuster assembly of FIG. 2;

Figure 4B:
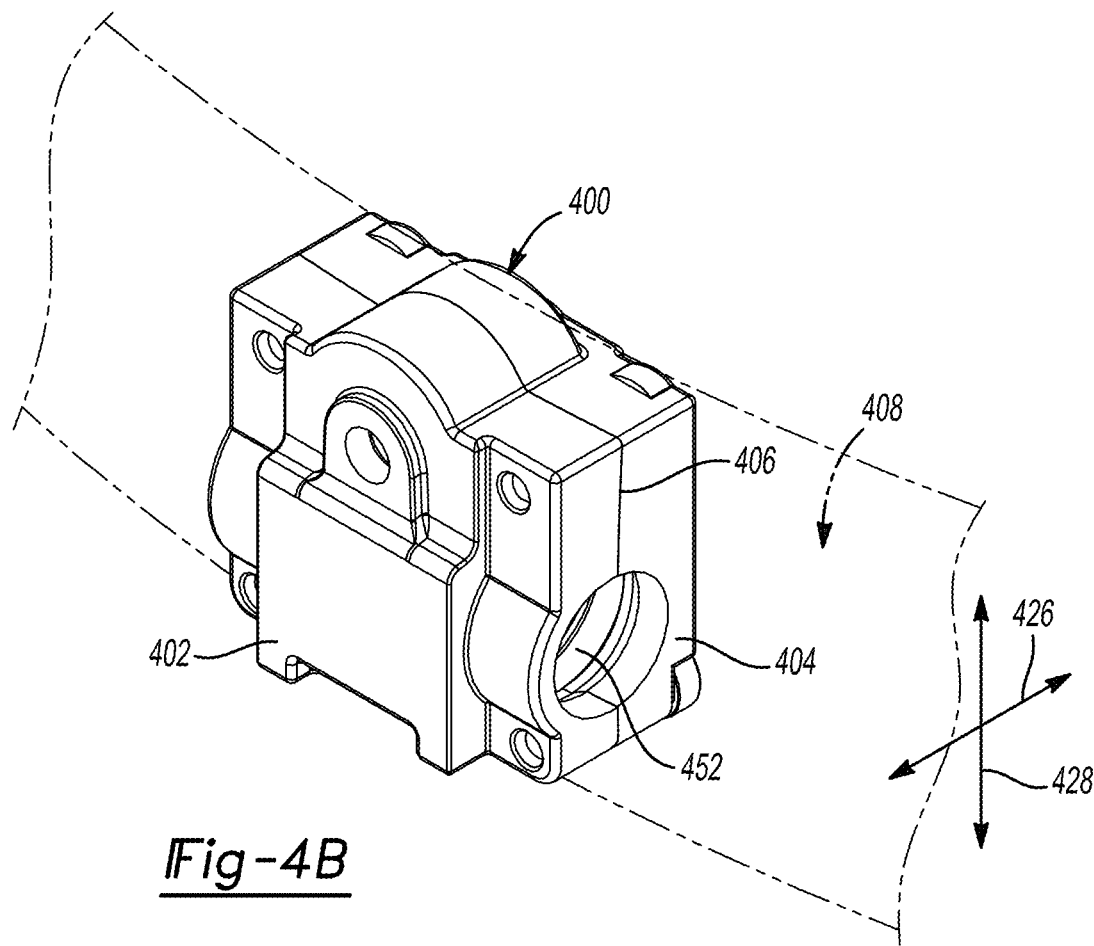
Figure 4C:
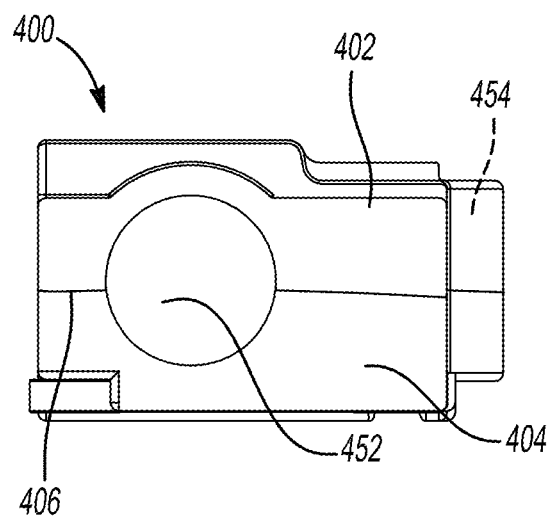
Figure 4D:
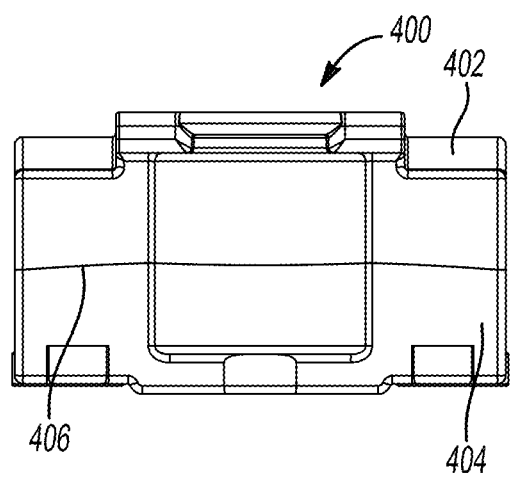
Figure 4E:
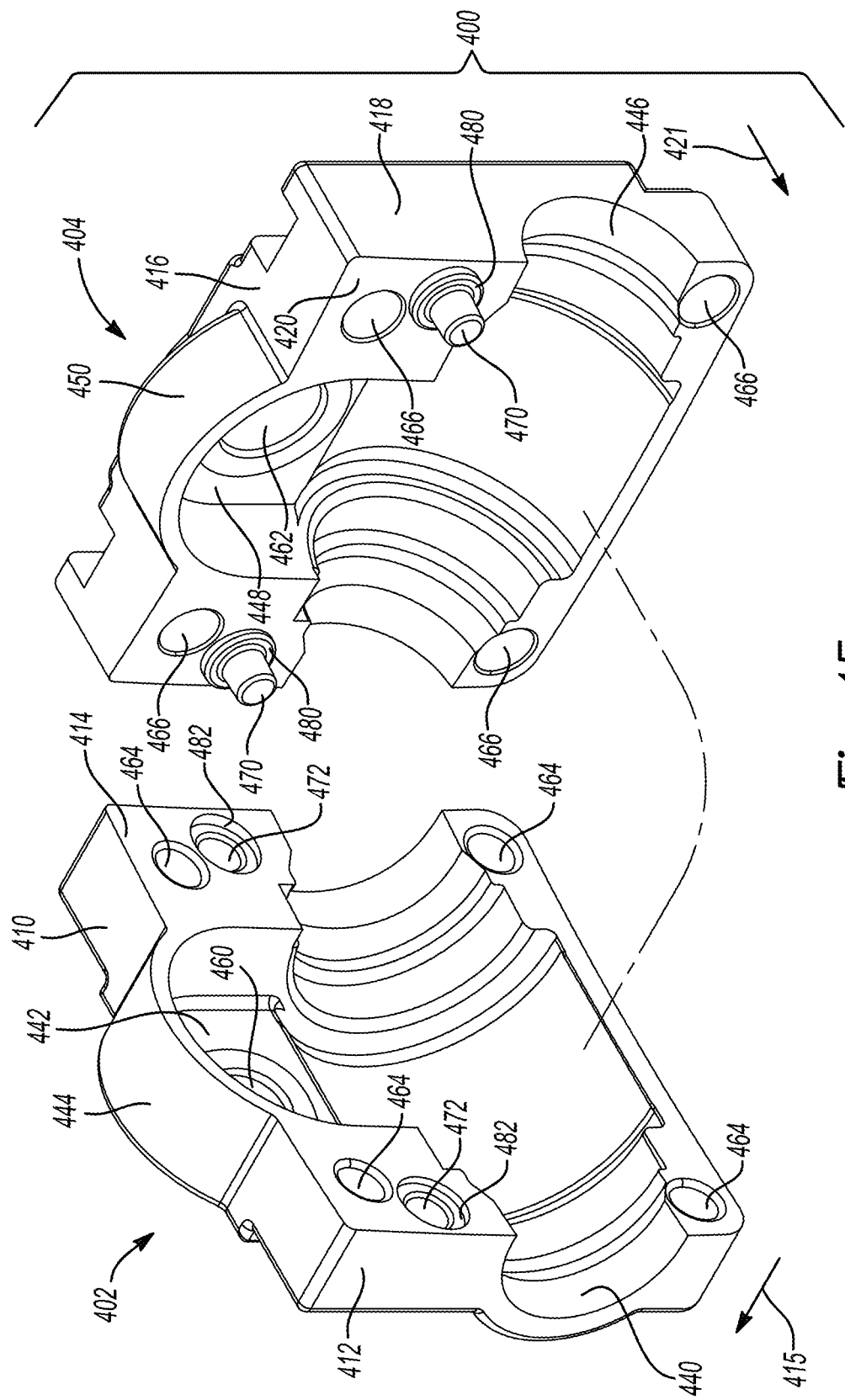
Figure 5B:
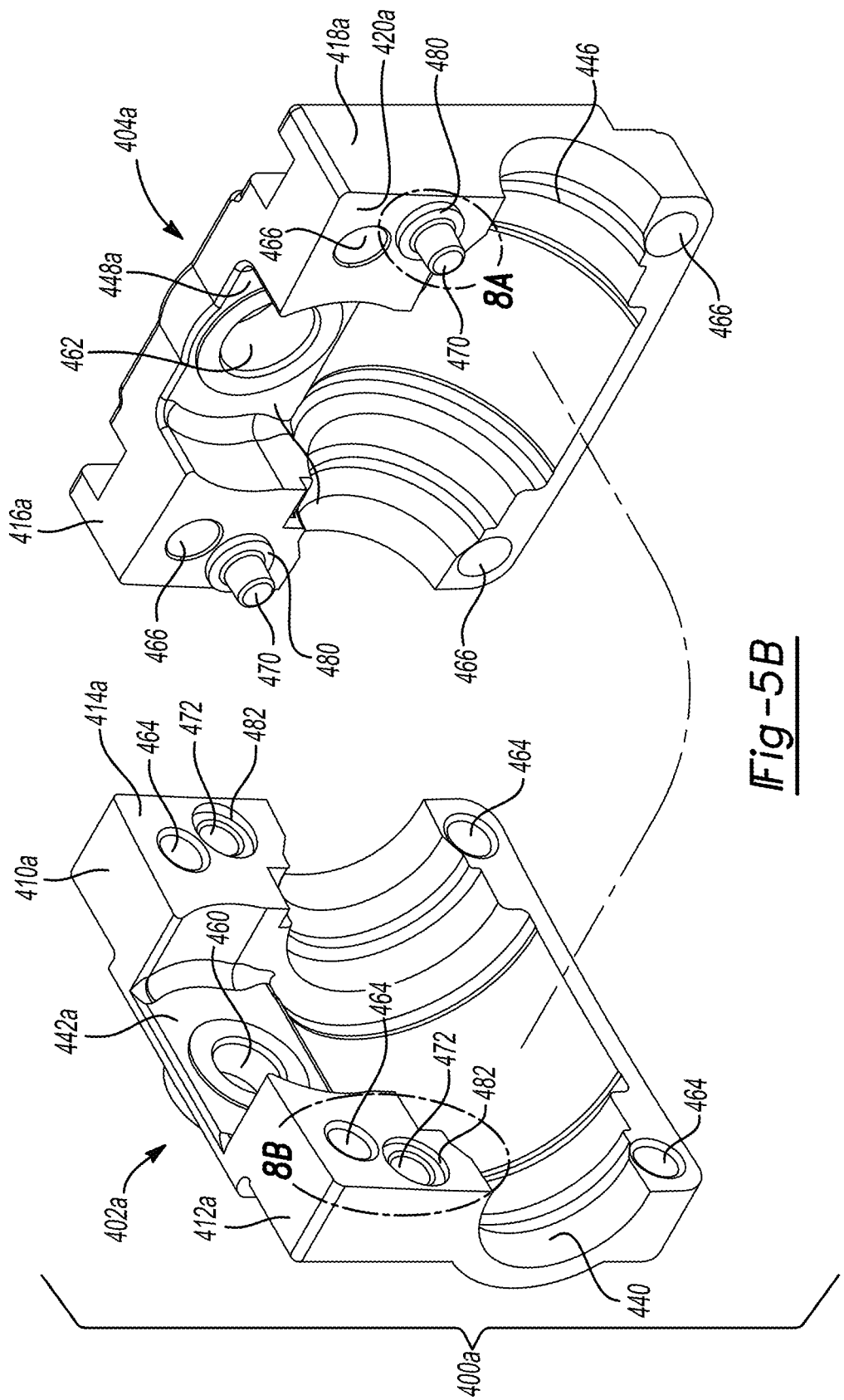
Figure 6A:
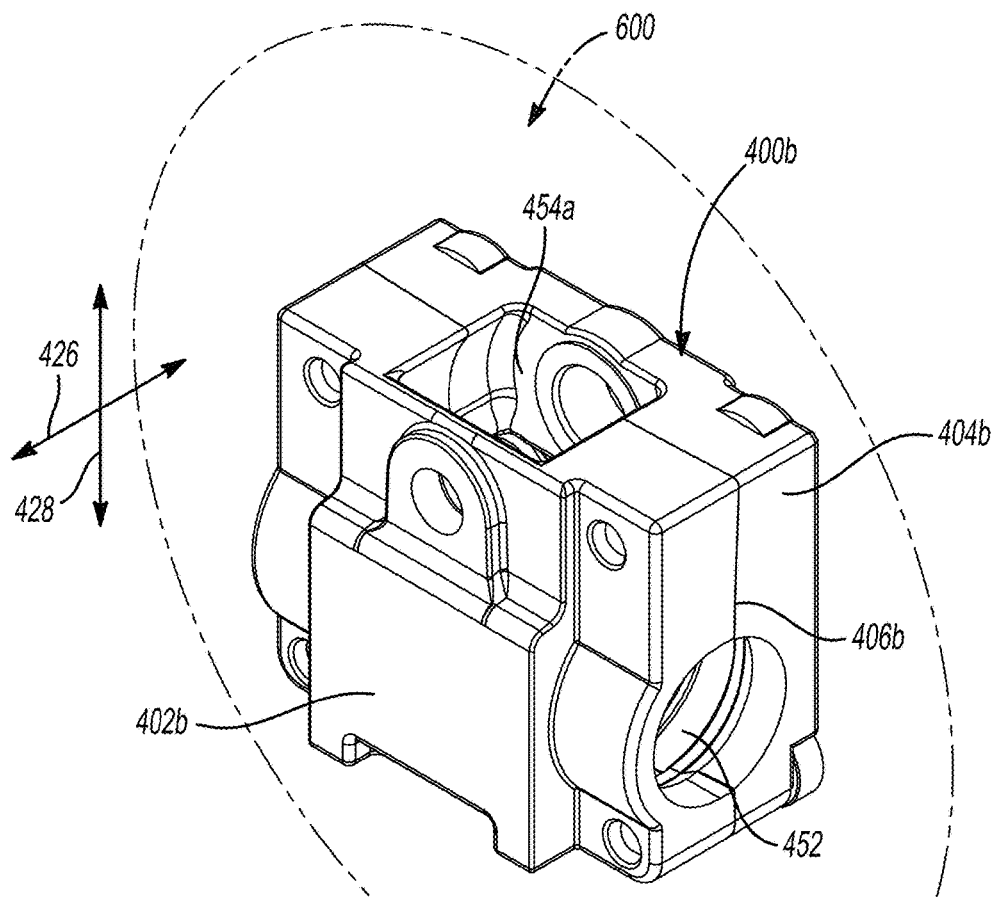
Figure 6B:
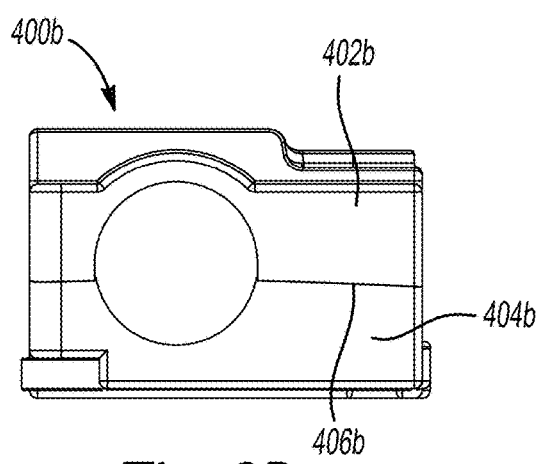
Figure 6C:
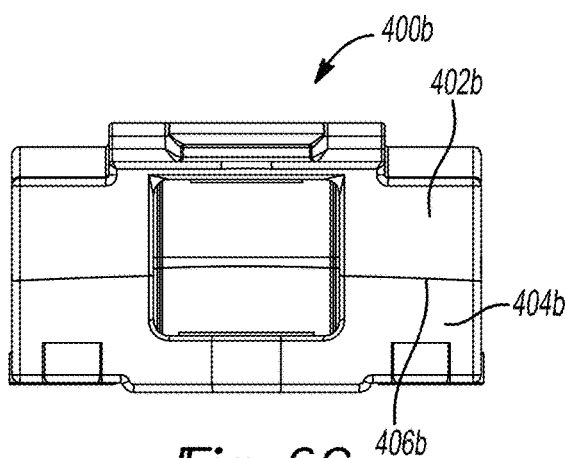
Figure 7B:
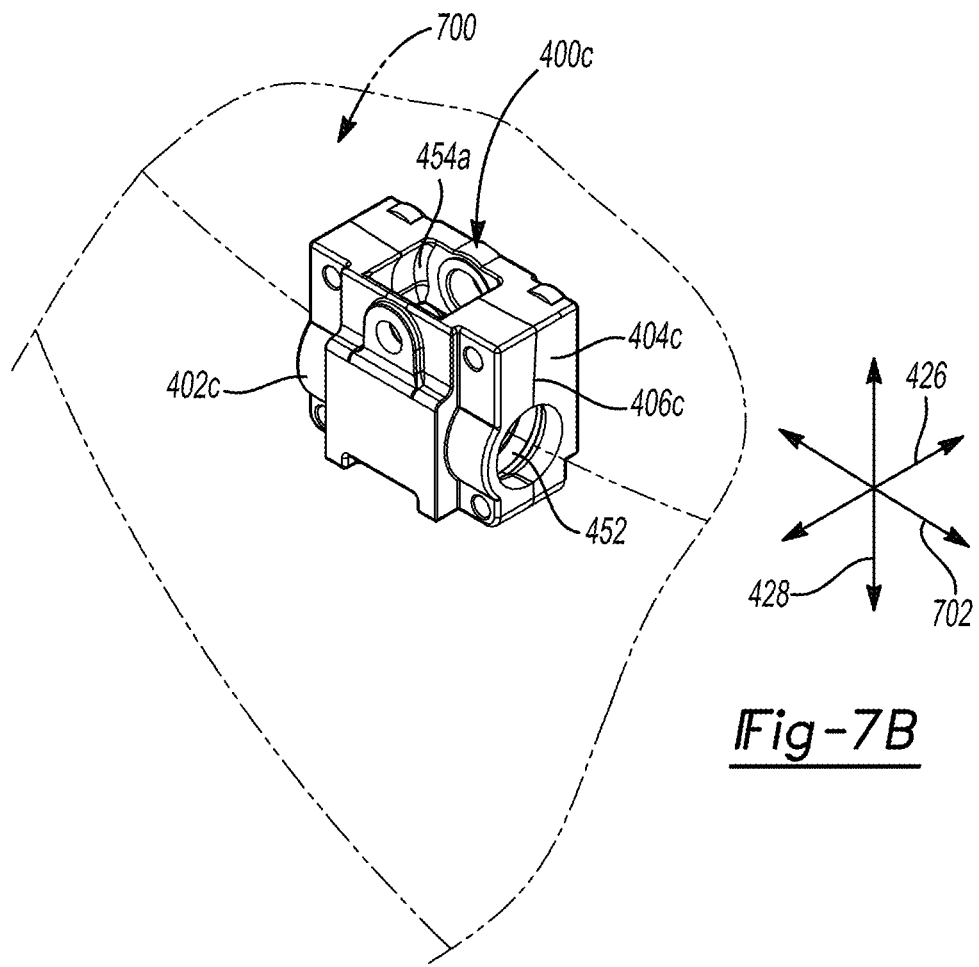
Figure 7C:
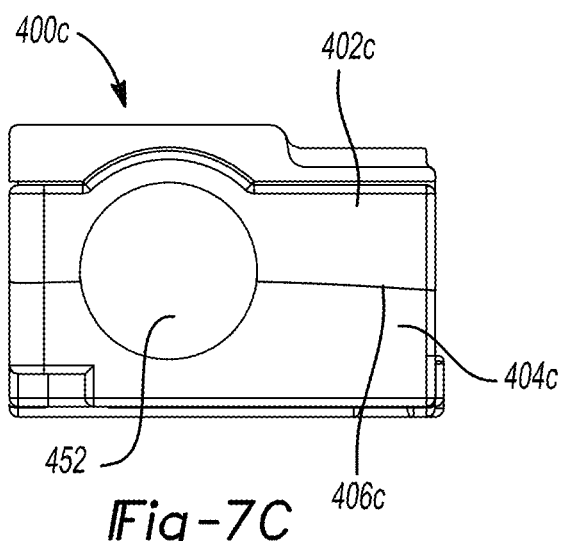
Figure 7D:
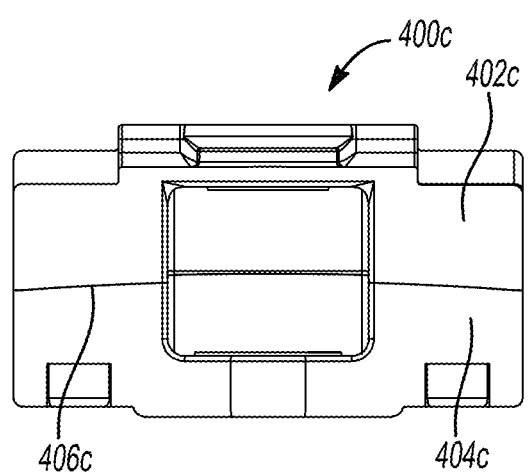
Figure 7E:
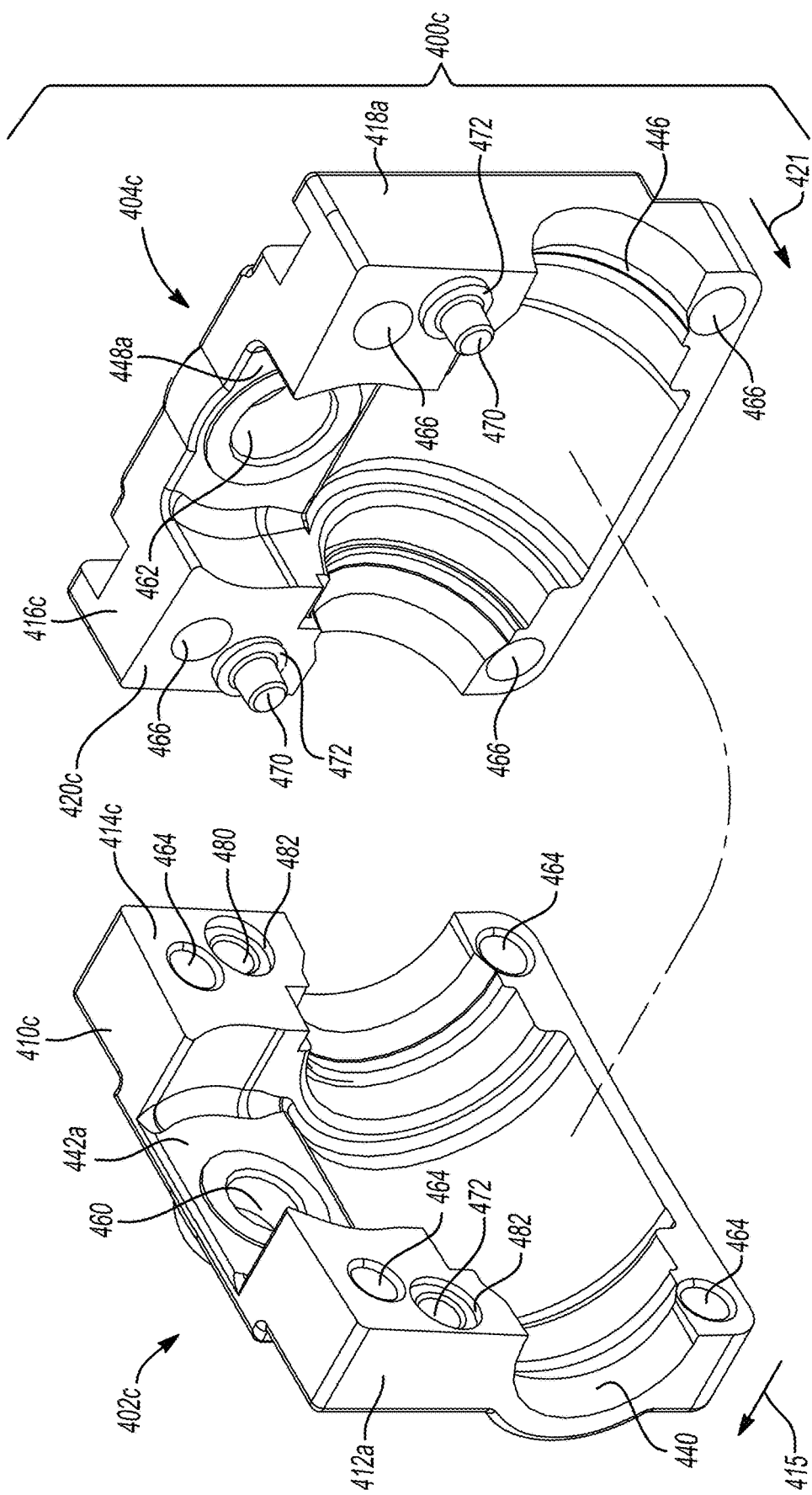
Figure 8A:
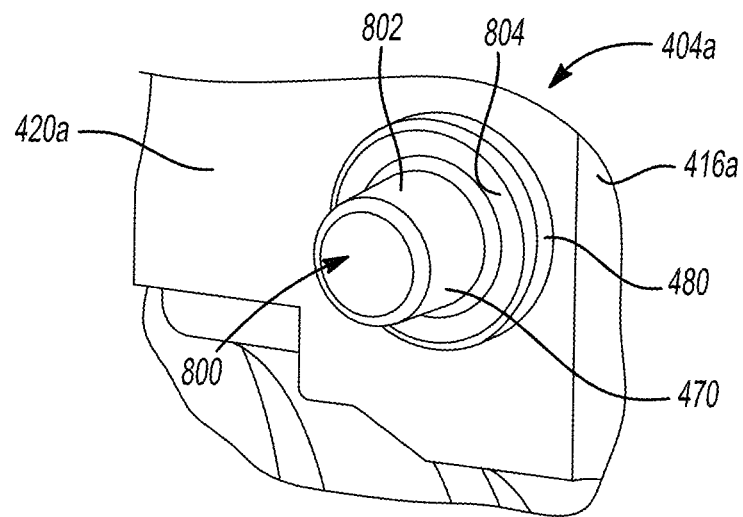
Figure 8B:
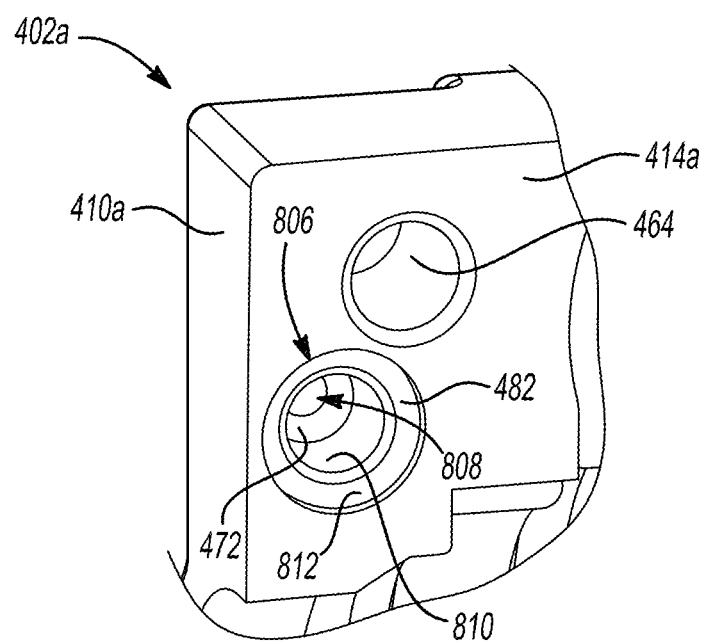
Figure 9:
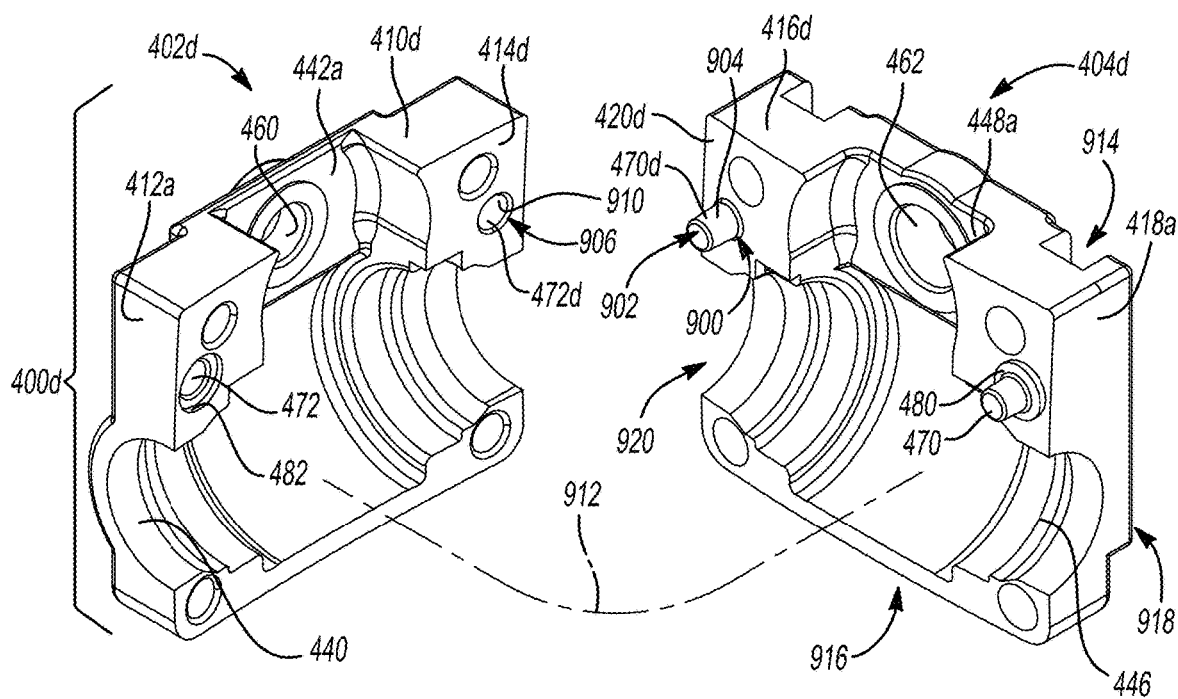
Figure 10:
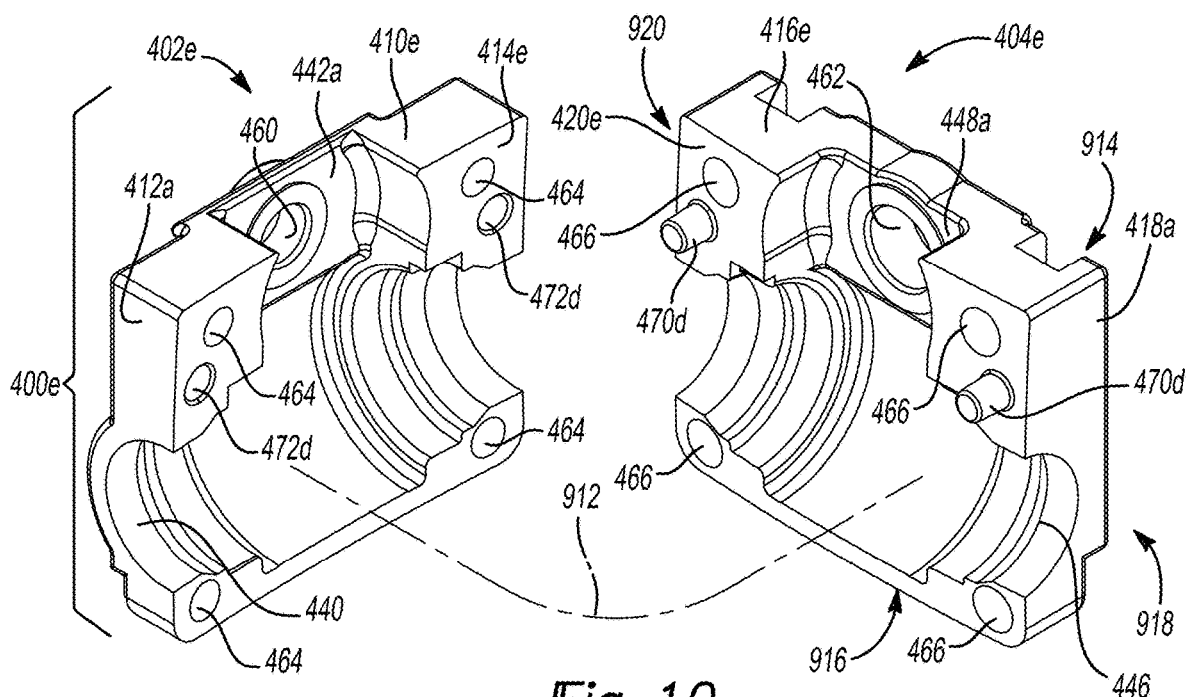
Figure 11A:
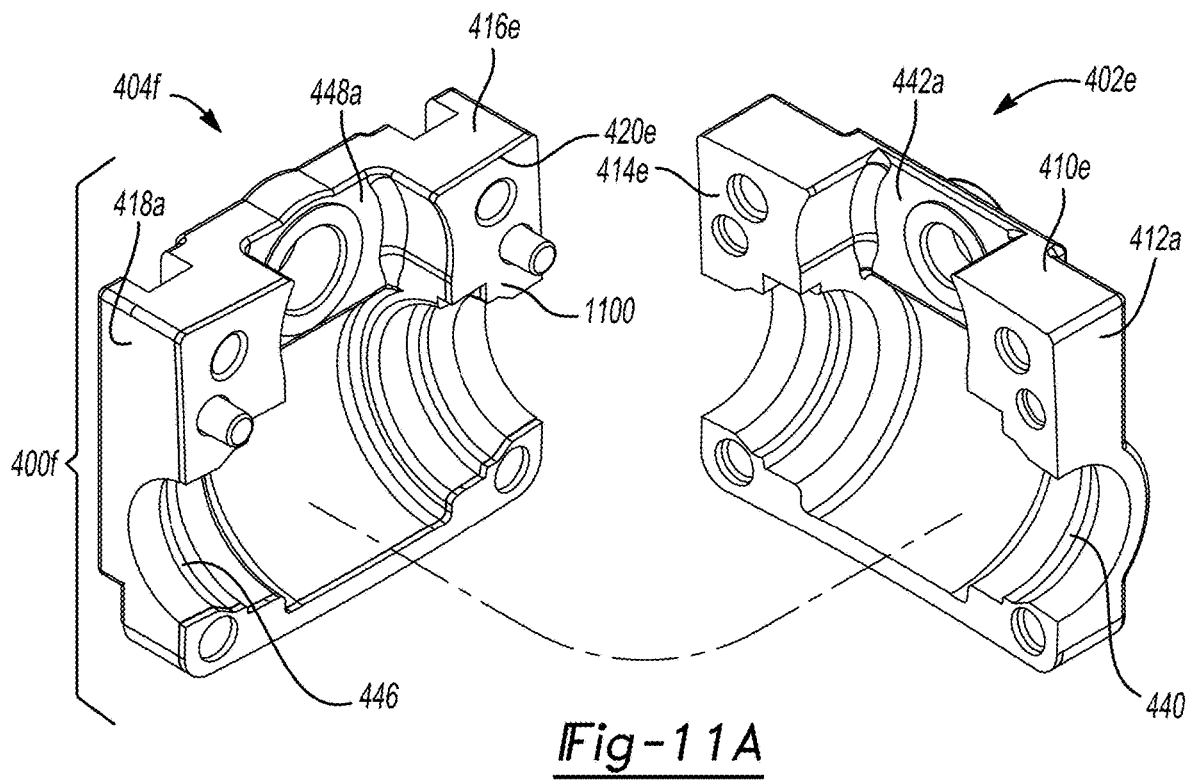
Figure 11B:
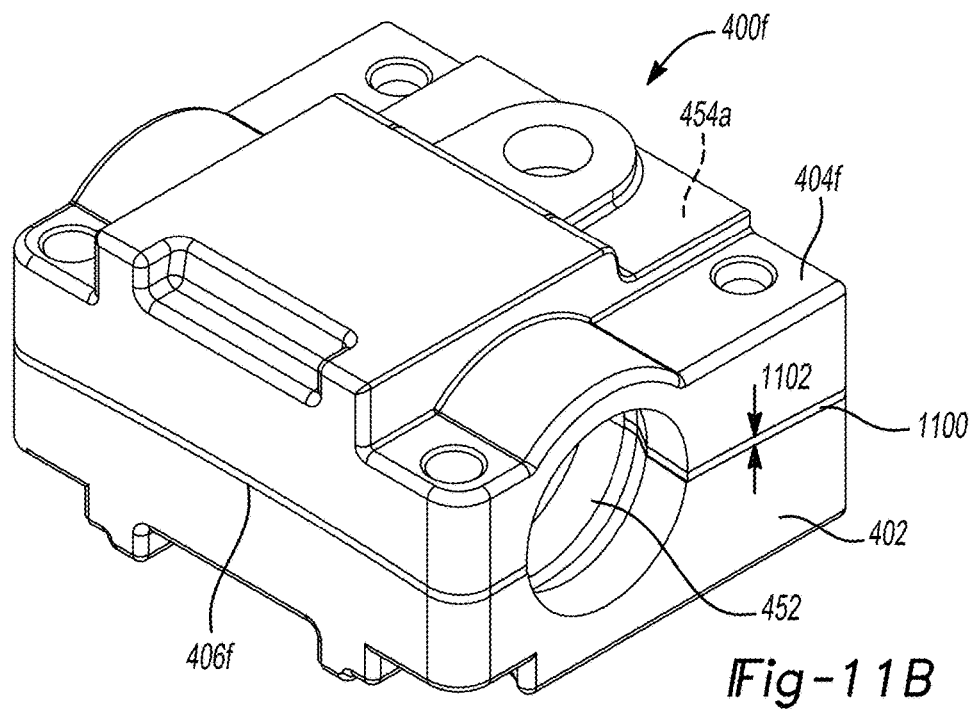
Figure 12B:
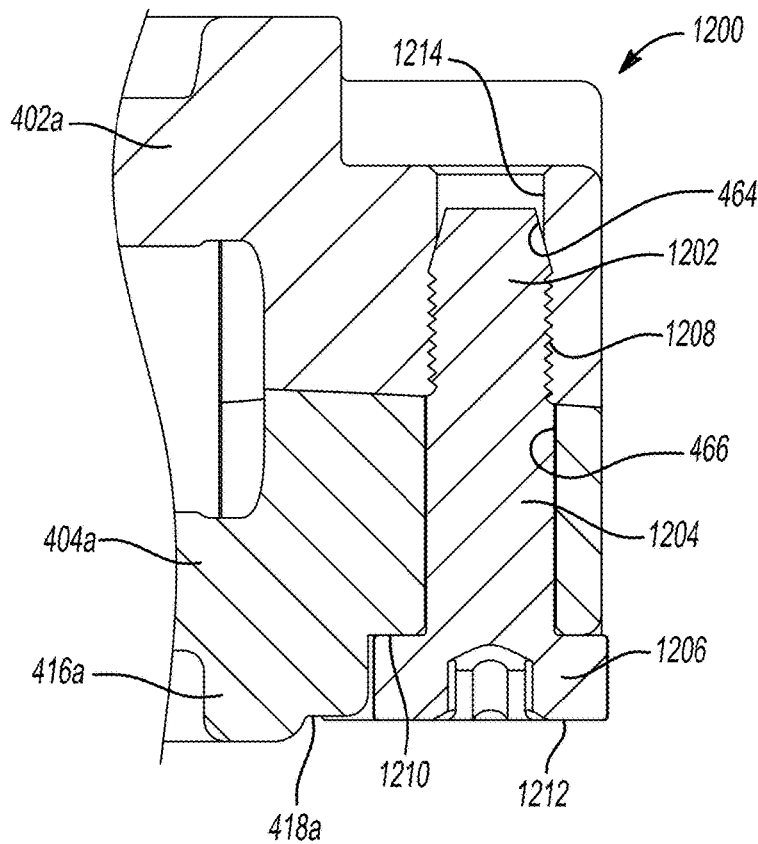
Figure 12C:
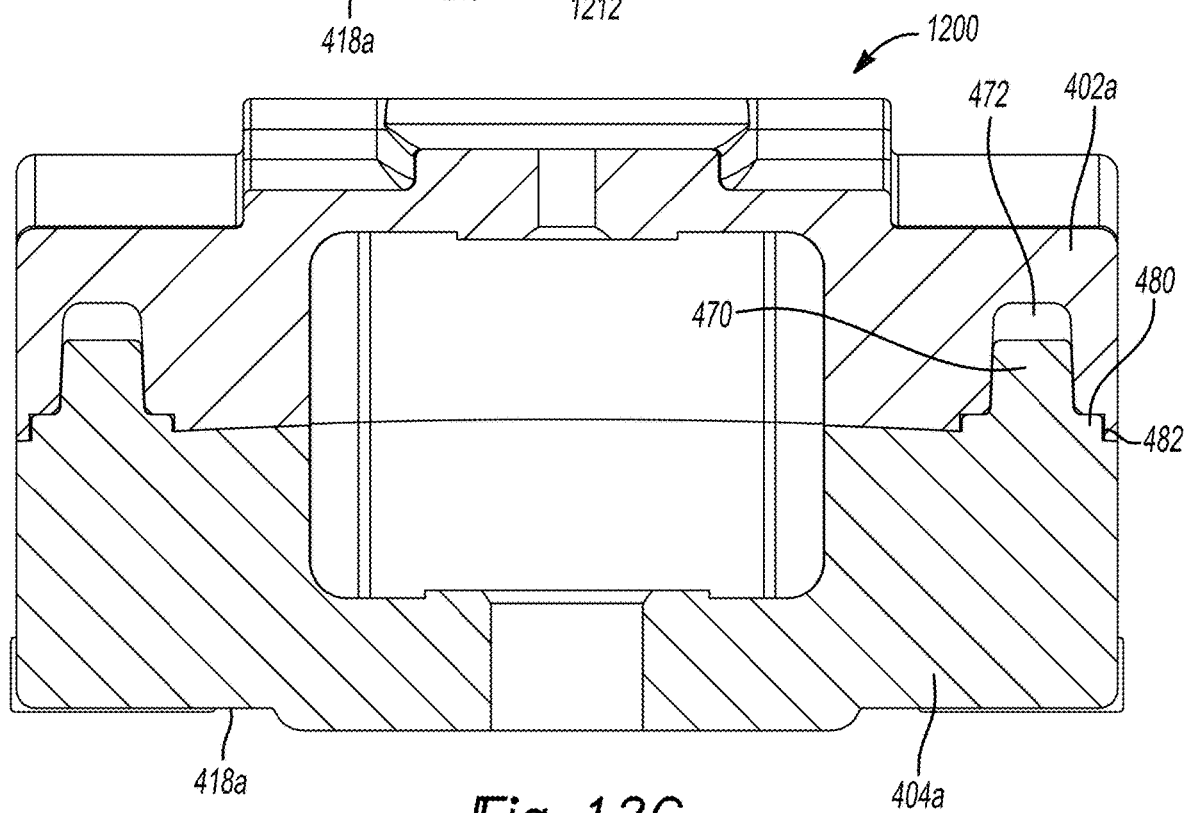
Figure 13A:
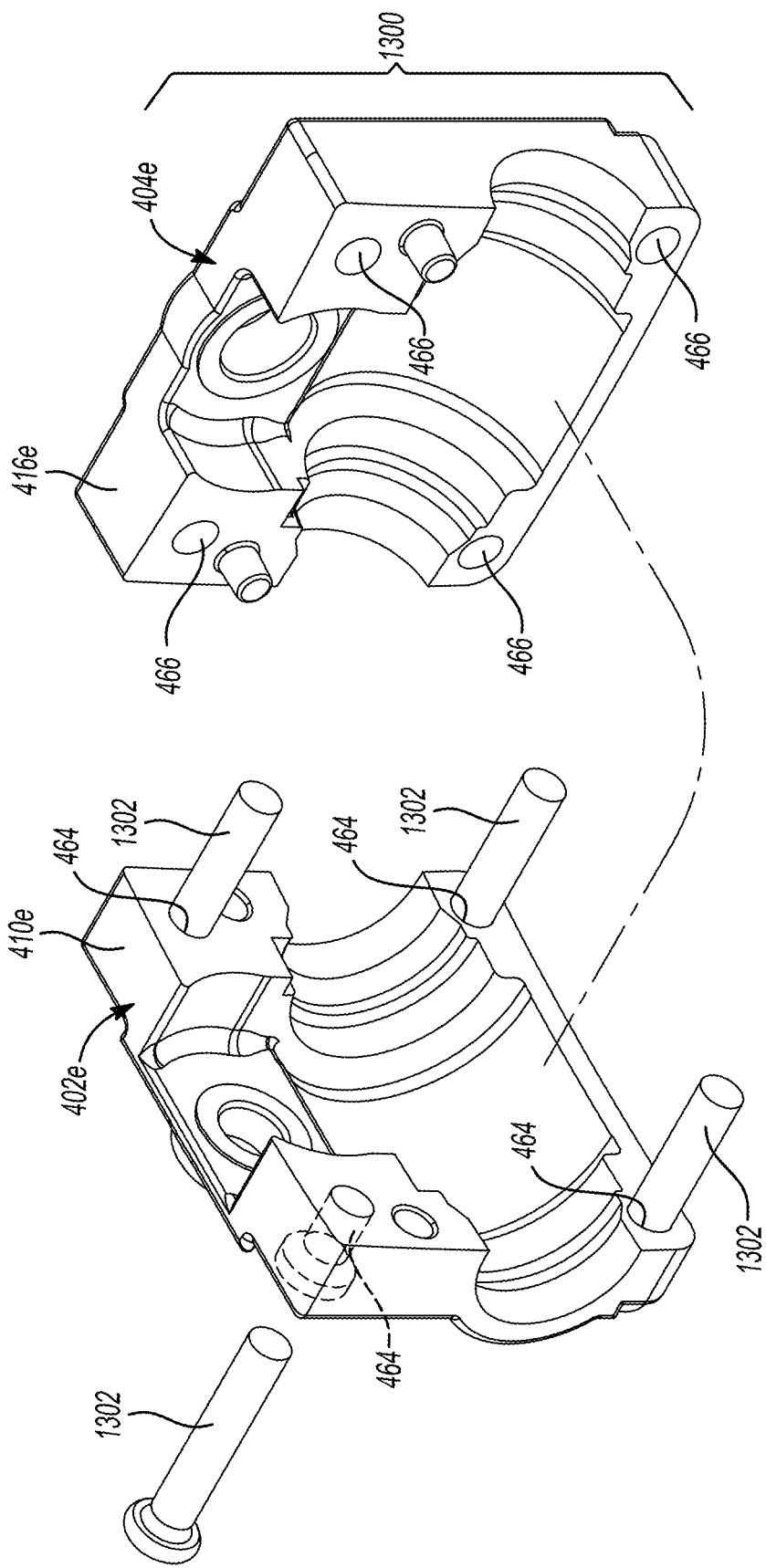
Figure 13B:
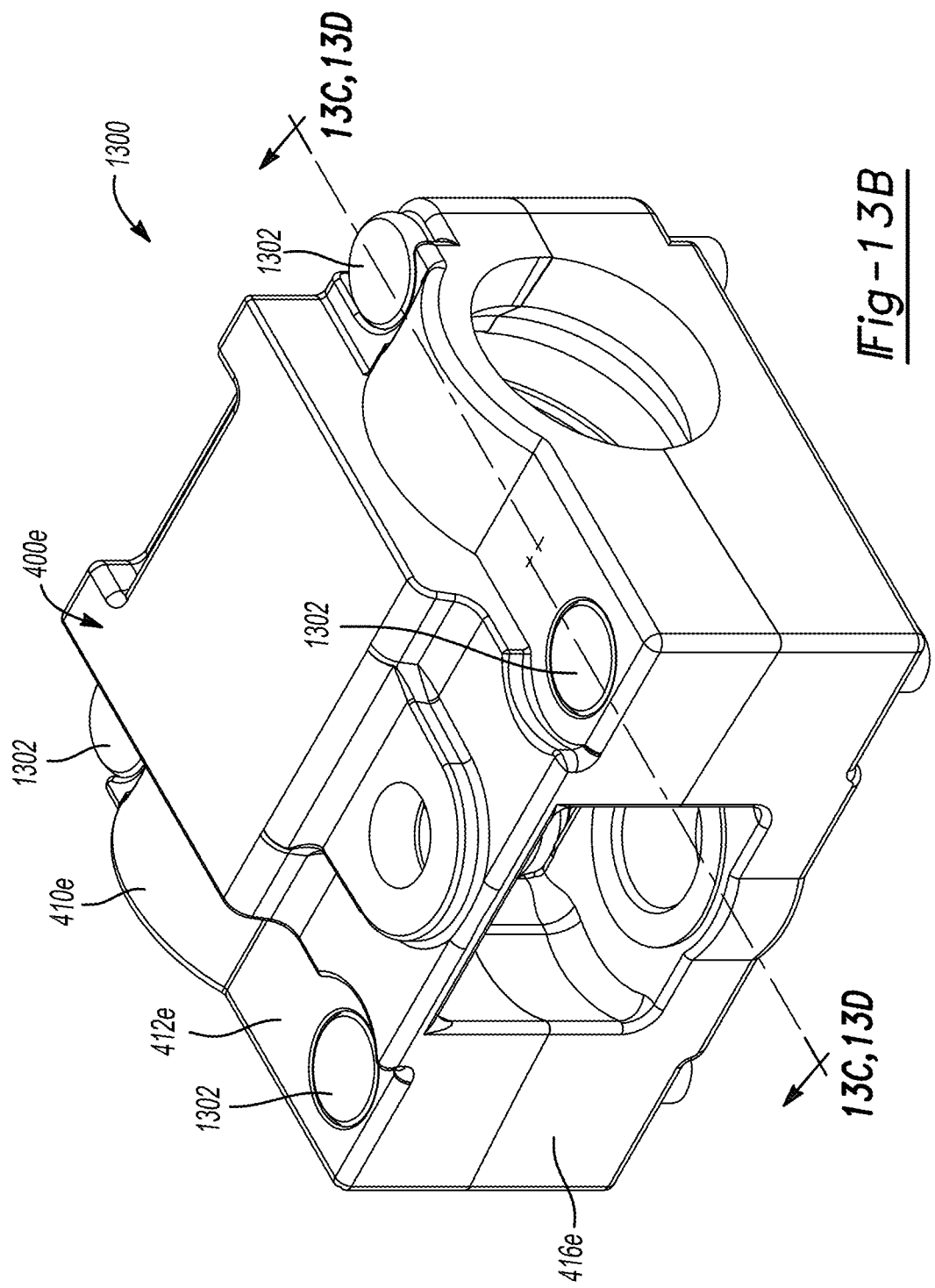
Figure 14A:
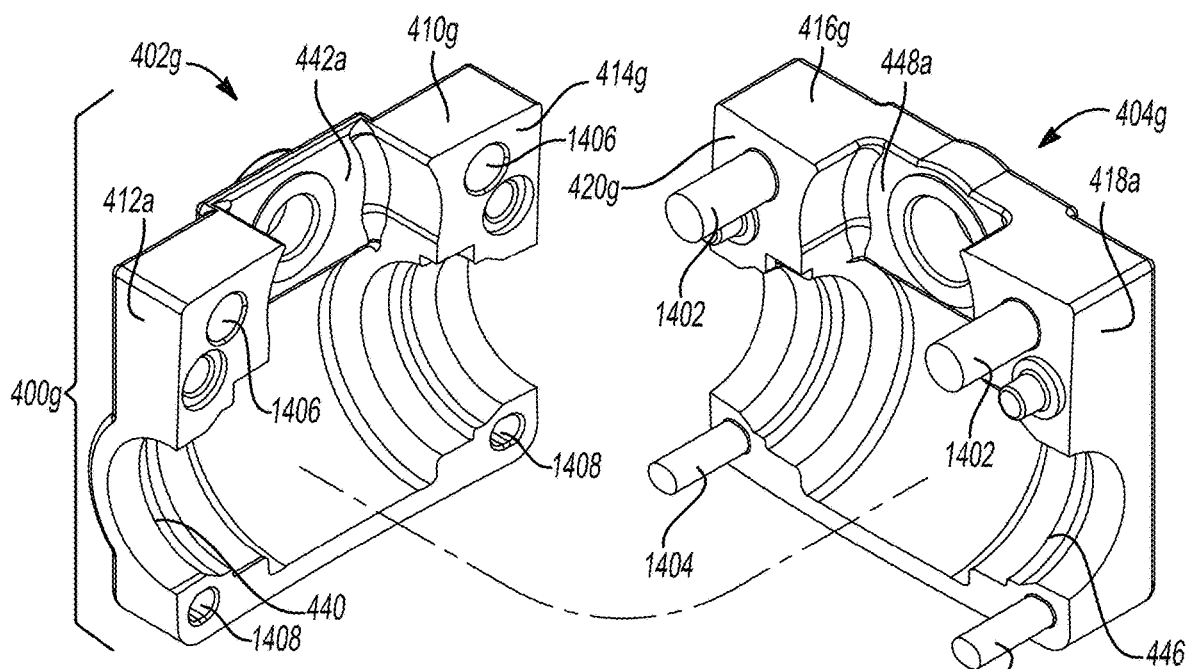
Figure 14B:
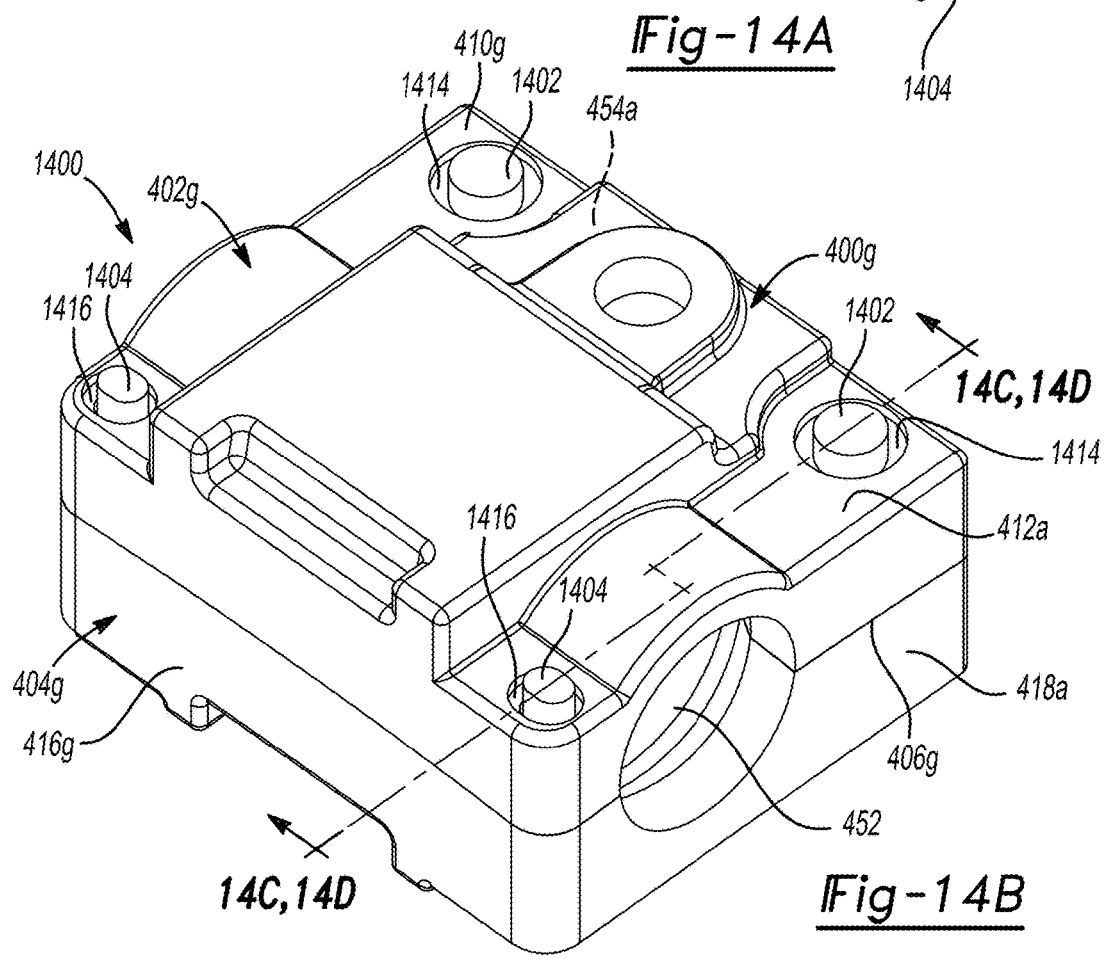
Figure 15A:
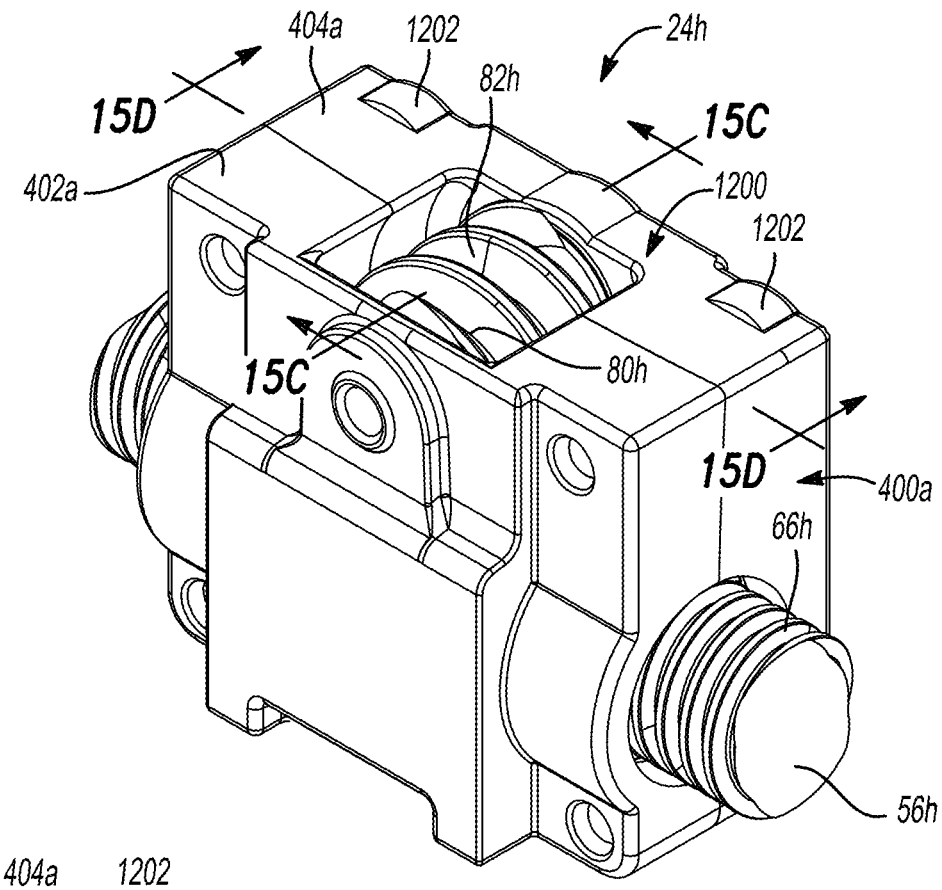
Figure 15B:
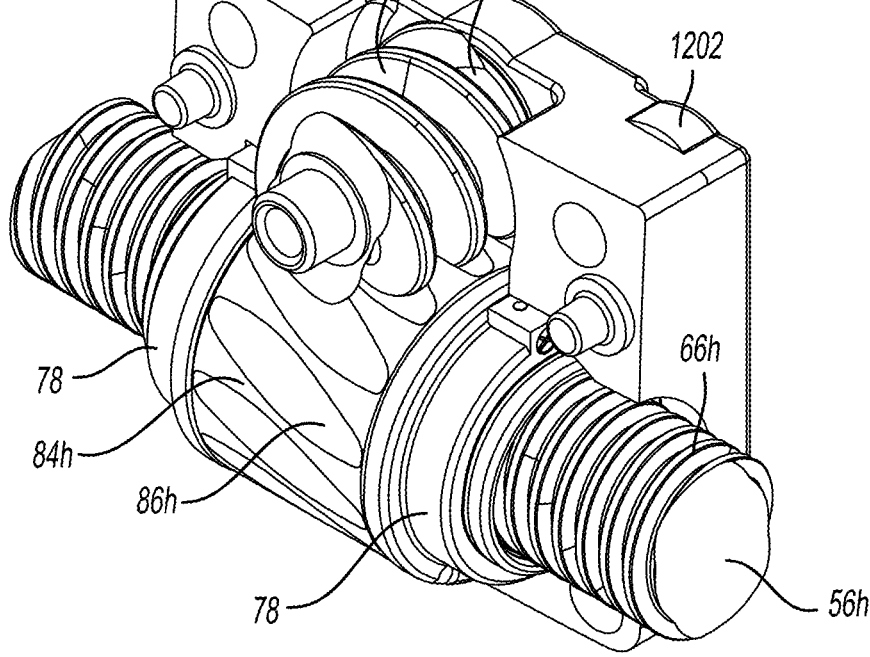
Figure 15C:
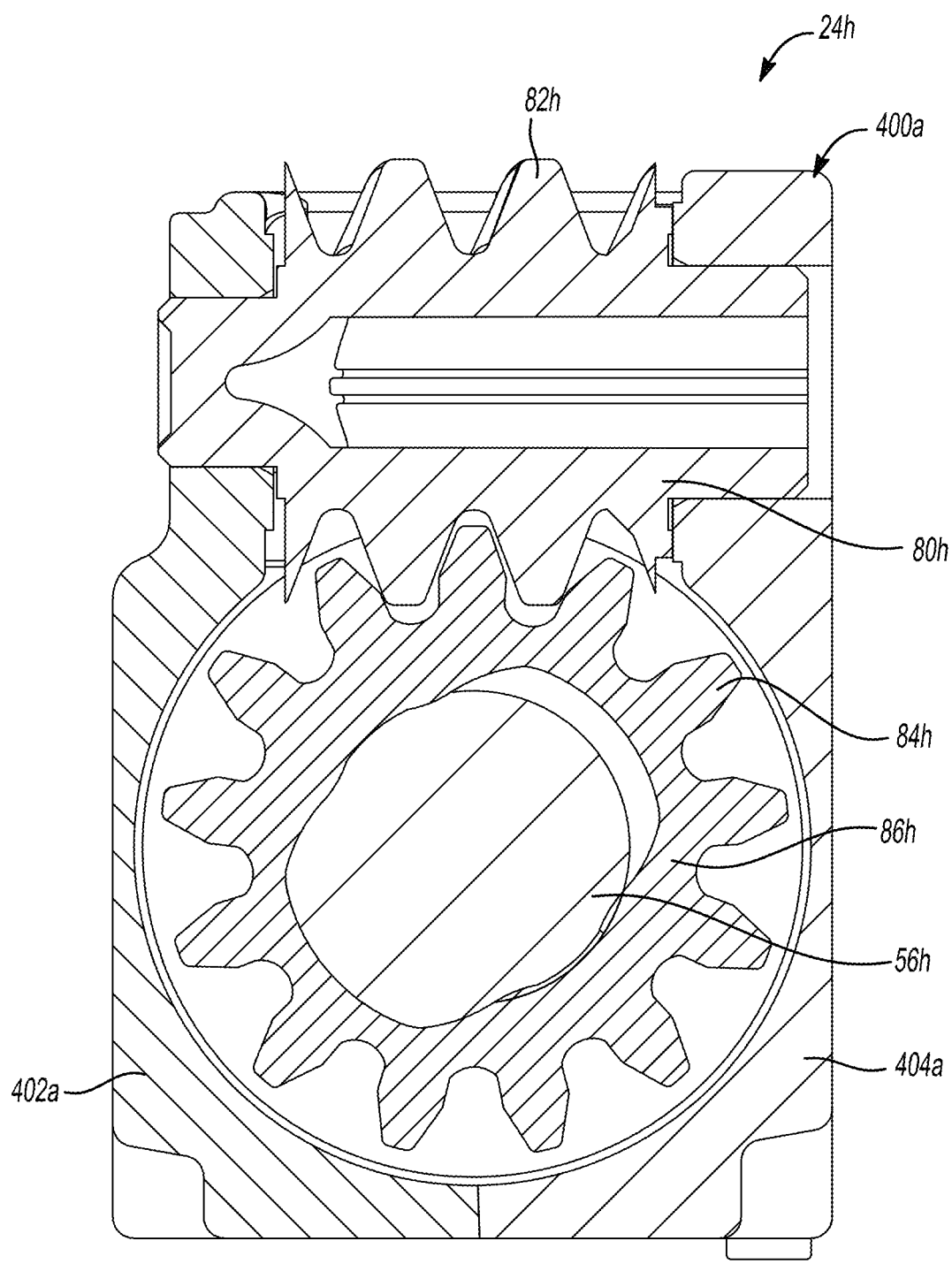
Figure 16A:
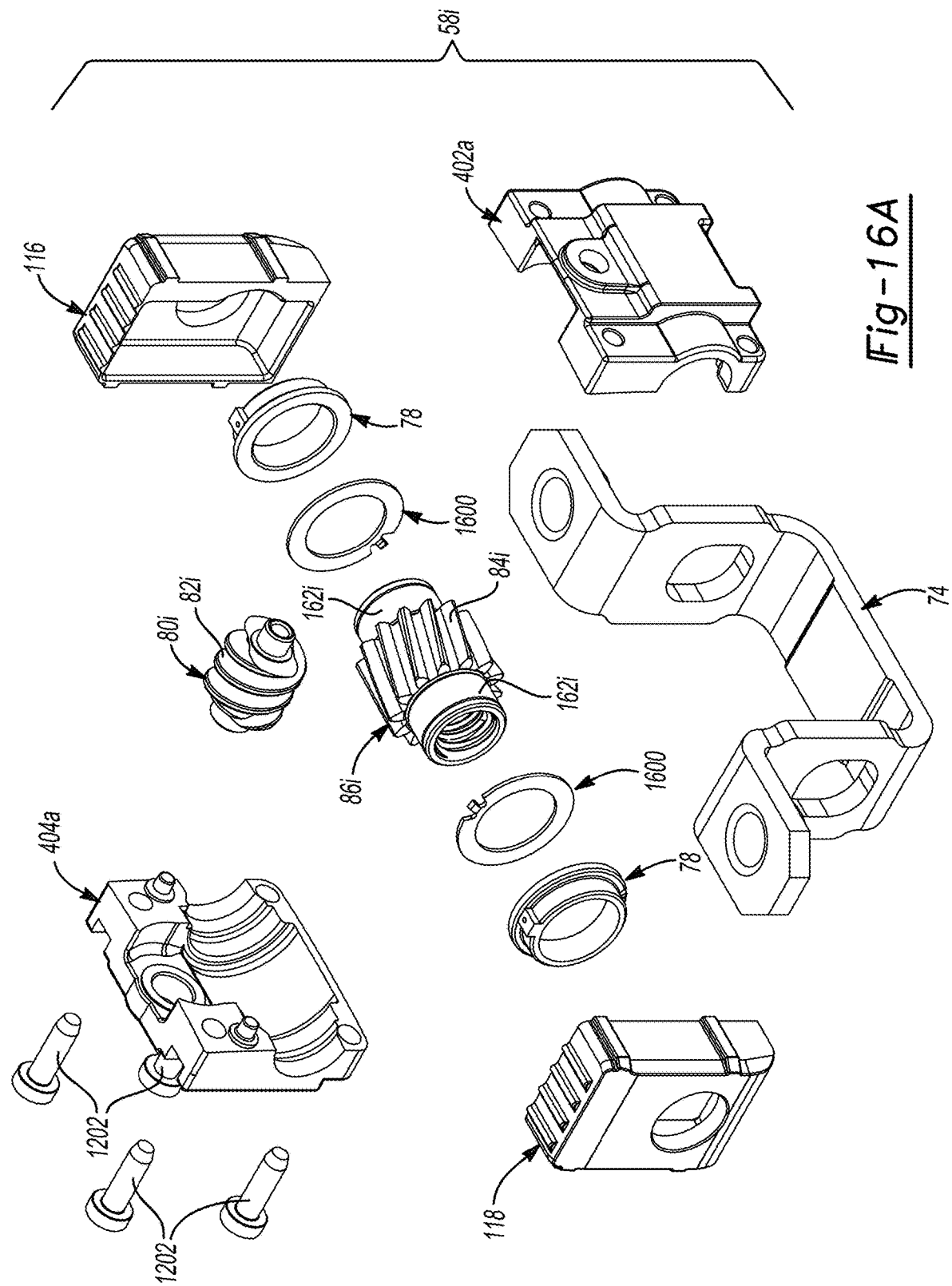
Figure 16B:
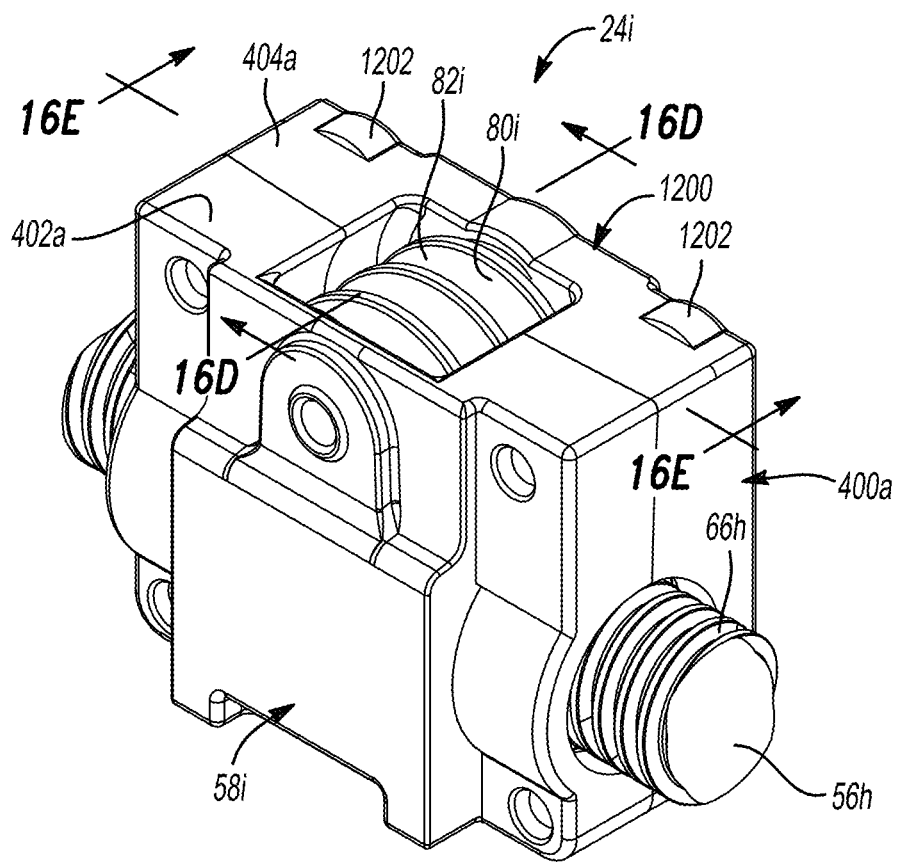
Figure 16C:
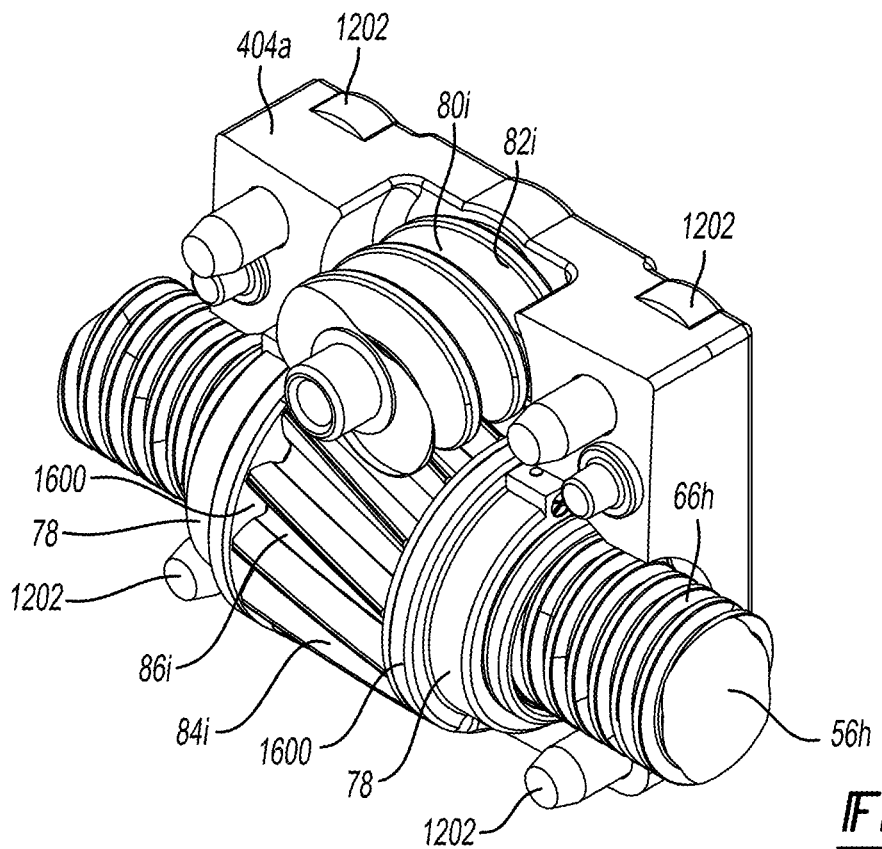
Figure 16D:
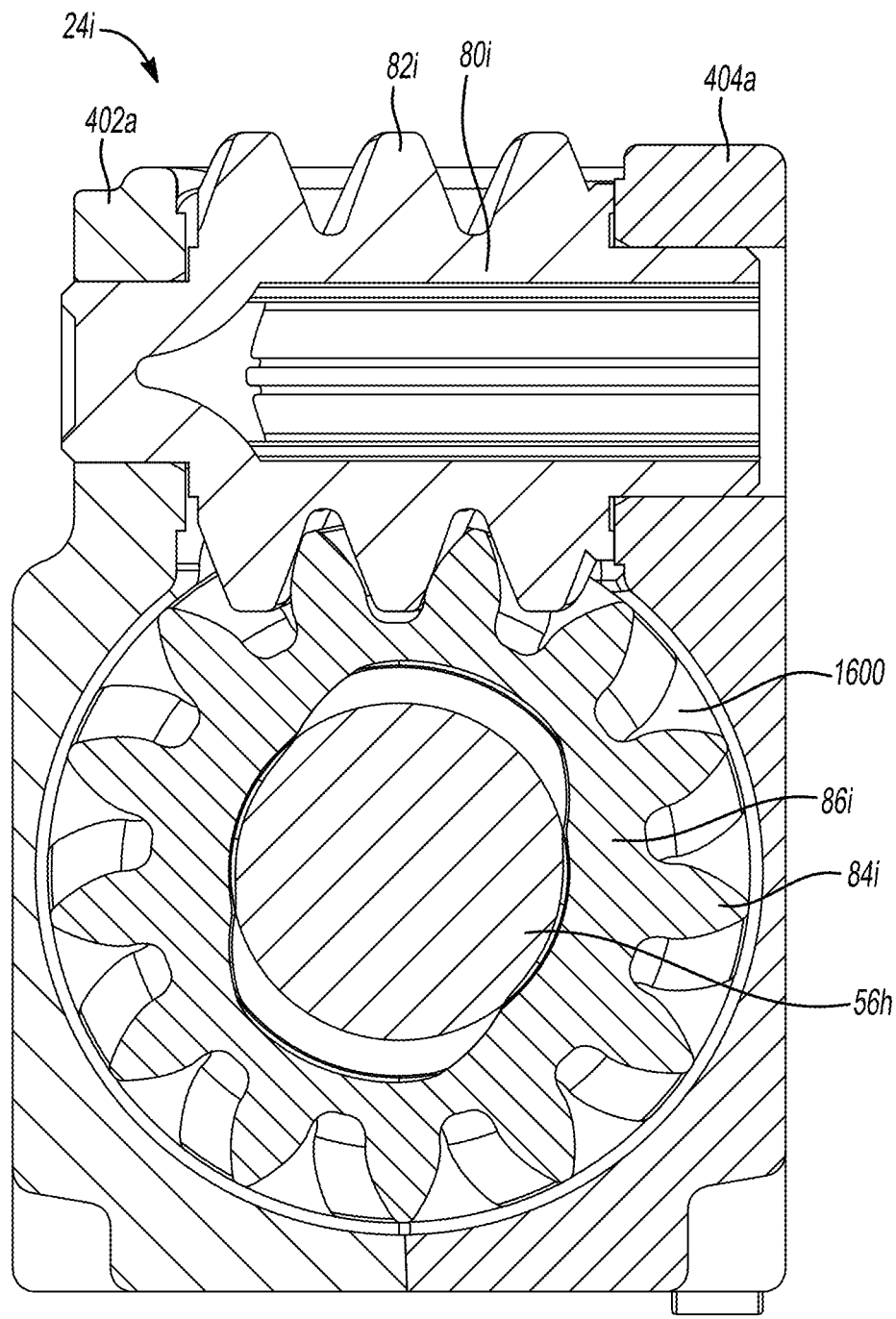
Figure 17A:
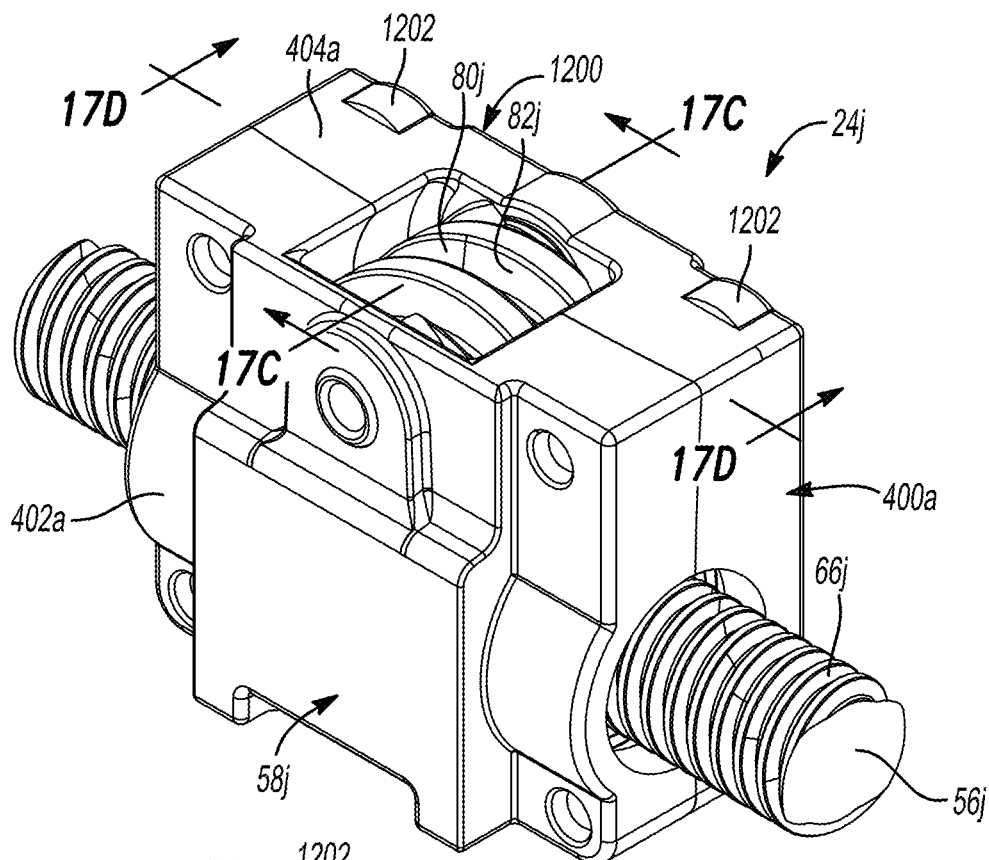
Figure 17B:
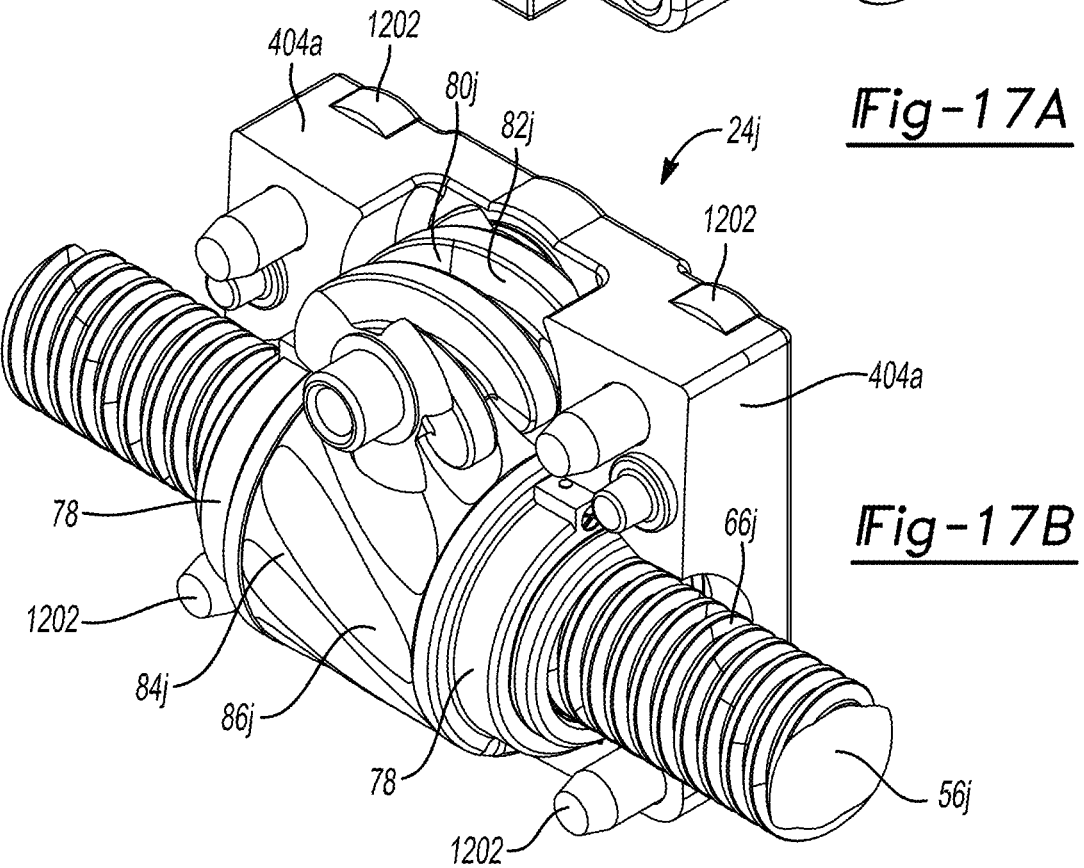
Figure 17C:
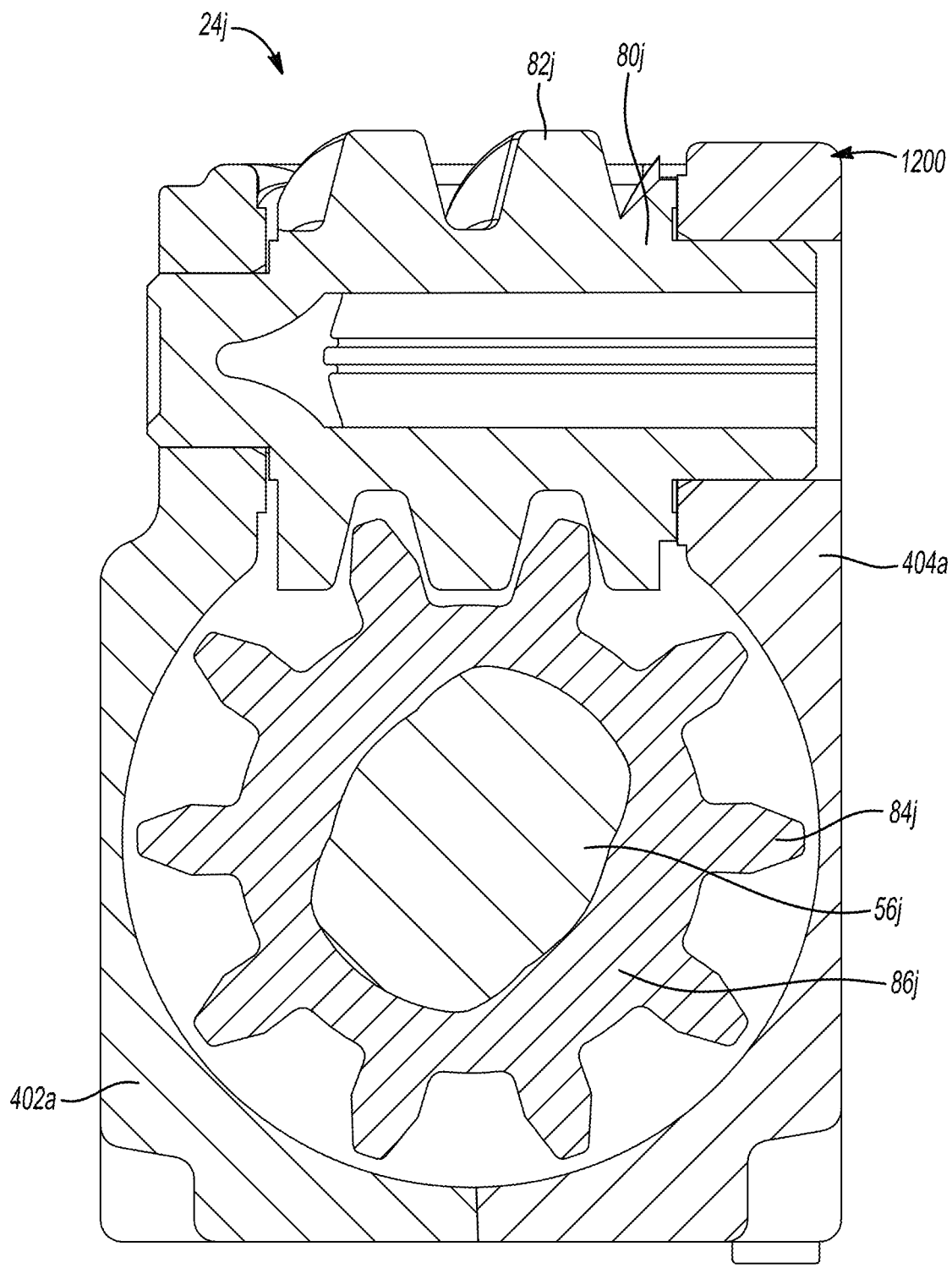
Figure 17D:
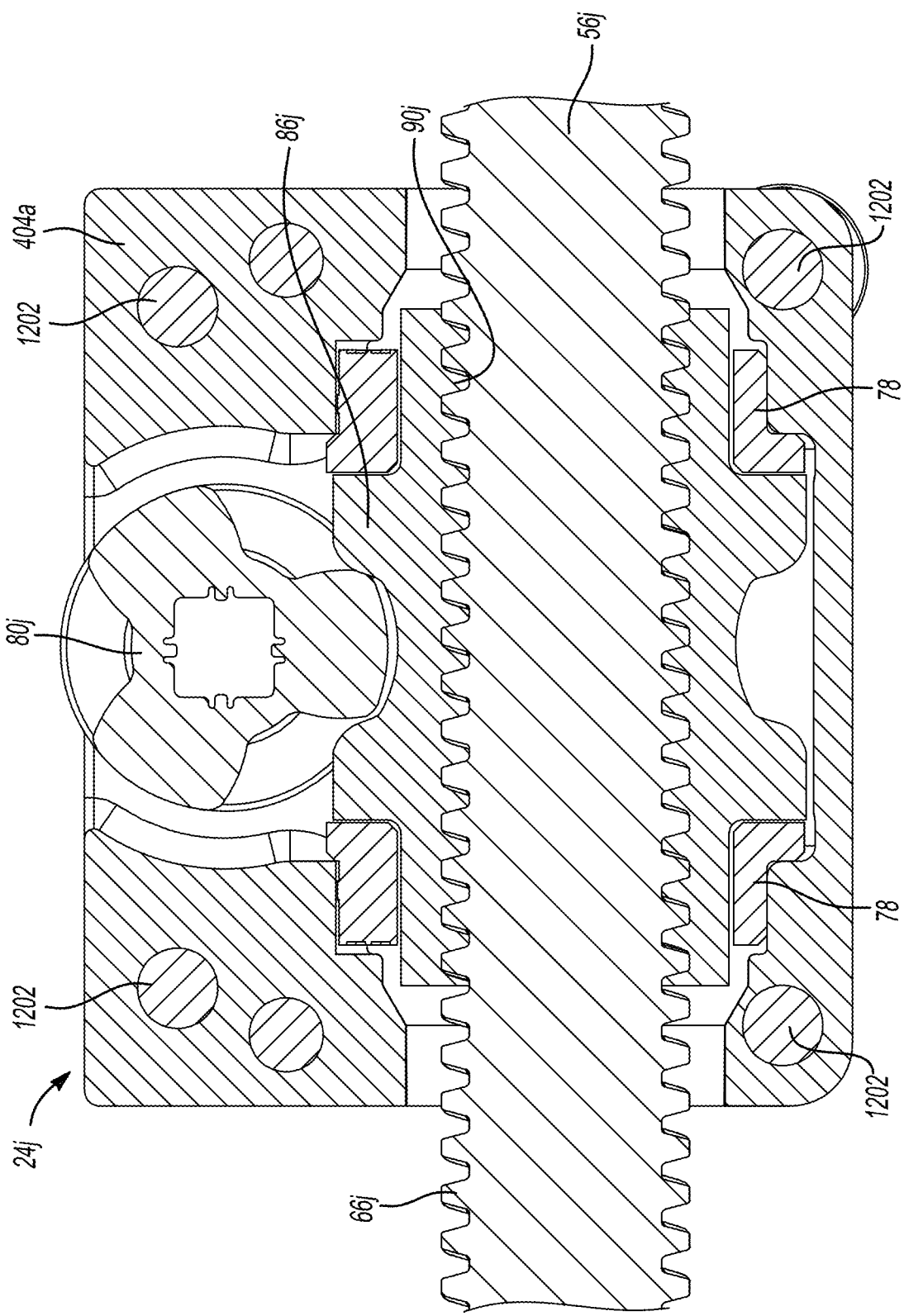
Figure 18A:
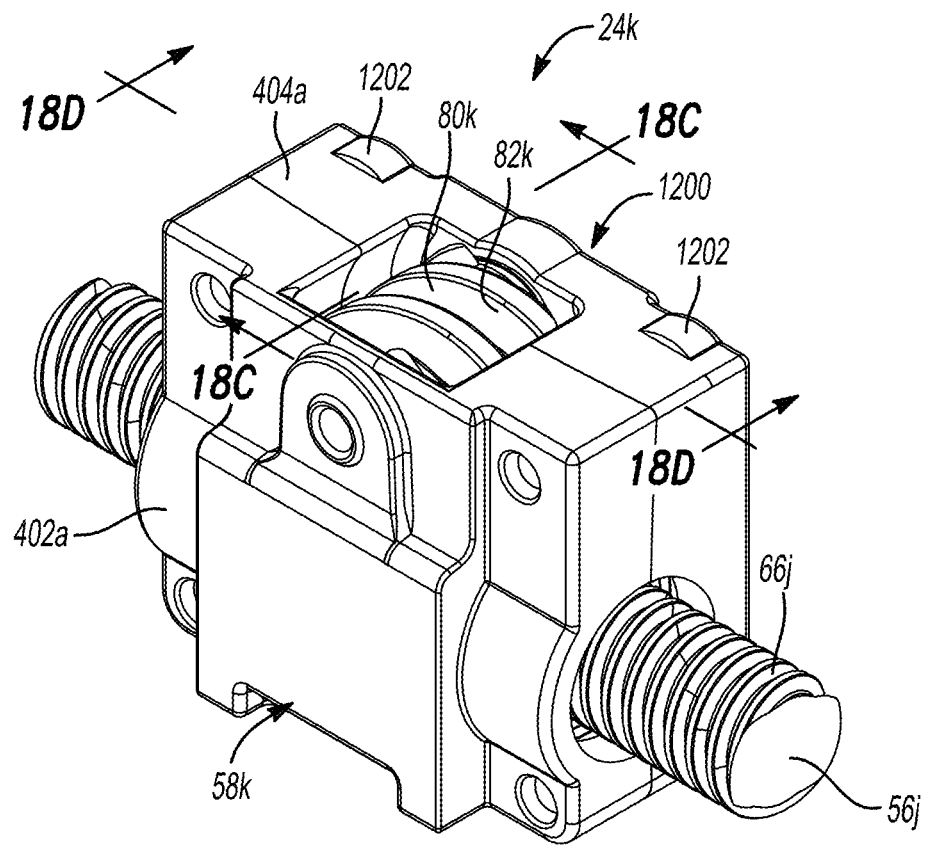
Figure 18B:
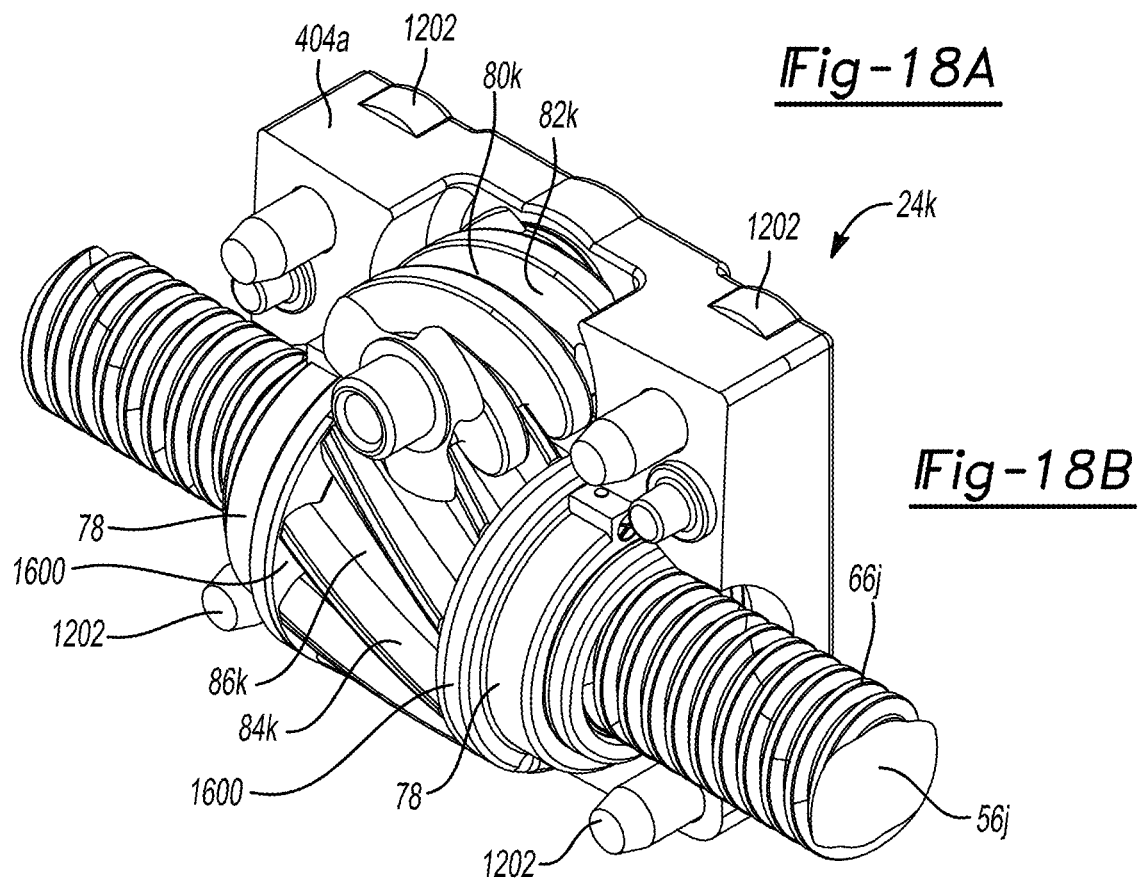
Figure 18C:
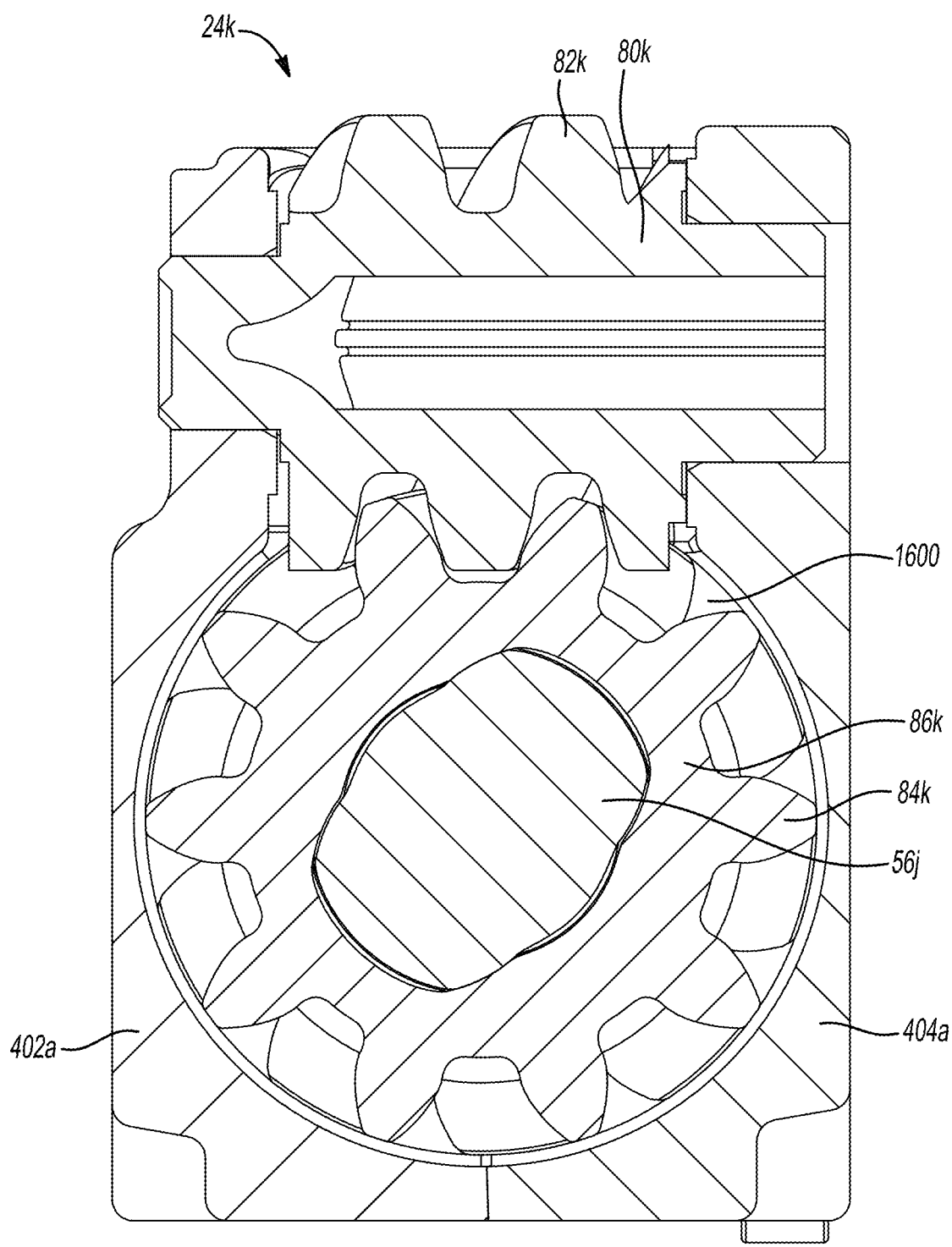
Figure 18D:
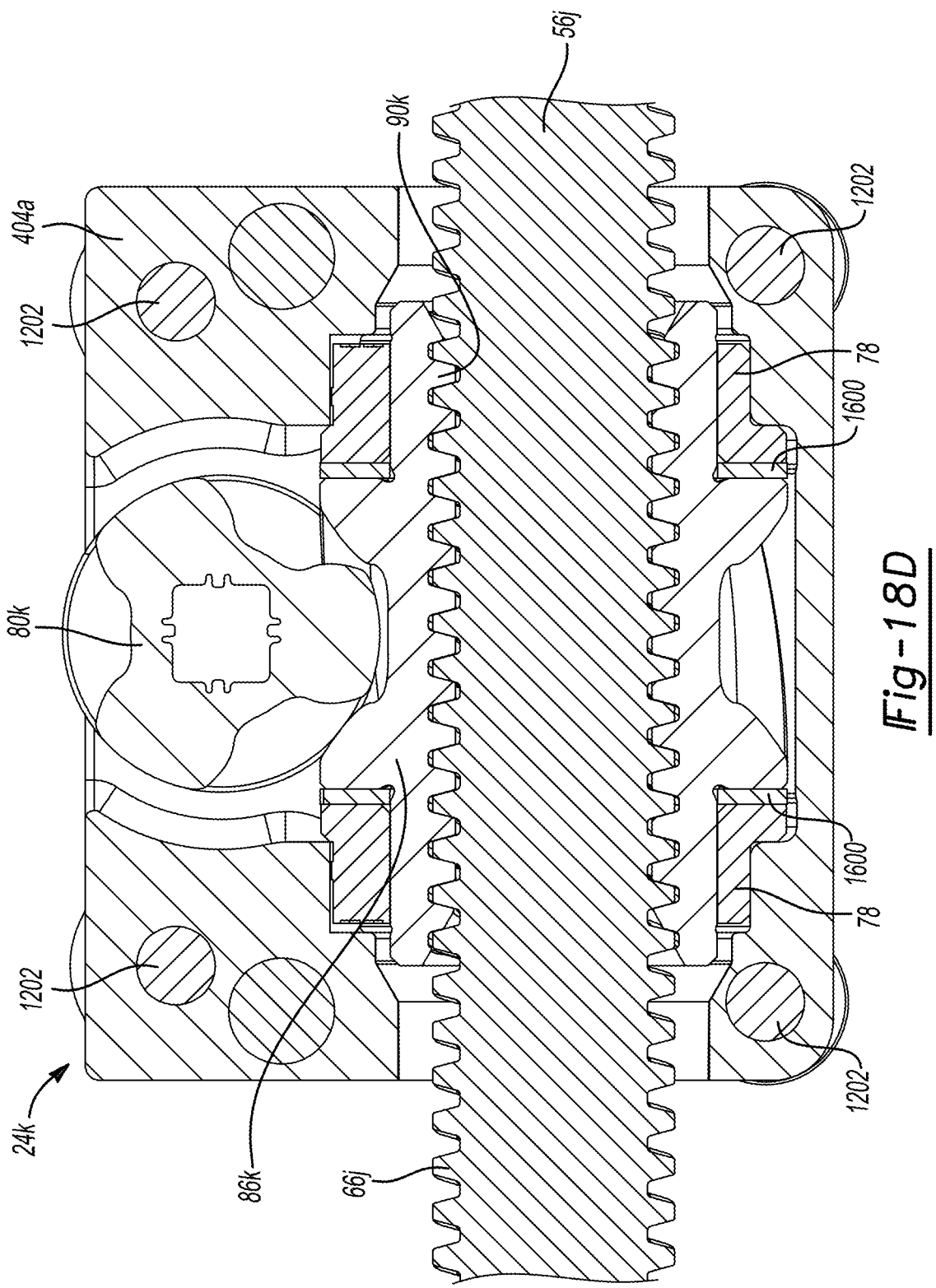
Figure 19A:
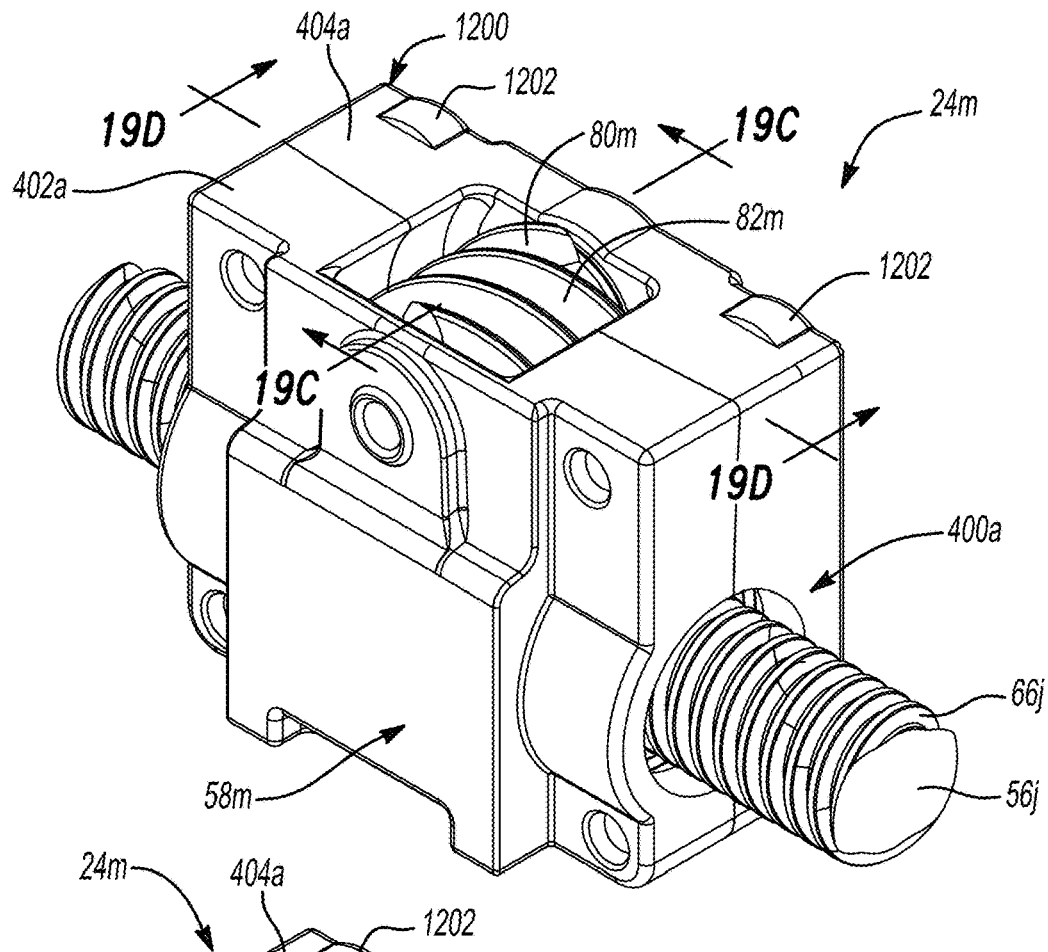
Figure 19B:
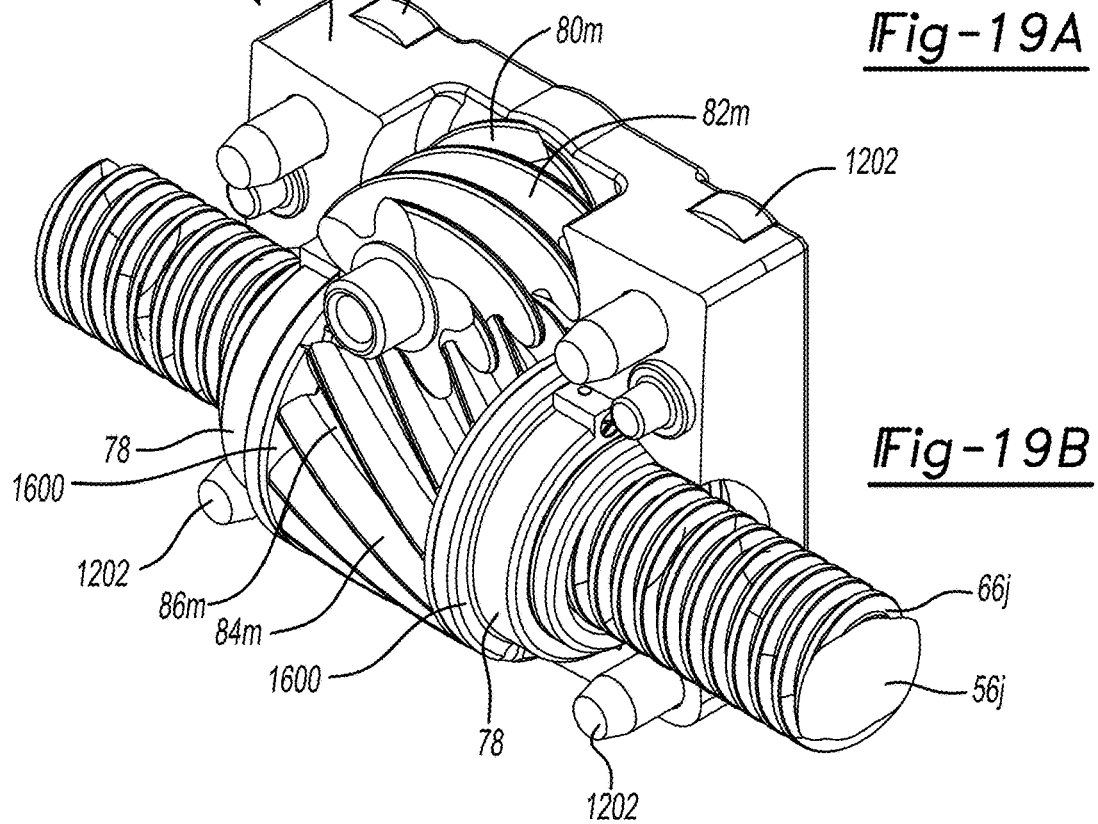
Figure 19C:
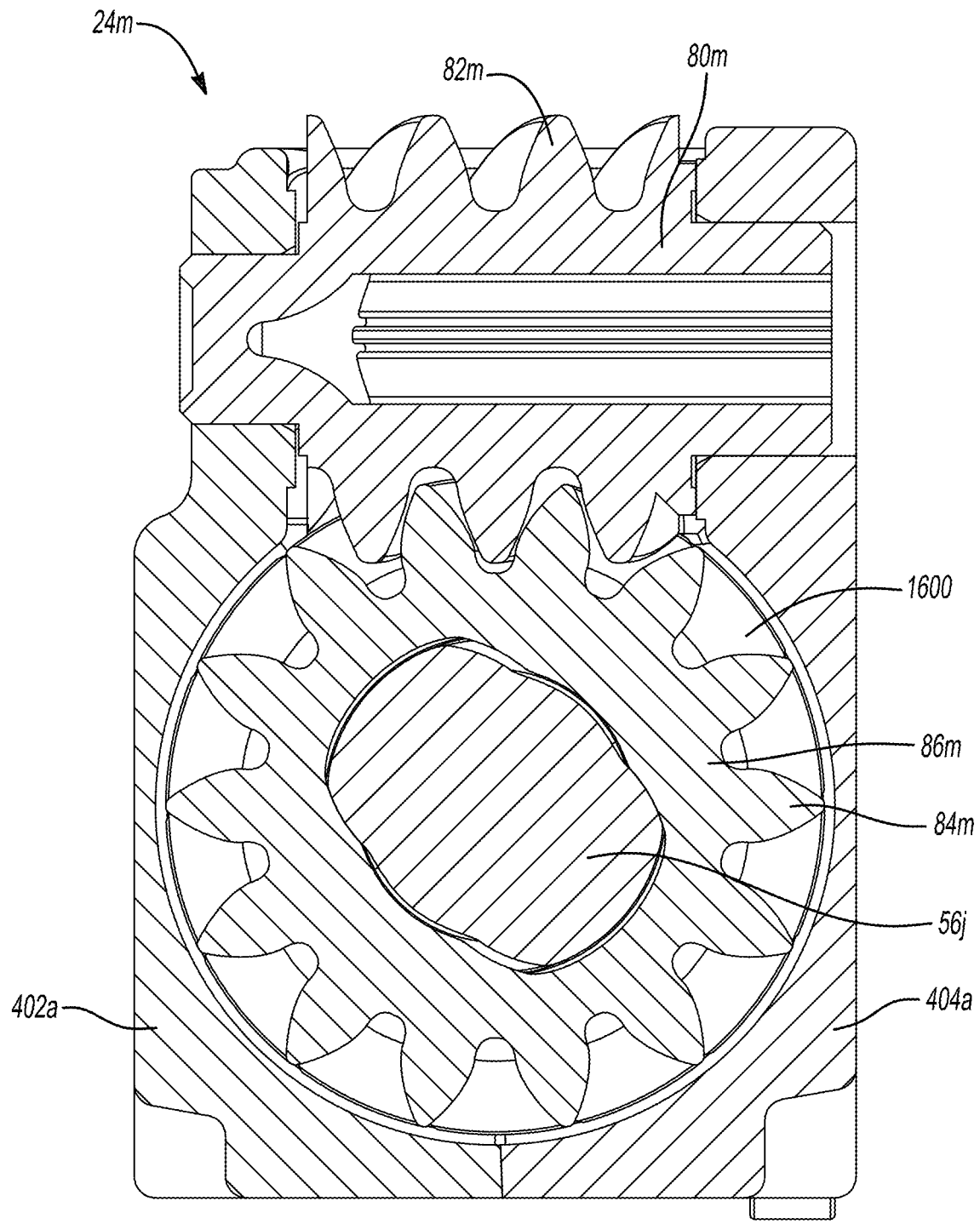
Figure 19D:
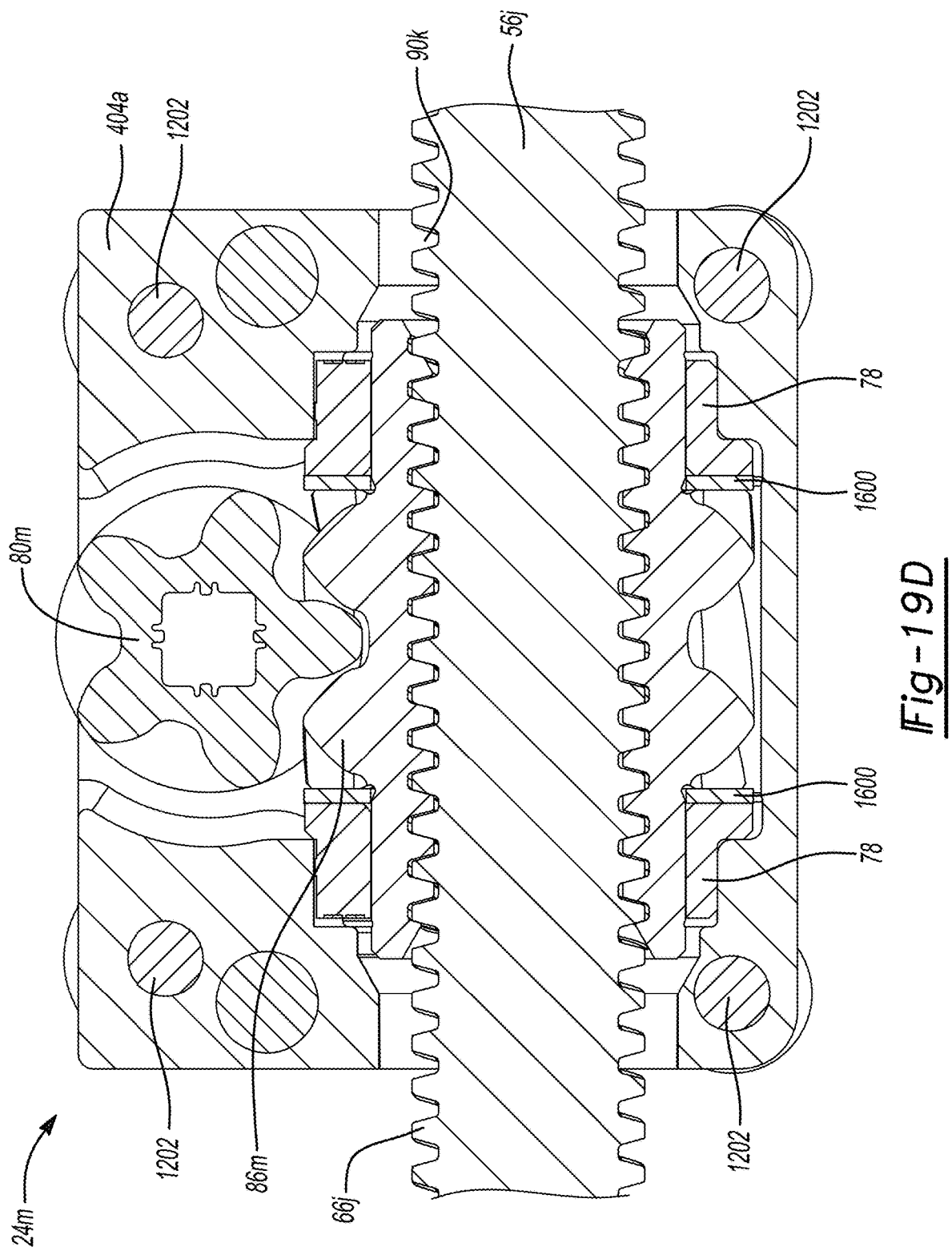
Figure 20A:
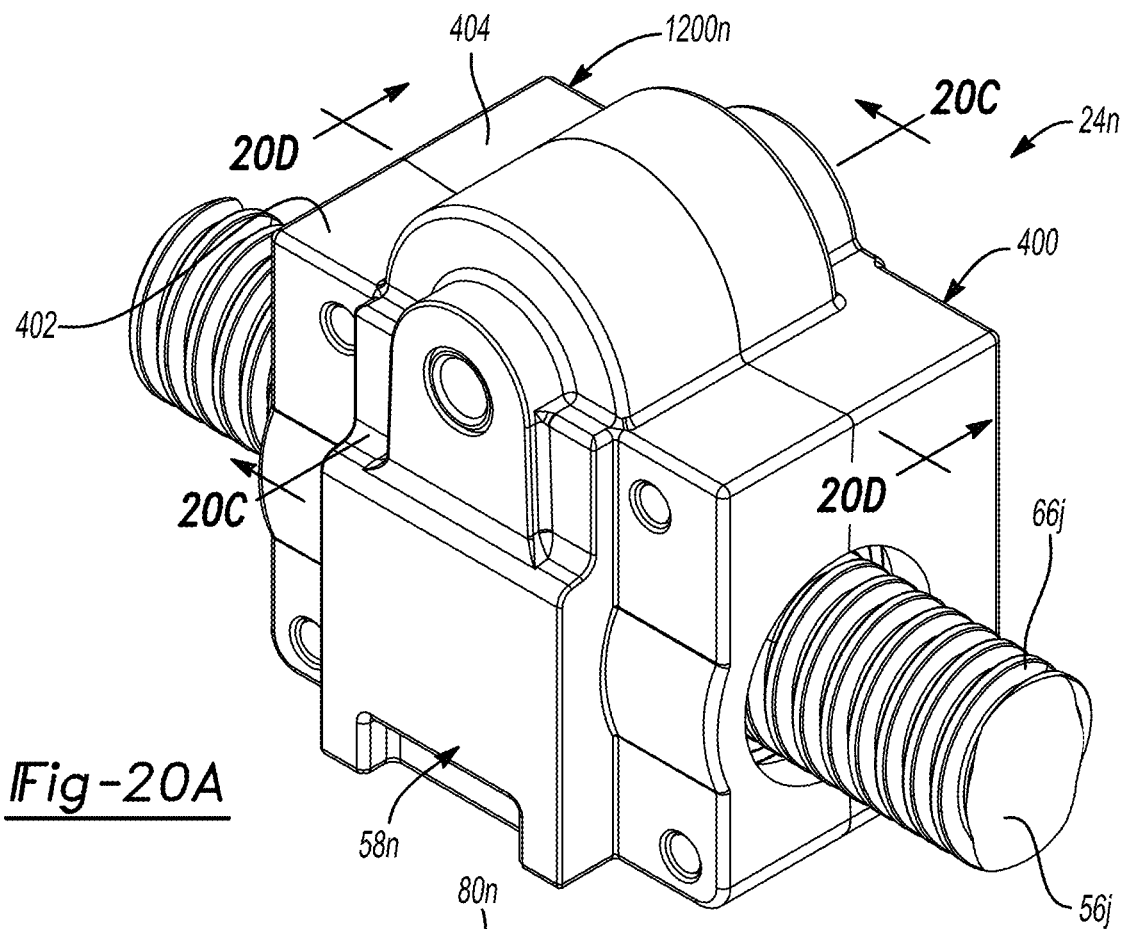
Figure 20B:
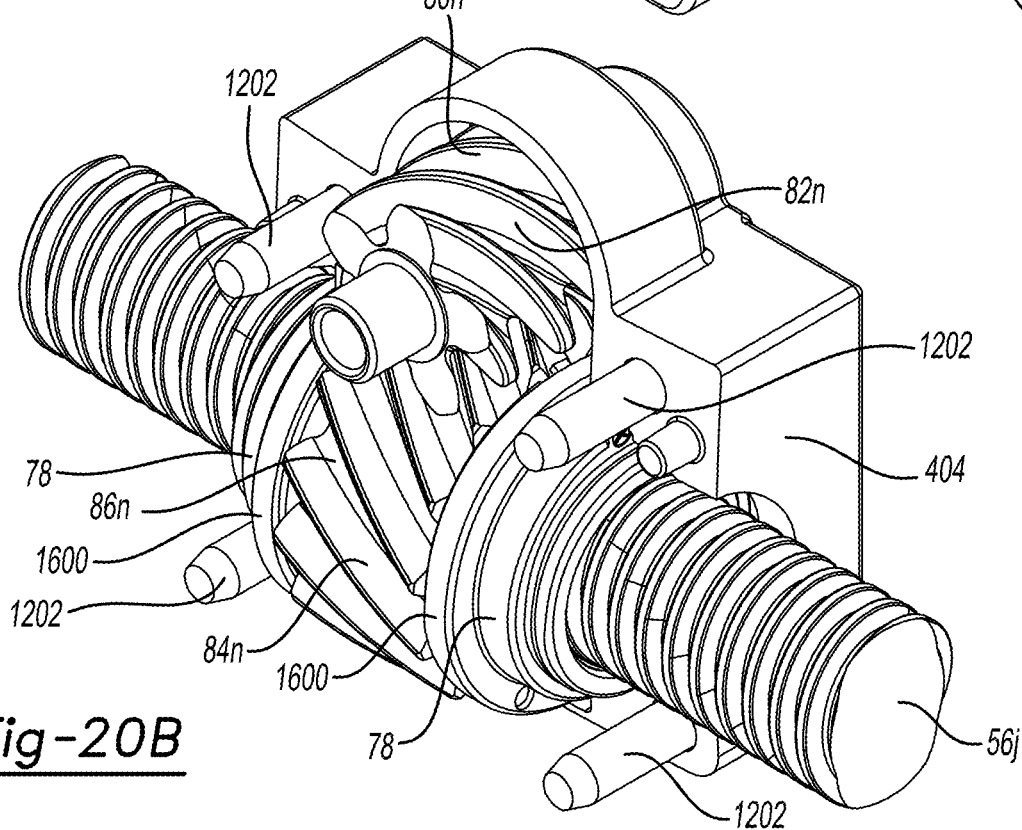
Figure 20C:
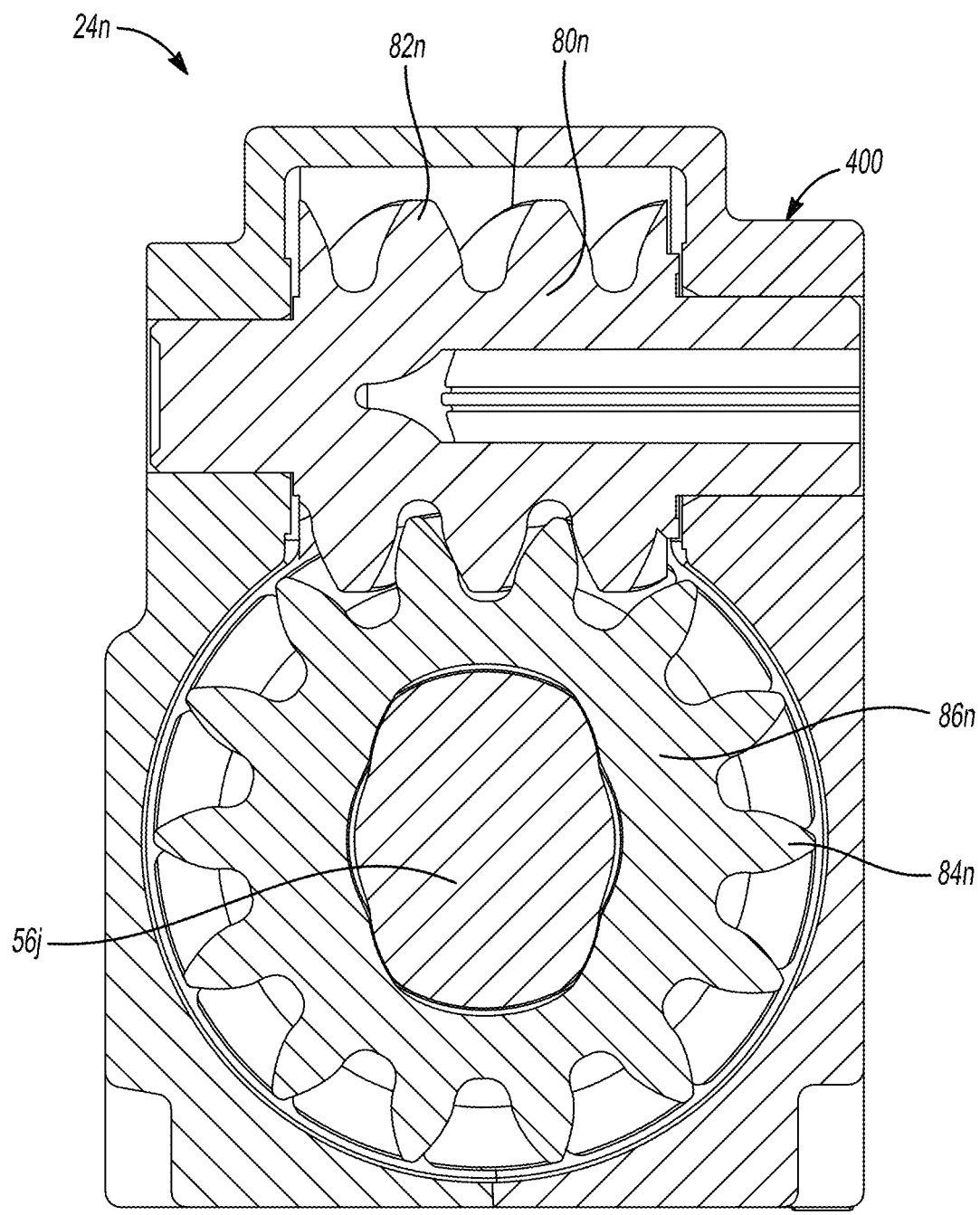
Figure 21A:
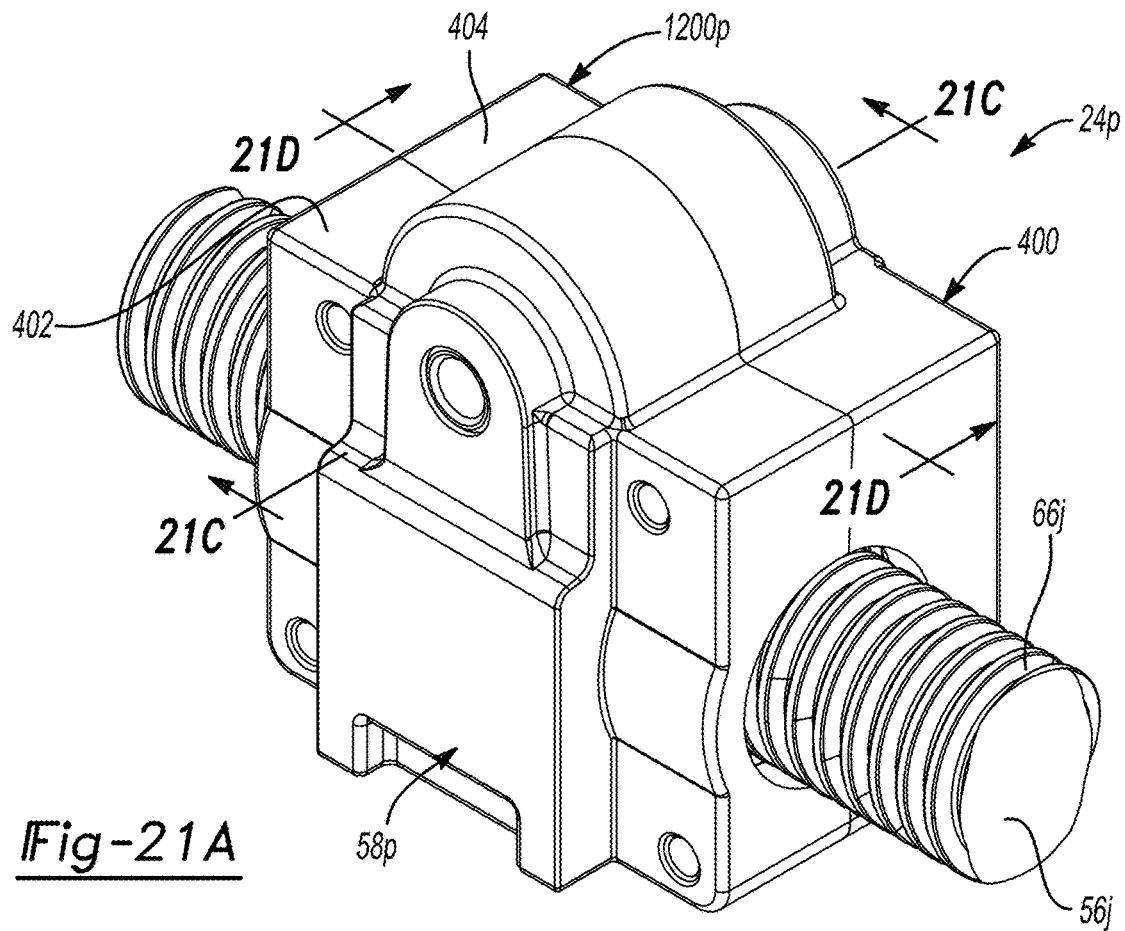
Figure 21B:
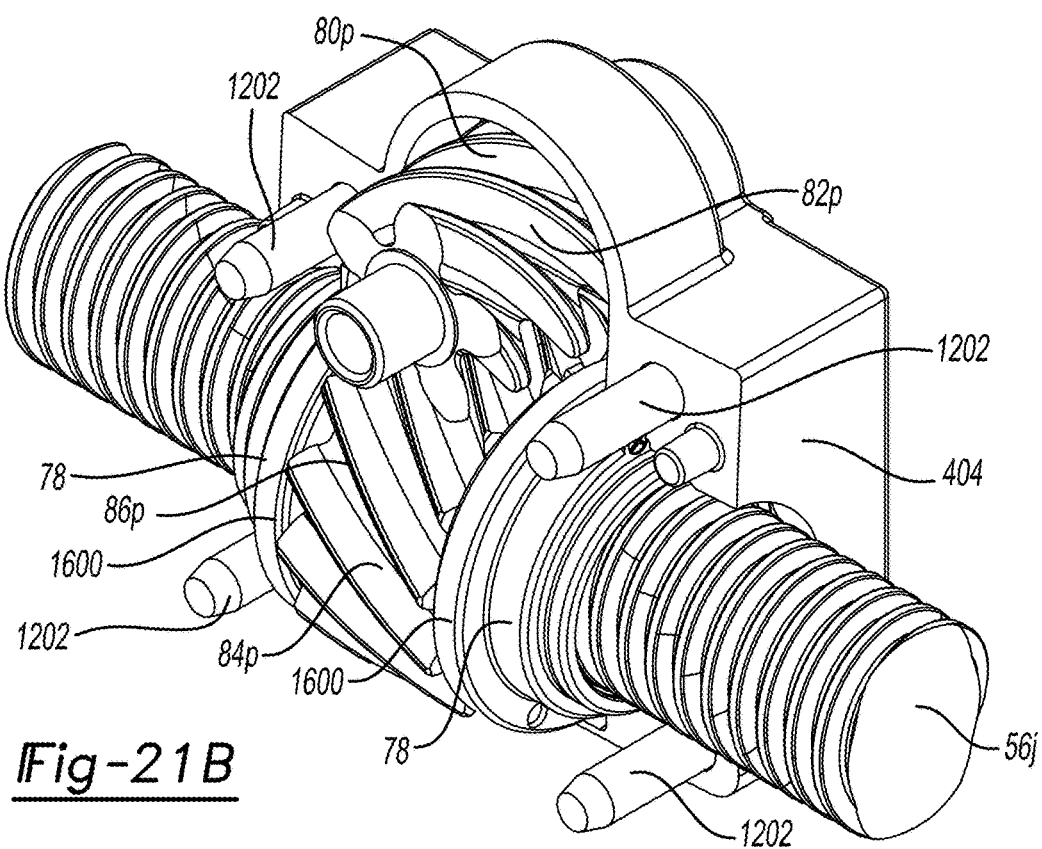
Figure 21C:
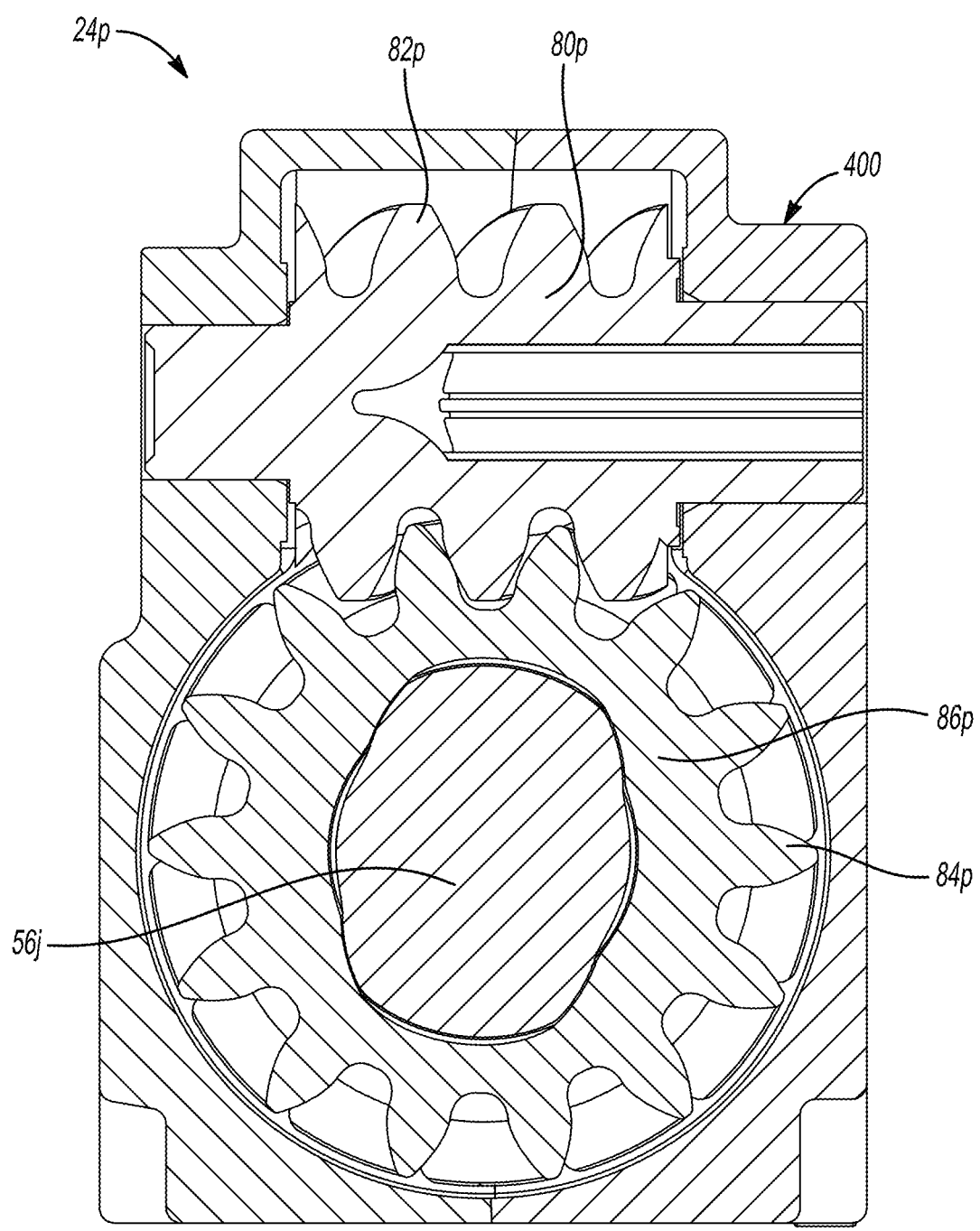
Figure 21D:
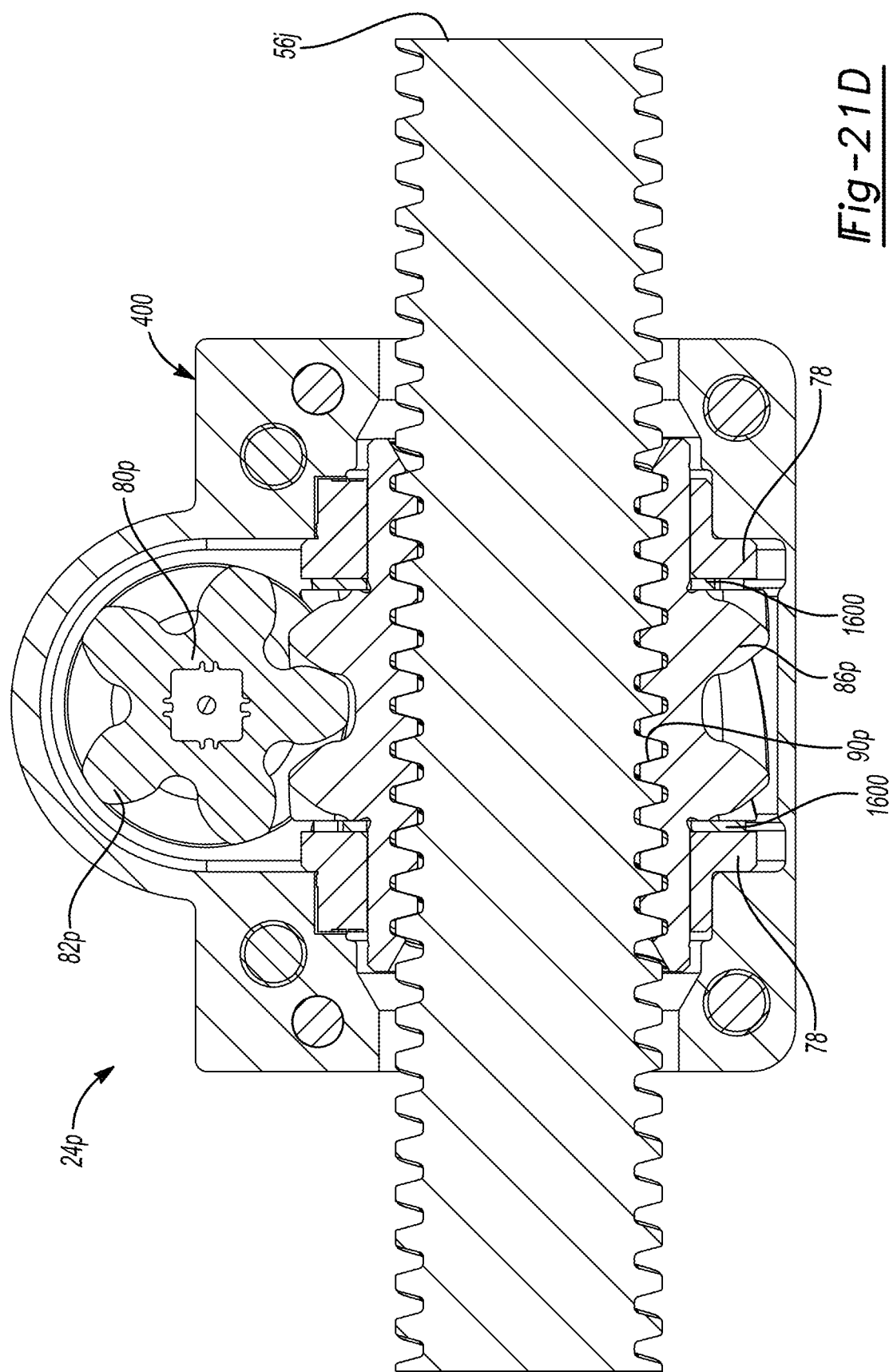
Figure 22:
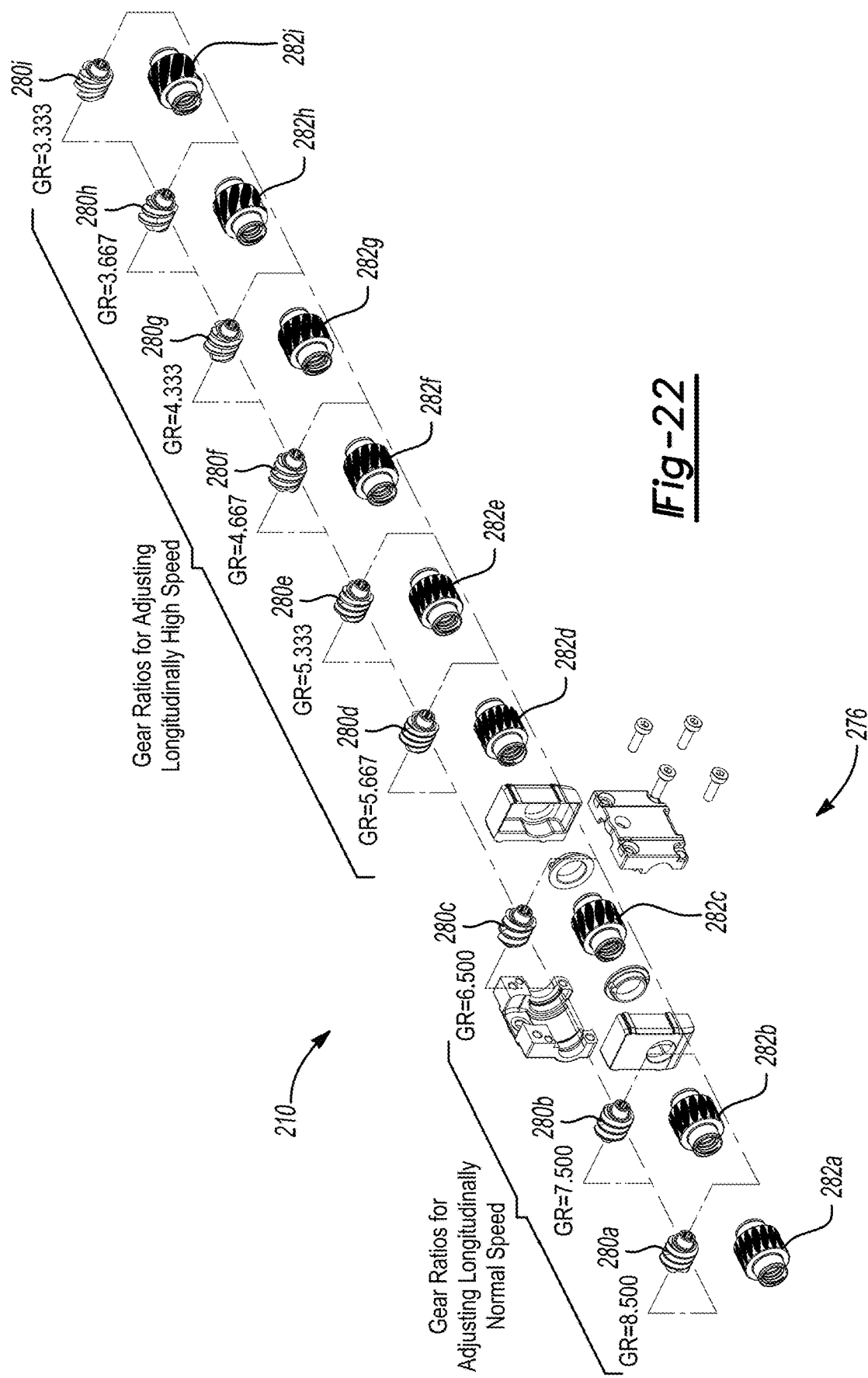
Figure 23:
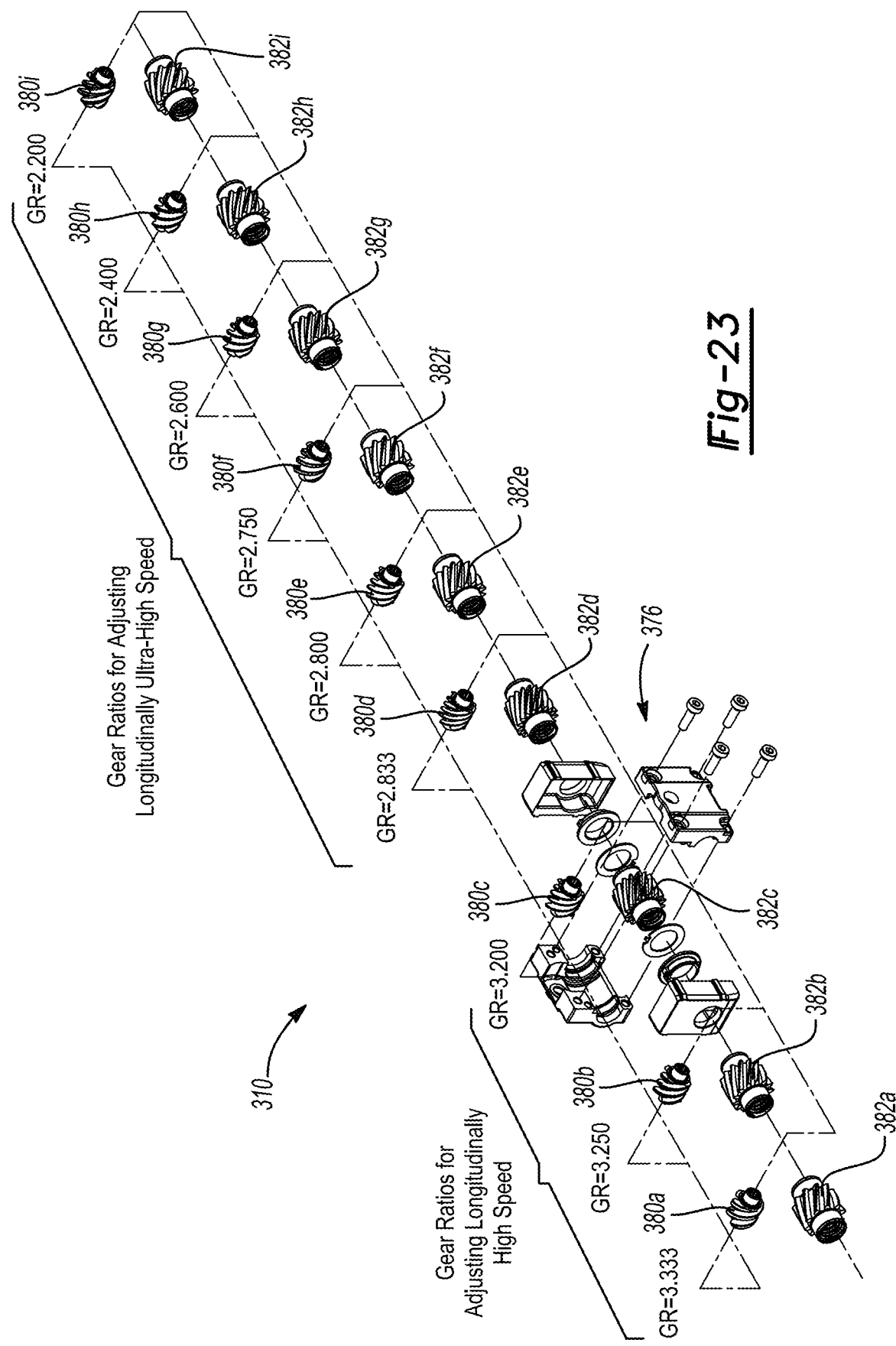

FIGS. 4A-4E relate to a close-type gearbox having ellipsoidal mating surfaces in accordance with the principles of the present disclosure; FIG. 4A is a perspective view of the gearbox and a representative ellipsoid; FIG. 4B a perspective view of the gearbox; FIG. 4C is a first side view of the gearbox; FIG. 4D is a second side view of the gearbox; and FIG. 4E is an exploded perspective view of the gearbox;

FIGS. 5A-5B relate to an open-type gearbox having ellipsoidal mating surfaces in accordance with the principles of the present disclosure; FIG. 5A is a perspective view of the gearbox; and FIG. 5B is an exploded perspective view of the gearbox;

FIGS. 6A-6D relate to an open-type gearbox having conical mating surfaces in accordance with the principles of the present disclosure; FIG. 6A is a perspective view of the gearbox and a representative cone; FIG. 6B is a first side view of the gearbox; FIG. 6C is a second side view of the gearbox; and FIG. 6D is an exploded perspective view of the gearbox;

FIGS. 7A-7E relate to an open-type gearbox having spherical mating surfaces in accordance with the principles of the present disclosure; FIG. 7A is a perspective view of the gearbox and a representative sphere; FIG. 7B is a perspective view of the gearbox; FIG. 7C is a first side view of the gearbox; FIG. 7D is a second side view of the gearbox; and FIG. 7E is an exploded perspective view of the gearbox;

FIG. 8A-8B relate to preassembly join stop features; FIG. 8A is a detail perspective view of a depression of a preassembly join stop feature of the gearbox of FIG. 5B; and FIG. 8B is a detail perspective view of a protrusion of the preassembly join stop feature of FIG. 5B;

FIG. 9 is an exploded perspective view of a gearbox including a single join stop feature in accordance with the principles of the present disclosure;

FIG. 10 is an exploded perspective view of a gearbox that is free of preassembly join stop features in accordance with the principles of the present disclosure;

FIGS. 11A-11B relate to a gearbox including an elastic layer in accordance with the principles of the present disclosure; FIG. 11A is an exploded perspective view of the gearbox; and FIG. 11B is a perspective view of the gearbox;

FIGS. 12A-12C relate to a gearbox assembly including the gearbox of FIGS. 5A-5B assembled with screws in accordance with the principles of the present disclosure; FIG. 12A is a perspective view of the gearbox assembly; and FIG. 12B is a partial sectional view taken at line 12B-12B of FIG. 12A; FIG. 12C is a sectional view taken at line 12C-12C of FIG. 12A;

FIGS. 13A-13D relate to a gearbox assembly including the gearbox of FIGS. 5A-5B assembled with discrete rivets in accordance with the principles of the present disclosure; FIG. 13A is an exploded perspective view of the gearbox assembly with the rivets in an undeformed state; FIG. 13B is a perspective view of the gearbox assembly with the rivets in the undeformed state; FIG. 13C is a sectional view of the gearbox assembly taken at line 13C-13C of FIG. 13B, the rivets in the undeformed state; and FIG. 13D is a sectional view of the gearbox assembly taken at line 13D-13D of FIG. 13B, the rivets in a deformed state;

FIGS. 14A-14D relate to a gearbox assembly including a gearbox having integral rivets in accordance with the principles of the present disclosure; FIG. 14A is an exploded perspective view of the gearbox with the rivets in an undeformed state; FIG. 14B is a perspective view of the gearbox with the rivets in the undeformed state; FIG. 14C is a sectional view taken at line 14C-14C of FIG. 14B, the rivets in an undeformed state; and FIG. 14D is a sectional view taken at line 14D-14D of FIG. 14B, the rivets in a deformed state;

FIGS. 15A-15D relate to an enhanced-strength, enveloping-gear, comfort-speed power length adjustment assembly in accordance with the principles of the present disclosure; FIG. 15A is a partial perspective view of the adjustment assembly; FIG. 15B is a partial perspective cutaway view of the adjustment assembly; FIG. 15C is a sectional view of the adjustment assembly taken at line 15C-15C of FIG. 15A; and FIG. 15D is a sectional view of the adjustment assembly taken at line 15D-15D of FIG. 15A;

FIGS. 16A-16E related to an enhanced-strength, helical-gear, comfort-speed power length adjustment assembly in accordance with the principles of the present disclosure; FIG. 16A is a partial exploded perspective view of the adjustment assembly; FIG. 16B is a partial perspective view of the adjustment assembly; FIG. 16C is a partial perspective cutaway view of the adjustment assembly; FIG. 16D is a sectional view of the adjustment assembly taken at line 16D-16D of FIG. 16B; and FIG. 16E is a sectional view of the adjustment assembly taken at line 16E-16E of FIG. 16B;

FIGS. 17A-17D relate to a normal-strength, enveloping-gear, high speed power length adjustment assembly in accordance with the principles of the present disclosure; FIG. 17A is a partial perspective view of the adjustment assembly; FIG. 17B is a partial perspective cutaway view of the adjustment assembly; FIG. 17C is a sectional view of the adjustment assembly taken at line 17C-17C of FIG. 17A; and FIG. 17D is a sectional view of the adjustment assembly taken at line 17D-17D of FIG. 17A;

FIGS. 18A-18D relate to a normal-strength, helical-gear, high speed power length adjustment assembly in accordance with the principles of the present disclosure; FIG. 18A is a partial perspective view of the adjustment assembly; FIG. 18B is a partial perspective cutaway view of the adjustment assembly; FIG. 18C is a sectional view taken at line 18C-18C of FIG. 18A; and FIG. 18D is a sectional view taken at line 18D-18D of FIG. 18A;

FIGS. 19A-19D relate to a normal-strength, helical-gear, ultra-high speed power length adjustment assembly in accordance with to the principles of the present disclosure; FIG. 19A is a partial perspective view of the adjustment assembly; FIG. 19B is a partial perspective cutaway view of the adjustment assembly; FIG. 19C is a sectional view taken at line 19C-19C of FIG. 19A; and FIG. 19D is a sectional view taken at line 19D-19D of FIG. 19A;

FIGS. 20A-20D relate to high-strength, helical-gear, ultra-high speed power length adjustment assembly in accordance with to the principles of the present disclosure; FIG. 20A is a partial perspective view of the adjustment assembly; FIG. 20B is a partial perspective cutaway view of the adjustment assembly; FIG. 20C is a sectional view taken at line 20C-20C of FIG. 20A; and FIG. 20D is a sectional view taken at line 20D-20D of FIG. 20A;

FIGS. 21A-21D relate to an ultra-high strength, helical-gear, ultra-high speed power length adjustment assembly in accordance with to the principles of the present disclosure; FIG. 21A is a partial perspective view of the adjustment assembly; FIG. 21B is a partial perspective cutaway view of the adjustment assembly; FIG. 21C is a sectional view taken at line 21C-21C of FIG. 21A; and FIG. 21D is a sectional view taken at line 21D-21D of FIG. 21A;

FIG. 22 is an exploded view of an open architecture power seat length adjuster assembly, constructed in accordance with the principles of the present disclosure, where worm-worm gear drives for achieving nine different gear ratios are shown; and FIG. 23 is an exploded view of an open architecture power seat length adjuster assembly, constructed in accordance with the principles of the present disclosure, where a helical design type worm-helical gear drives can be used achieving nine different gear ratios are shown.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
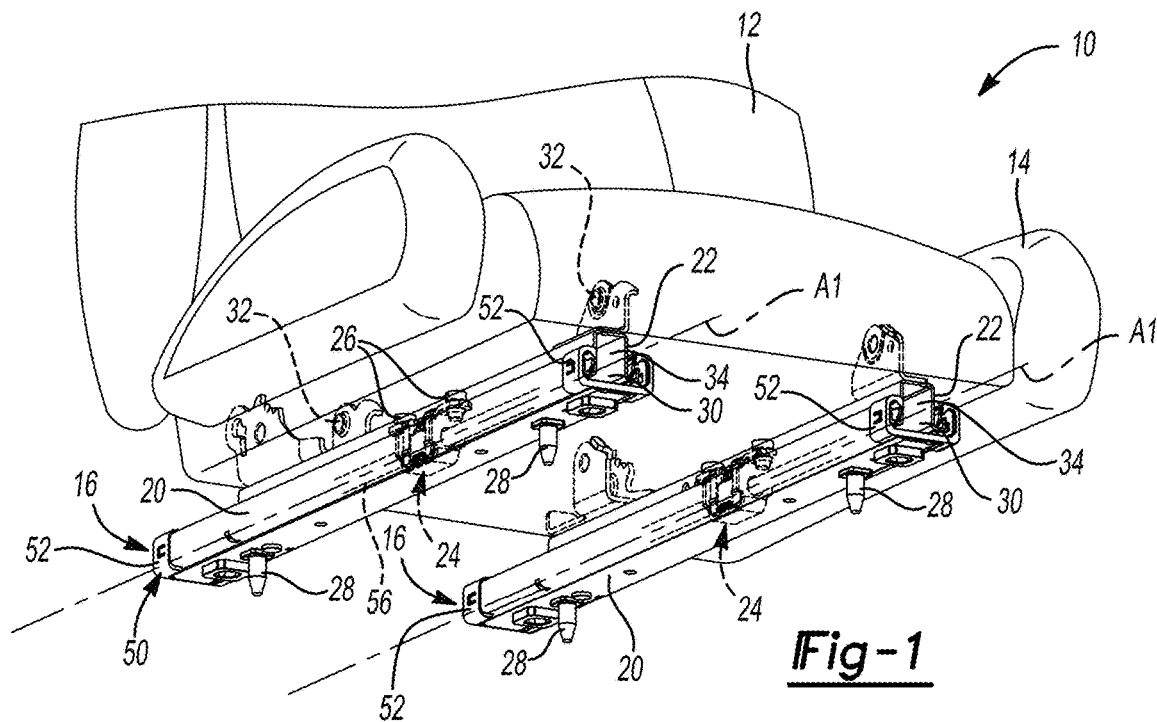
FIG. 1 is a partial perspective view of a vehicle seat assembly having a pair of seat track assemblies, each including a power seat length adjustment assembly in accordance with the principles of the present disclosure.

With reference to FIG. 1, a seat assembly 10 is provided. The seat assembly 10 may include a seatback 12, a seat bottom 14, and one or more seat track assemblies 16. In some implementations, the seat assembly 10 is adjustably mounted to a vehicle (not shown), such as an automobile. For example, a reclining mechanism (not shown) may pivotably move the seatback 12 relative to the seat bottom 14, and the seat track assemblies 16 may translatably move the seat bottom 14 to a certain position relative to a vehicle floor pan (not shown). Accordingly, a user may selectively change the orientation of the seatback 12 relative to the seat bottom 14 using the reclining mechanism (not shown), and the position of the seat assembly 10 relative to the vehicle floor pan using the pair of seat track assemblies 16.

Each seat track assembly 16 may include a lower track 20, an upper track 22, and an adjustment assembly 24. The adjustment assembly 24 may be fixedly attached to a portion of the upper track 22 by one or more mechanical fasteners 26 (e.g., bolts, screws, rivets, etc.). In certain implementations the upper track 22 defines one or more cutouts (not shown) to accommodate the adjustment assembly 24.

The lower track 20 may be fixedly attached to a portion of the vehicle using one or more mechanical fasteners 28 (e.g., bolts, screws, rivets, etc.), or any other suitable fastening technique, and may define an axis A1. The lower track 20 may define a U-shaped profile extending in a direction substantially parallel to the axis A1 such that walls of the lower track 20 cooperate to define a central lower channel 30.

The upper track 22 may be fixedly attached to a portion of the seat bottom 14 using one or more mechanical fasteners 32 (e.g., bolts, screws, rivets, etc.), or any other suitable fastening technique. The upper track 22 may define a U-shaped profile extending in a direction substantially parallel to the axis A1 such that walls of the upper track 22 cooperate to define a central upper channel 34.

In an assembled configuration, as shown, the lower track 20 may support the upper track 22 for translation along the axis A1, such that the upper track 22 translates relative to the vehicle. For example, the lower track 20 may slidably support the upper track 22 for translation along the axis A1. The upper track 22 may translate relative to the lower track 20 to permit selective movement of the seatback 12 and the seat bottom 14 relative to the vehicle. Movement of the upper track 22 relative to the lower track 20 may be facilitated by a carriage assembly 50, including two pairs of ball-cage assemblies 52, which may be: (i) secured to the upper track 22 and/or the adjustment assembly 24, and (ii) at least partially received within the central lower channel 30 of the lower track 20.

Figure 2:
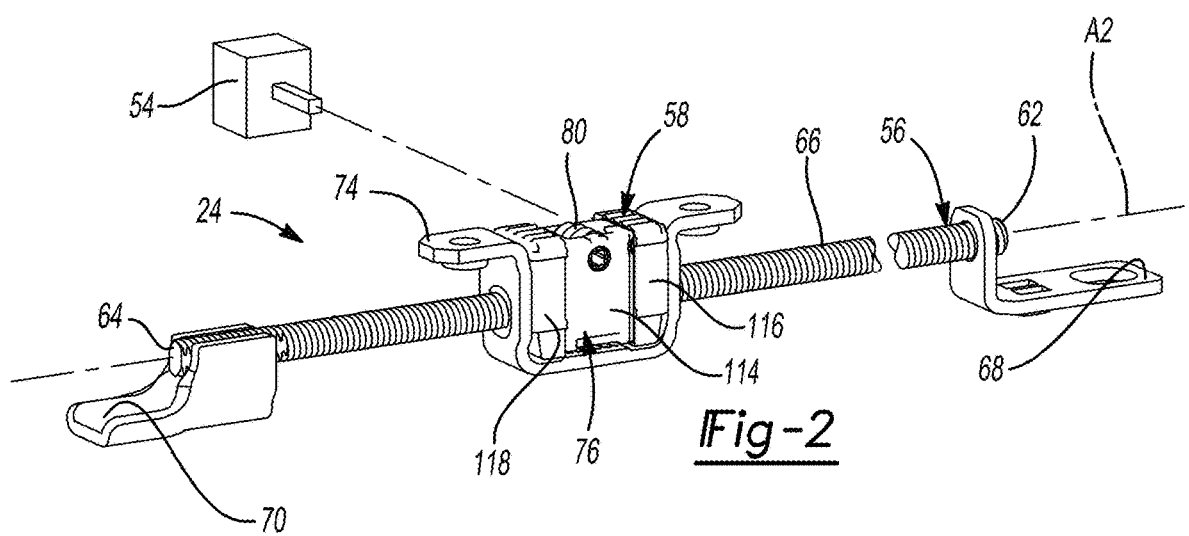
FIG. 2 is a perspective view of the power seat length adjustment assembly of FIG. 1.

With reference to FIG. 2, the adjustment assembly 24 may include a driver assembly 54, a spindle screw or lead screw 56, and an adjustment subassembly 58. In an assembled configuration, a portion of the adjustment assembly 24 may be secured relative to the vehicle and another portion of the adjustment assembly 24 may be secured relative to the upper track 22 to facilitate movement of the seatback 12 and the seat bottom 14 relative to the vehicle. For example, the spindle screw 56 may be secured to the lower track 20 and/or to the vehicle floor, while the adjustment subassembly 58 may be secured to the upper track 22. Accordingly, movement of the adjustment subassembly 58 relative to the spindle screw 56 causes the fore and aft movement of the upper track 22 and the seat bottom 14 relative to the lower track 20 and ultimately to the vehicle floor.

The driver assembly 54 may include an electric bi-directional motor and two flex drive shafts that transfer the speed and torque from the electric motor to the adjustment subassembly 58 to cause the movement of the adjustment subassembly 58 along the spindle screw 56 length and, thus, the fore-and-aft movement of the seat assembly 10 (FIG. 1), relative to the vehicle floor.

The spindle screw 56 may include a front end 62 and a rear end 64. In some implementations, the spindle screw 56 may define a substantially cylindrical rod defining an axis A2 extending from the front end 62 to the rear end 64 and having an outer thread 66 extending along and about the axis A2 from the front end 62 to the rear end 64. In an assembled configuration, the spindle screw 56 may be disposed within one or both of the central lower channel 30 of the lower track 20 and the central upper channel 34 of the upper track 22 such that the axis A2 is substantially parallel to the axis A1 (FIG. 1). The front end 62 and rear end 64 may be secured relative to the lower track 20 and/or to the vehicle floor through the studs rigidly mounted on the lower track 20. For example, the front end 62 may be supported by a front spindle bracket 68 that is secured to the lower track 20 and/or to the vehicle floor, and the rear end 64 may be supported by a rear spindle bracket 70 that is also secured to the lower track 20 and/or to the vehicle floor.

With reference to at least FIG. 3, the adjustment subassembly 58 may include a support frame 74, a housing assembly 76, a pair of bearing bushings 78, a first gear or cylindrical worm 80 having a helical outer thread 82 in mesh with external teeth 84 of a second gear or enveloping worm 86, a spindle nut integrally formed with the second gear 86 and having an internal thread 90, and the spindle screw 56 with the outer thread 66 (FIG. 2) engaging the internal thread 90 of the spindle nut. The first and second gears 80, 86 may be collectively referred to as a gear system or a gear assembly.

The support frame 74 may define a U-shape. The support frame 74 may include a base 100, a pair of walls 102 extending substantially perpendicular to the base 100 on opposing ends of the base 100, and a pair of flanges 104 extending substantially perpendicular to the pair of walls 102, respectively, and substantially parallel to the base 100. The base 100, walls 102, and flanges 104 may be integrally formed. The base 100 and walls 102 may cooperate to define an interior region 106. The pair of walls 102 may define a respective pair of wall apertures 108. The pair of flanges 104, may define a respective pair of flange apertures 110.

The housing assembly 76 may include a gearbox 114, a first cover shell 116, and a second cover shell 118 (also referred to as the "pair of cover shells 116, 118"). The first and second cover shells 116, 118 may be geometrically mirrored. The first and second cover shells 116, 118 may define respective first and second shell apertures 120, 122. The first and second cover shells 116, 118 may define first and second shell interior regions 124, 126, respectively.

The first and second cover shells 116, 118 may be formed from a resilient material having noise and vibration dampening characteristics. In some implementations, the first and second cover shells 116, 118 may be formed from a polymer such as rubber, for example. The use of rubber cover shells 116, 118, in compression against the walls 102 of the support frame 74, may increase the damping capability of the adjustment subassembly 58 in the process of vibration transmission to the seat structure.

The gearbox 114 may be formed from aluminum-zinc alloy die-casting material. The gearbox 114 may include a first part or portion 130 and a second part or portion 132. Each of the first and second portions 130, 132 may define a longitudinal recess 134, a peripheral recess 136, and an aperture 138. Each of the first and second portions 130, 132 further includes a curved mating surface 140. In an assembled state, the curved mating surfaces 140 of the first and second portions 130, 132 are in contact with each other, the longitudinal recesses 134 cooperate to define a longitudinal passage, and the peripheral recesses 136 cooperate to define a peripheral receptacle. The gearbox 114 may be secured in the assembled configuration by a plurality of fasteners 142 (e.g., screws, bolts, rivets, etc.). Various implementations of gearboxes are described in greater detail below.

The cylindrical worm 80 may define an axis of rotation A3 extending from a first end 150 to a second end 152. The helical outer thread 82 may be disposed about the axis of rotation A3 between the first and second ends 150, 152. In various implementations, the cylindrical worm 80 may be manufactured by an injection molding process from a plastic material such as PEEK 450G. The cylindrical worm 80 may be rotatably supported by the housing assembly 76. For example, the first end 150 of the cylindrical worm 80 may be rotatably disposed within the aperture 138 of the first portion 130 of the gearbox 114 and the second end 152 of the cylindrical worm 80 may be rotatably disposed within the aperture 138 of the second portion 132 of the gearbox 114.

The enveloping worm 86 may define an axis of rotation A4 extending from a first end 154 to a second end 156. The internal thread 90 and the external teeth 84 may be disposed about the axis of rotation A4. The bearing bushings 78 may include respective through-holes 160 that receive outer bearing surfaces 162 of enveloping worm 86. In the assembled configuration, the enveloping worm 86 and the bearing bushings 78 may be disposed at least partially within the longitudinal passage (formed by longitudinal recesses 134) of the gearbox 114. The enveloping worm 86 may be disposed between the bearing bushings 78 and rotatable with respect to the bearing bushings 78. The bearing bushings 78 may be rotatably fixed with respect to the gearbox 114 by engagement of radially-extending tabs 164 of the bearing bushings 78 with the gearbox 114.

In the assembled configuration, the gearbox 114 is disposed between the cover shells 116, 118 and at least partially within the shell interior regions 124, 126. The housing assembly 76, which includes the gearbox 114 and cover shells 116, 118, is disposed at least partially within the interior region 106 of the support frame 74. The spindle screw 56 (FIG. 2) extends through a gear passage 166 of the enveloping worm 86, the through-holes 160 of the bearing bushings 78, the longitudinal passage (formed by the longitudinal recesses 134), the first and second shell apertures 120, 122, and the wall apertures 108. The internal thread 90 of the enveloping worm 86 is threaded to the outer thread 66 (FIG. 2) of the spindle screw 56 (FIG. 2), and the external teeth 84 of the enveloping worm 86 are meshed with the helical outer thread 82 of the cylindrical worm 80.

The axis of rotation A4 of the enveloping worm 86 may be substantially parallel to and aligned with the axis A2 of the spindle screw 56. The axis of rotation A3 of the cylindrical worm 80 may be substantially perpendicular to the axes A2 and A4. In the assembled configuration, the adjustment subassembly 58 may be disposed within the central lower channel 30 of the lower track 20 and/or the central upper channel 34 of the upper track 22. The axes A2, A4 may be substantially parallel to and aligned with the axis A1.

Gearboxes

A gearbox according to the principles of the present disclosure may have one or more features to facilitate alignment of the two portions of the gearbox, distribute stresses, increase ease of assembly, improve accuracy of assembly, accommodate manufacturing tolerances, reduce or eliminate vibration and/or noise during use, and/or provide modularity to accommodate variety of gear assembly configurations, as will be described in greater detail below. More specifically, a gearbox according to the principles of the present disclosure may include curved mating surfaces, one or more preassembly join stop features, and/or an elastic layer, each of which is described in greater detail below.

Additionally, any of the gearboxes may be open-type gearboxes or close-type gearboxes. Close-type gearbox include a wall, such as a top wall, that at least partially encloses a worm gear. Close-type gearboxes may be used to reduce or eliminate contamination of gear systems inside the gearbox and/or eliminate noise during use of the gear system. In some implementations, a close-type gearbox may be used to facilitate noise reduction in an ultra-high speed gear system, which operates at a higher mesh frequency compared to lower speed gear systems. An example of a close-type gearbox is shown in FIGS. 4A-4E and FIGS. 20A-21D. Open-type gearboxes may be used in applications with low or no expected contamination and/or low expected noise. In some implementations, an open-type gearbox may be used with a comfort-speed or a high speed gear system that is not expected to emit significant noise during use. Examples of open-type gearboxes are shown in FIGS. 5A-7E, 9-11B, and 15A-19D.

The first and second portions of the gearbox may be manufactured in a die-casting process. The gearbox may comprise casting metal, such as an aluminum zinc alloy. The gearboxes may be assembled with various types of discrete or integral fasteners.

Curved Mating Surfaces

A two-part gearbox in accordance with the principles of the present disclosure may include curved mating surfaces. The mating curved surfaces may be defined by a portion of a three-dimensional curve, such as an ellipsoid, a cone, or a sphere. The two-part gearbox includes a first portion with a first curved mating surface and a second portion with a second curved mating surface. One of the mating surfaces is convex, while the other mating surface is concave. The mating surfaces may define the substantially the same shape, with equal and opposite curvature.

The mating surfaces may be self-centering in at least two orthogonal directions. In certain implementations, the mating surfaces are self-centering in three orthogonal directions (e.g., spherical mating surfaces). Accordingly, the curved mating surfaces may facilitate efficient assembly and pre-assembly with improved accuracy. Moreover, gearboxes having the self-centering mating surfaces may be free of certain other alignment features. In addition to facilitating alignment, the curved mating surfaces also increase surface area contact between the two gearbox portions, thereby improving a distribution of shear stress in the gearbox assembly during normal and/or shock loading conditions.

Referring to FIGS. 4A-4E, a gearbox 400 in accordance with the principles of the present disclosure is provided. The gearbox 400 includes a first part or portion 402 and a second part or portion 404. A boundary or joint 406 between the first and second portions 402, 404 defines a portion of an ellipsoid 408. The ellipsoid 408 may define a first or vertical radius and a second or horizontal radius. In certain implementations, the first radius is in a range of 190 mm to 200 mm and the second radius is in a range of 240 to 250 mm.

The first portion 402 includes a first body 410. The first body 410 includes a first exterior surface 412 and a first mating surface or curved surface 414. The first mating surface 414 is concave such that it curves inward 415, away from the second portion 404. The second portion 404 includes a second body 416. The second body 416 includes a second exterior surface 418 and a second mating surface or curved surface 420. The second mating surface 420 is convex such that it curves outward 421, toward the first portion 402. Curvatures of the first and second mating surfaces 414, 420 are substantially equal and opposite. More specifically, the first mating surface 414 is defined by a portion of a radial-outside 422 of the ellipsoid 408 and the second mating surface 420 is defined by a portion of a radial-inside 424 of the ellipsoid 408.

During pre-assembly of the gearbox 400, the mating surfaces 414, 420 may be configured to have a self-centering effect on the first and second portions 402, 404 to facilitate alignment of the first and second portions 402, 404. Prior to alignment during preassembly, the mating surfaces 414, 420 may be in less than complete contact (i.e., gaps may be present between the first and second mating surfaces 414, 420). One or both of the portions 402, 404 may be moved along a first orthogonal direction 426 and/or a second orthogonal direction 428 with respect to the other of the portions 402, 404 until the portions 402, 404 slide into alignment. This may be referred to as bi-directional self-centering. When the portions 402, 404 are aligned, the first and second mating surfaces 414, 420 may be in substantially continuous contact at the boundary 406.

The first body 410 of the first portion 402 defines a first longitudinal recess 440 and a first peripheral recess 442. The first longitudinal recess 440 and the first peripheral recess 442 are in fluid communication. The first body 410 includes a first wall 444. The first wall 444 at least partially defines the first peripheral recess 442. The first wall 444 may be partially cylindrical.

The second body 416 of the second portion 404 defines a second longitudinal recess 446 and a second peripheral recess 448. The second longitudinal recess 446 and the second peripheral recess 448 are in fluid communication. The second body 416 includes a second wall 450. The second wall 450 at least partially defines the second peripheral recess 448. The second wall 450 may be partially cylindrical.

The first and second longitudinal recesses 440, 446 cooperate to define a longitudinal passage 452 (FIGS. 4B-4C). The longitudinal passage 452 may extend continuously between first and second sides of the gearbox 400. When the gearbox 400 is assembled in a vehicle seat adjustment assembly, the longitudinal passage 452 may be aligned with axes of a lower track, spindle screw, and second gear (e.g., lower track 20, spindle screw 56, and second gear 86 of FIGS. 1-3). The longitudinal passage 452 may be configured to receive a second gear, a portion of a spindle screw, and bearing (e.g., second gear 86, spindle screw 56, and bearing bushings 78 of FIGS. 1-3).

The first and second peripheral recesses 442, 448 cooperate to define a peripheral receptacle 454 (FIG. 4C). The peripheral receptacle 454 is partially enclosed by the first and second walls 444, 450. Accordingly, gearbox 400 may be described as a close-type gearbox. The peripheral receptacle 454 may be configured to receive a first gear (e.g., first gear 80 of FIGS. 1-3). The first and second bodies 410, 416 may define respective first and second apertures 460, 462. The first and second apertures 460, 462 may be configured to support first and second bearing surfaces of a first gear (e.g., first gear 80 of FIGS. 1-3).

The first body 410 of the first portion 402 may define a plurality of third apertures 464. The second body 416 of the second portion 404 may define a plurality of fourth apertures 466. When the gearbox 400 is assembled, the third apertures 464 are axially aligned with the fourth apertures 466, respectively. The apertures 444, 466 may be configured to receive a plurality of fasteners, as will be described in greater detail below (see discussion accompanying FIGS. 12A-14D) to retain the gearbox 400 in the assembled configuration.

The gearbox 400 may further include a pair of pins 470 and a pair of receptacles 472. In the implementation shown, the pins 470 project from the second mating surface 420 of the second portion 404 and the receptacles 472 are defined in the first body 410 of the first portion 402. However, in other implementations, a first portion may include the pins while a second portion includes the receptacles. In some implementations, first and second portions may each include one pin and one receptacle.

The receptacles 472 may be blind holes. The pins 470 may be frusto-conical such that they have a largest diameter adjacent to the second body 416. The receptacles 472 may be frusto-conical such that they have a largest diameter at the first mating surface 414. The receptacles 472 may be configured receive respective pins 470 during preassembly of the gearbox 400. The pins 470 may be disposed in the receptacles 472 when the gearbox 400 is in the assembled configuration.

In various implementations, the gearbox 400 may further include one or more preassembly join stop features. For example, the gearbox 400 may include annular projections 480 to be received in annular depressions 482. The annular projections 480 may be coaxial with the pins 470 and the annular depressions 482 may be coaxial with the receptacles 472. A gearbox according to the principles of the present disclosure may be free of preassembly join stop features, include a single stop feature, include two stop features (e.g., the pair of annular projections 480 and the pair of annular depressions 482), as shown, or include more than two stop features. Pre-assembly join stop features are described in greater detail below in the discussion accompanying FIGS. 8A-10.

With reference to FIGS. 5A-5B, another gearbox 400a is illustrated. The structure and function of the gearbox 400a may be substantially similar to that of the gearbox 400, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "a") are used to identify those features that have been modified.

The gearbox 400a includes a first part or portion 402a and a second part or portion 404a. A boundary or joint 406a between the first and second portions 402a, 404a defines a portion of an ellipsoid 408.

The first portion 402a includes a first body 410a. The first body 410a includes a first exterior surface 412a and a first mating surface or curved surface 414a. The first mating surface 414a is concave. The second portion 404a includes a second body 416a. The second body 416a includes a second exterior surface 418a and a second mating surface or curved surface 420a. The second mating surface 420a is convex.

The first body 410a of the first portion 402a defines a first longitudinal recess 440 and a first peripheral recess 442a. The first longitudinal recess 440 and the first peripheral recess 442a are in fluid communication. The second body 416a of the second portion 404a defines a second longitudinal recess 446 and a second peripheral recess 448a. The second longitudinal recess 446 and the second peripheral recess 448a are in fluid communication.

The first and second longitudinal recesses 440, 446 cooperate to define a longitudinal passage 452 (FIG. 5A). The first and second peripheral recesses 442a, 448a cooperate to define a peripheral receptacle 454a (FIG. 5A). The peripheral receptacle 454a is open to an exterior region 500 of the gearbox 400a at a peripheral opening 502 defined by the first and second bodies 410a, 416a when the gearbox 400a is in the assembled configuration. Accordingly, the gearbox 400a may be described as an open-type gearbox. The peripheral receptacle 454a may be configured to at least partially receive a first gear (e.g., first gear 80 of FIGS. 1-3), such as in first and second apertures 460, 462 that support first and second bearing surfaces of the first gear. A portion of the first gear may project from the gearbox 400a through the peripheral opening 502.

The gearbox 400a may further include third and fourth apertures 464, 466 for receiving fasteners, pins 470 and receptacles 472, and annular projections and depressions 480, 482 as shown and as described above in the discussion accompanying FIGS. 4A-4E.

Referring to FIGS. 6A-6D, another gearbox 400b is illustrated. The structure and function of the gearbox 400b may be substantially similar to that of the gearbox 400a, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "b") are used to identify those features that have been modified.

The gearbox 400b includes a first part or portion 402b and a second part or portion 404b. A boundary or joint 406b between the first and second portions 402b, 404b defines a portion of a cone 600. In certain implementations, the cone 600 may define an opening angle ranging from 165° to 172°.

The first portion 402b includes a first body 410b. The first body 410b includes a first exterior surface 412a and a first mating surface or curved surface 414b. The first mating surface 414b is concave such that it curves inward 415, away from the second portion 404b. The second portion 404b includes a second body 416b. The second body 416b includes a second exterior surface 418a and a second mating surface or curved surface 420b. The second mating surface 420b is convex such that it curves outward 421, toward the first portion 402b. Curvatures of the first and second mating surfaces 414b, 420b are substantially equal and opposite.

During pre-assembly of the gearbox, the mating surfaces 414b, 420b may be configured to have a self-centering effect on the first and second portions 402b, 404b to facilitate alignment of the first and second portions 402b, 404b. Prior to alignment during preassembly, the mating surfaces 414b, 420b may be in less than complete contact (i.e., there may be gaps between the first and second mating surfaces 414b, 420b). One or both of the portions 402b, 404b may be moved along a first orthogonal direction 426 and/or a second orthogonal direction 430 with respect to the other of the portions 402b, 404b until the portions 402b, 404b slide into alignment. This may be referred to as bi-directional self-centering. When the portions 402b, 404b are aligned, the first and second mating surfaces 414b, 420b may be in substantially continuous contact at the boundary 406b.

The first body 410b of the first portion 402b defines a first longitudinal recess 440 and a first peripheral recess 442a. The first longitudinal recess 440 and the first peripheral recess 442a are in fluid communication. The second body 416b of the second portion 404b defines a second longitudinal recess 446 and a second peripheral recess 448a. The second longitudinal recess 446 and the second peripheral recess 448a are in fluid communication. The first and second longitudinal recesses 440, 446 cooperate to define a longitudinal passage 452 (FIG. 6A-6B). The first and second peripheral recesses 442a, 448a cooperate to define a peripheral receptacle 454a (FIG. 6A). While the gearbox 400a is shown as being an open-type gearbox, in other implementations, it may include walls similar or identical to the walls 444, 450 of the gearbox 400 (FIGS. 4A-4E) and be a close-type gearbox.

The gearbox 400b may further include third and fourth apertures 464, 466 for receiving fasteners, pins 470 and receptacles 472, and annular projections and depressions 480, 482 as shown and as described above in the discussion accompanying FIGS. 4A-4E.

Referring to FIGS. 7A-7E, another gearbox 400c is illustrated. The structure and function of the gearbox 400c may be substantially similar to that of the gearbox 400a, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "c") are used to identify those features that have been modified.

The gearbox 400c includes a first part or portion 402c and a second part or portion 404c. A boundary or joint 406c between the first and second portions 402c, 404c defines a portion of a sphere 700. In certain implementations, the sphere 700 may define a radius in a range of 190 mm to 200 mm.

The first portion 402c includes a first body 410c. The first body 410c includes a first exterior surface 412a and a first mating surface or curved surface 414c. The first mating surface 414c is concave such that it curves inward 415, away from the second portion 404c. The second portion 404c includes a second body 416c. The second body 416c includes a second exterior surface 418a and a second mating surface or curved surface 42bc. The second mating surface 420c is convex such that it curves outward 421, toward the first portion 402c. Curvatures of the first and second mating surfaces 414c, 420c are substantially equal and opposite.

During pre-assembly of the gearbox, the mating surfaces 414c, 420c may be configured to have a self-centering effect on the first and second portions 402c, 404c to facilitate alignment of the first and second portions 402c, 404c. Prior to alignment during preassembly, the mating surfaces 414c, 420c may be in less than complete contact (i.e., there may be gaps between the first and second mating surfaces 414c, 420c). One or both of the portions 402c, 404c may be moved along a first orthogonal direction 426, a second orthogonal direction 430, and/or a third orthogonal direction 702 with respect to the other of the portions 402c, 404c until the portions 402c, 404c slide into alignment. This may be referred to as three-directional self-centering. When the portions 402c, 404c are aligned, the first and second mating surfaces 414c, 420c may be in substantially continuous contact at the boundary 406c.

The first body 410c of the first portion 402c defines a first longitudinal recess 440 and a first peripheral recess 442a. The first longitudinal recess 440 and the first peripheral recess 442a are in fluid communication. The second body 416c of the second portion 404c defines a second longitudinal recess 446 and a second peripheral recess 448a. The second longitudinal recess 446 and the second peripheral recess 448a are in fluid communication. The first and second longitudinal recesses 440, 446 cooperate to define a longitudinal passage 452 (FIG. 7B-7C). The first and second peripheral recesses 442a, 448a cooperate to define a peripheral receptacle 454a (FIG. 7B). While the gearbox 400c is shown as being an open-type gearbox, in other implementations, the gearbox 400c may include walls similar or identical to the walls 444, 446 of the gearbox 400 (FIGS. 4A-4E) and be a close-type gearbox.

The gearbox 400c may further include third and fourth apertures 464, 466 for receiving fasteners, pins 470 and receptacles 472, and annular projections and depressions 480, 482 as shown and as described above in the discussion accompanying FIGS. 4A-4E.

Preassembly Join Stop Features

Gearboxes according to the principles of the present disclosure may include one or more features to facilitate preassembly and offer flexibility to accommodate manufacturing tolerances. Gearboxes may include a single preassembly join stop feature, a double preassembly join stop feature, or more than two preassembly join stop features. In various implementations, a gearbox may be free of preassembly join stop features.

Referring to FIG. 8A, a portion of the second body 416a of the gearbox 400a of FIG. 5A is shown. The portion includes the pin 470 and the annular projection 480. In various implementations, the pin 470 and the annular projection 480 may be integrally formed with the second body 420a.

The pin 470 projects from the second mating surface 420a. The pin 470 may have a frusto-conical shape such that it has a larger diameter at a proximal end or base, closer to the second mating surface 420a and a smaller diameter at a distal end 800 further from the second mating surface 420a. The pin 470 includes a first joint surface 802 that is frusto-conical.

The annular projection 480 may have a larger radius than the pin 470 and extend circumferentially around the base of the pin 470. The annular projection may extend axially from the second mating surface 420a toward the distal end 800 of the pin 470. However, the annular projection 480 may extend axially along only a portion of a length of the pin 470. The annular projection 480 includes a second joint surface 804.

With reference to FIG. 8B, the first body 410a includes the receptacle 472 and the annular depression 482. The receptacle 472 may be defined by the first mating surface 414a. The receptacle 472 may have a frusto-conical shape such that it has a larger diameter at a proximal end 806 at the first mating surface 414a and a smaller diameter at a distal end 808 offset from the first mating surface 414a. The receptacle 472 includes a third joint surface 810 that is frusto-conical.

The annular depression 482 may have a larger radius than the receptacle 472 and extend circumferentially around a portion of the receptacle. The annular depression may extend axially from the first mating surface 414a toward the distal end 808 of the receptacle 472. However, the annular depression 482 may extend axially along only a portion of a length of the receptacle 472. The annular depression 482 may include a fourth joint surface 812.

When the gearbox 400a (FIG. 5A) is in an assembled or preassembled configuration, the pin 470 is received in the receptacle 472. The first joint surface 802 of the pin 470 may engage the third joint surface 810 of the receptacle 472. The annular projection 480 is received in the annular depression 482. The second joint surface 814 of the annular projection 480 may engage the fourth joint surface 812 of the annular depression 482. Collectively, the annular projection 480 and the annular depression 482 may be referred to as a preassembly join stop feature.

Returning to FIG. 5A, the gearbox 400a may include two preassembly join stop features, such as the two pairs of annular projections and depressions 480, 482. That is, the gearbox 400a may have double join stop features. The first portion 402a may include the receptacles 472 and the annular depressions 482 and the second portion 404a may include the pins 470 and the annular projections 480, as shown. In various other implementations, a first portion may include pins and projections while a second portion includes receptacles and depressions. In various other implementations, both first and second portions may include pins, annular projections, receptacles, and annular depressions.

With reference to FIG. 9, another gearbox 400d is illustrated. The structure and function of the gearbox 400d may be substantially similar to that of the gearbox 400a, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "d") are used to identify those features that have been modified.

The gearbox 400d includes a first part or portion 402d and a second part or portion 404d. A boundary or joint (see, e.g., boundary 406a of FIG. 5A) between the first and second portions 402d, 404d defines a three-dimensional curve, such as a portion of one of an ellipsoid, a cone, or a sphere.

The first portion 402d includes a first body 410d. The first body 410d includes a first exterior surface 412a and a first mating surface or curved surface 414d. The second portion 404d includes a second body 416d. The second body 416d includes a second exterior surface 418a and a second mating surface or curved surface 420d. One of the first and second mating surfaces 414d, 420d is concave and the other of the first and second mating surfaces 414d, 420d is convex.

The first body 410d of the first portion 402d defines a first longitudinal recess 440 and a first peripheral recess 442a. The first longitudinal recess 440 and the first peripheral recess 442a are in fluid communication. The second body 416d of the second portion 404d defines a second longitudinal recess 446 and a second peripheral recess 448a. The second longitudinal recess 446 and the second peripheral recess 448a are in fluid communication.

The first and second longitudinal recesses 440, 446 cooperate to define a longitudinal passage (see, e.g., longitudinal passage 452 of FIG. 5A). The first and second peripheral recesses 442a, 448a cooperate to define a peripheral receptacle (see e.g., peripheral receptacle 454a of FIG. 5A). While the gearbox 400d is shown as being an open-type gearbox, the gearbox 400d may further include walls similar to the walls 444, 446 of the gearbox 400 of FIGS. 4A-4E and be a close-type gearbox. The gearbox 400d may further include third and fourth apertures 464, 466 for receiving fasteners.

The second portion 404d may include a pin 470 and a pin 470d. An annular projection 480 may extend around a portion of the pin 470, as described above in the discussion accompanying FIGS. 8A-8B. The pin 470d may extend from the second mating surface 420d between a proximal end or base 900 and a distal end 902. The pin 470d may include a first joint surface 904 extending between the proximal end 900 and the distal end 902.

The first portion 402d may include a receptacle 472 and a receptacle 472d. An annular depression 482 may extend around a portion of the receptacle 472, as described above in the discussion accompanying FIGS. 8A-8B. The receptacle 472d may extend into the first mating surface 414d from a proximal end 906 to a distal end (not shown). The receptacle 472d may include a second joint surface 910 extending between the proximal end 906 and the distal end.

When the gearbox 400d is in an assembled or preassembled configuration, the receptacle 472d receives the pin 470d. The first joint surface 904 may engage the second joint surface 910. The gearbox 400d includes a single preassembly join stop feature (e.g., the annular projection and depression 480, 482). Accordingly, the gearbox 400d may be asymmetric about a plane that extends through a center axis 912 and between a top 914 and bottom 916 of the gearbox 400d. Although the annular projection and depression 480, 482 are shown on a first side 918 of the plane, in various other implementations, the annular projection and depression 480, 482 may alternatively be on a second side 920 of the plane.

With reference to FIG. 10, another gearbox 400e is illustrated. The structure and function of the gearbox 400e may be substantially similar to that of the gearbox 400d, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "e") are used to identify those features that have been modified.

The gearbox 400e includes a first part or portion 402e and a second part or portion 404e. A boundary or joint (see, e.g., boundary 406a of FIG. 5A) between the first and second portions 402e, 404e defines a three-dimensional curve, such as portion of one of an ellipsoid, a cone, or a sphere.

The first portion 402d includes a first body 410e. The first body 410e includes a first exterior surface 412a and a first mating surface or curved surface 414e. The second portion 404e includes a second body 416e. The second body 416e includes a second exterior surface 418a and a second mating surface or curved surface 420e. One of the first and second mating surfaces 414e, 420e is concave and the other of the first and second mating surfaces 414e, 420e is convex.

The first body 410e of the first portion 402e defines a first longitudinal recess 440 and a first peripheral recess 442a. The first longitudinal recess 440 and the first peripheral recess 442a are in fluid communication. The second body 416e of the second portion 404e defines a second longitudinal recess 446 and a second peripheral recess 448a. The second longitudinal recess 446 and the second peripheral recess 448a are in fluid communication.

The first and second longitudinal recesses 440, 446 cooperate to define a longitudinal passage (see, e.g., longitudinal passage 452 of FIG. 5A). The first and second peripheral recesses 442a, 448a cooperate to define a peripheral receptacle (see e.g., peripheral receptacle 454a of FIG. 5A). While the gearbox 400e is shown as an open-type gearbox, the gearbox 400e may, in other implementations, further include walls similar or identical to the walls 444, 446 of the gearbox 400 of FIGS. 4A-4E and be a close-type gearbox. The gearbox 400e may also include third and fourth apertures 464, 466 for receiving fasteners.

The second portion 404e may include two pins 470d. The first portion 402d may include two receptacles 472d. When the gearbox 400e is in an assembled or preassembled configuration, the receptacles 472d receive the pins 470d, respectively. The gearbox 400e may be symmetric about a plane that extends through a center axis 912 and between a top 914 and bottom 916 of the gearbox 400e. The gearbox 400e may be free of preassembly join stop features (e.g., one or more pairs of annular projections and depressions 480, 482 as shown at least in FIGS. 8A-9).

Elastic Layer

A gearbox according to the principles of the present disclosure may further include an elastic layer on a first mating surface and/or a second mating surface. The elastic layer may, in various implementations, be referred to as a compensation elastic element. The elastic layer facilitates accommodation of relatively large manufacturing tolerances in the bodies of the gearbox portions, and more particularly in the mating surfaces. An elastic layer may be particularly beneficial when used in a gearbox without preassembly join stop features (see, e.g., gearbox 400e of FIG. 10), but may also be used on gearboxes with preassembly join stop features (see, e.g., gearboxes 400a, 400d). The elastic element may comprise an elastic material, such as nitrile butadiene rubber, having a predefined compression hardness.

With reference to FIGS. 11A-11B, another gearbox 400f is illustrated. The structure and function of the gearbox 400f may be substantially similar to that of the gearbox 400e, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "f") are used to identify those features that have been modified.

The gearbox 400f includes a first part or portion 402e and a second part or portion 404f. A boundary or joint 406f between the first and second portions 402f, 404f defines a three-dimensional curve, such as a portion of one of an ellipsoid, a cone, or a sphere. The first portion 402e includes a first body 410e and the second portion 404f includes a second body 416e. The first and second bodies 410e, 416e include first and second mating surfaces 414e, 420e, respectively, The second portion 404f further includes an elastic layer 1100. The elastic layer 1100 may be disposed on the second mating surface 420e, such as directly on the second mating surface 420e. The elastic layer 1100 may be coupled to the second mating surface 420e. The elastic layer 1100 may have a substantially uniform thickness. For example, the elastic layer 1100 may define a thickness 1102 ranging from 0.5 mm to 1 mm in an assembled state.

In other implementations, an elastic layer may additionally or alternatively be present on a first mating surface of a second portion. The use of an elastic layer, such as the elastic layer 1100, may be equally applicable to open-type or close-type gearboxes, having any mating surface curvature (e.g., ellipsoidal, conical, spherical), and any number of preassembly join stop features, including none.

Fasteners

A gearbox assembly according to the principles of the present disclosure may include any of the gearboxes discussed above and a plurality of fasteners. The fasteners may include screws, rivets, and/or bolts, by way of example. Rivets may be discrete components separate from the gearbox portions. Additionally or alternatively, one or both of the first and second portions may include built-in or integral rivets. A gearbox may include more than one type of fastener, such as any combination of the fasteners described herein.

With reference to FIGS. 12A-12C, a gearbox assembly 1200 according to the principles of the present disclosure is provided. The gearbox assembly 1200 includes the gearbox 400a (see FIGS. 5A-5B and accompanying discussion) and a plurality of fasteners 1202. The fasteners 1202 may include screws, such as self-tapping screws. In some implementations, the plurality of fasteners 1202 may include four fasteners.

As best shown in FIG. 12B, each fastener 1202 may include a shaft 1204, a head 1206, and a thread 1208 extending along at least a portion of the shaft 1204. The shaft 1204 may extend through third and fourth apertures 464, 466. The head 1206 may be disposed at least partially in a countersink 1210 in the second body 416*a* such that an end 1212 of the head 1206 is flush with at least a portion of the exterior surface 412*a* of the second body 416*a*. The thread 1208 may engage a surface 1214 of the third aperture 464 to couple the first and second portions 402*a*, 404*a* to each other. In the assembled configuration, as shown in FIG. 12C, the pins 470 and annular projections 480 may be disposed in the receptacles 472 and annular depressions 482, respectively. In other implementations, an orientation of the screws 1202 may be reversed so that the head 1206 engages the first body 410*a* and the thread 1208 engages the second body 416*a*.

Although FIGS. 12A-12C depict the gearbox assembly 1200 including the open-type gearbox having ellipsoidal mating surfaces and double preassembly join stop features, the use of screws is equally applicable to assemble other gearboxes according to the principles of the present disclosure. For example, a gearbox assembly may include screws and a gearbox that (i) is open-type or close-type, (ii) has ellipsoidal, conical, spherical, or other three-dimensional curved mating surfaces, (iii) includes zero, one, two, or more than two preassembly join stop features, and (iv) includes an elastic layer or is free of an elastic layer.

Referring to FIGS. 13A-13D, a gearbox assembly 1300 according to the principles of the present disclosure is provided. The gearbox assembly 1300 includes the gearbox 400*e* (see FIG. 10 and accompanying discussion) and a plurality of fasteners 1302. The fasteners 1302 may include rivets. Prior to assembly and deformation, each of the rivets may be a distinct and separable component. In some implementations, the plurality of fasteners 1302 may include four rivets.

As best shown in FIG. 13C, each fastener 1302 may include a shaft 1304 and a head 1306. The shaft 1304 may include a tail 1308 that is configured to be buckled, upset, or deformed to form a secondary head 1308', thereby transitioning the fastener 1302 from an undeformed state to a deformed state. The shaft 1304 may extend through third and fourth apertures 464, 466. The head 1306 may be disposed at least partially in a countersink 1310 in the first body 410*e* such that an end 1312 of the head 1306 is flush with at least a portion of the first exterior surface 412*a* of the first body 410*e*.

When the rivets 1302 are in the undeformed state, as shown in FIGS. 13A-13C, the tail 1308 projects past the second exterior surface 418*a*. When the rivets 1302 are in a deformed state, as shown in FIG. 13D, the secondary head 1308' may be disposed in a countersink 1314 on in the second body 416*e* such that an end 1316 of the secondary head 1308' is flush with the second exterior surface 418*a* of the second body 416*e*. In the deformed state, the rivets 1302 retain the gearbox 400*e* in the assembled state by coupling the first and second portions 402*e* and 404*e* to one another. In other implementations, an orientation of the rivets 1302 may be reversed so that the head 1306 engages the second body 416*e* and the secondary head 1308' engages the first body 410*e*.

Although FIGS. 13A-13D depict the gearbox assembly 1300 including the open-type gearbox having ellipsoidal mating surfaces and being free of preassembly join stop features, the use of rivets is equally applicable for assembly other gearboxes according to the principles of the present disclosure. For example, a gearbox assembly may include rivets and a gearbox that (i) is open-type or close-type, (ii) has ellipsoidal, conical, spherical, or other three-dimensional curved mating surfaces, (iii) includes zero, one, two, or more than two preassembly join stop features, and (iv) includes an elastic layer or is free of an elastic layer.

Referring to FIGS. 14A-14D, a gearbox assembly 1400 according to the principles of the present disclosure is provided. The gearbox assembly 1400 includes a gearbox 400*g* having integral rivets. The structure and function of the gearbox 400*g* may be substantially similar to that of the gearbox 400*a*, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "g") are used to identify those features that have been modified.

The gearbox 400*g* includes a first part or portion 402*g* and a second part or portion 404*g*. A boundary or joint 406*g* between the first and second portions 402*g*, 404*g* defines a portion of a three-dimensional curve, such as an ellipsoid, a cone, or a sphere. The first portion 402*g* includes a first body 410*g*. The first body 410*g* includes a first exterior surface 412*a* and a first mating surface or curved surface 414*g*. The second portion 404*g* includes a second body 416*g*. The second body 416*g* includes a second exterior surface 418*a* and a second mating surface or curved surface 420*g*. One of the first and second mating surfaces 414*g*, 420*g* is concave and the other of the first and second mating surfaces 414*g*, 420*g* is convex. Curvatures of the first and second mating surfaces 414*g*, 420*g* are substantially equal and opposite.

The first body 410*g* of the first portion 402*g* defines a first longitudinal recess 440 and a first peripheral recess 442*a*. The first longitudinal recess 440 and the first peripheral recess 442*a* are in fluid communication. The second body 416*g* of the second portion 404*g* defines a second longitudinal recess 446 and a second peripheral recess 448*a*. The second longitudinal recess 446 and the second peripheral recess 448*a* are in fluid communication. The first and second longitudinal recesses 440, 446 cooperate to define a longitudinal passage 452 (FIG. 14B). The first and second peripheral recesses 442*a*, 448*a* cooperate to define a peripheral receptacle 454*a* (FIG. 14B). While the gearbox 400*g* is shown as being an open-type gearbox, the gearbox 400*g* may, in other implementations, include walls similar or identical to the walls 444, 446 of the gearbox 400 of FIGS. 4A-4E and be a close-type gearbox.

The second portion 404*g* may include a first pair of integral rivets 1402 and a second pair of integral rivets 1404. The first and second pairs of rivets 1402, 1404 may be integrally formed with the second body 416*g*. The first and second pairs of rivets 1402, 1404 may extend from the second mating surface 420*g*. The rivets 1402, 1404 may have circular or oval cross sections. In the implementation shown, the rivets 1402 of the first pair have circular cross sections and the rivets 1404 of the second pair have oval cross sections.

The first portion 402*g* may include a first pair of rivet apertures 1406 and a second pair of rivet apertures 1408. The first and second pairs of rivet apertures may be defined in the first mating surface 414*g*. The rivet apertures 1406, 1408 may have cross-sectional shapes that match respective cross-sectional shapes of the rivets 1402, 1404. In the embodiment shown, the rivet apertures 1406 of the first pair have a circular cross section and the rivet apertures 1408 of the second pair have an oval cross section.

The first and second pairs of rivet apertures 1406, 1408 may be configured to receive the first and second pairs of rivets 1402, 1404, respectively. Prior to deformation, while in a preassembled configuration, the rivets 1402, 1404 may project beyond the first exterior surface 412*a*, as shown in FIGS. 14B-14C. In an assembled configuration, the rivets 1402, 1404 are buckled, upset, or deformed into a deformed state. More specifically, respective first and second tails 1410, 1412 (FIG. 14C) of the rivets 1402, 1404 of the first and second pairs may be deformed into respective first and second heads 1410', 1412' (FIG. 14D). The first and second heads 1410', 1412' may be disposed in respective first and second countersinks 1414, 1416 in the first exterior surface 414*a*.

In other implementations, locations of the rivets and rivet apertures may be reversed so that the first portion includes rivets and the second portion includes rivet apertures. In some implementations, both first and second portions include rivets and rivet apertures.

Although FIGS. 14A-14D depict the gearbox assembly 1400 including the open-type gearbox including double preassembly join stop features, the inclusion of integral rivets is equally applicable for assembly other gearboxes according to the principles of the present disclosure. For example, a gearbox assembly may include integral rivets on a gearbox that (i) is open-type or close-type, (ii) has ellipsoidal, conical, spherical, or other three-dimensional curved mating surfaces, (iii) includes zero, one, two, or more than two preassembly join stop features, and (iv) includes an elastic layer or is free of an elastic layer.

Gear Assemblies

Gearboxes according to the principles of the present disclosure are configured to accommodate a variety of different gear assembly configurations. In various implementations, two differently sized universal gearboxes are configured to accommodate gear systems including any combination of the following features. For example, gearboxes according to the principles of the present disclosure may (i) include a cross-axis single enveloping gear system or a cross-axis helical gear system, (ii) be normal-strength, enhanced-strength, high-strength, or ultra-high-strength, and (iii) be configured to operate within a comfort speed range, a high speed range, or a ultra-high speed range.

A cross-axis single enveloping gear system includes a worm and a single enveloping gear that are operably engaged and configured to rotate about perpendicular axes. The cross-axis single enveloping gear system may be robust and cost effective. In the cross-axis single enveloping gear system, a gear ratio of the worm to the single enveloping gear may be one of: 8.5, 7.5, 6.5, 5.667, 5.333, 4.667, 4.333, 3.667, or 3.333. A cross-axis helical gear system includes a worm and a helical gear that are operably engaged and configured to rotate about perpendicular axes. In the cross-axis helical gear system, a gear ratio of the worm to the helical gear may be one of: 3.333, 3.25, 3.2, 2.833, 2.8, 2.75, 2.6, 2.4, or 2.2. A cross-axis helical gear system may be configured for quieter operation than a cross-axis single enveloping gear system.

A normal-strength power length adjuster system includes a leadscrew capable of withstanding an axial forces (e.g., vehicle crash impact forces) of at least 19 kN. The leadscrew for the normal-strength power length adjuster system may have trapezoidal threads designated by Tr 8×3 (P1.5) (8 mm nominal diameter, 3 mm lead, and 1.5 mm pitch). An enhanced-strength power length adjuster system includes a lead screw capable of withstanding axial forces of at least 25 kN. The leadscrew for the enhanced-strength power length adjuster system may have trapezoidal threads defined by Tr 9×3 (P1.5) (9 mm nominal diameter, 3 mm lead, and 1.5 mm pitch). A high-strength power length adjuster system includes a leadscrew capable of withstanding an axial forces of at least 37 kN. The leadscrew for the high-strength power length adjuster system may have trapezoidal threads designated by Tr 11×4 (P2) (11 mm nominal diameter, 4 mm lead, and 2 mm pitch). An ultra-high-strength power length adjuster system includes a leadscrew capable of withstanding an axial force of at least 45 kN. The leadscrew for the ultra-high-strength power length adjuster system may have trapezoidal threads designated by Tr 12×4 (P2) (12 mm nominal diameter, 4 mm lead, and 2 mm pitch).

Speed classifications may be achieved by a combination of gear ratio and motor parameters (e.g., speed). In various implementations, a gearbox according to the principles of the present disclosure may accommodate gear systems having linear adjustment speeds ranging from 17 mm/s to 90 mm/s. In one implementation, a comfort speed system may be configured to have an average linear adjusting speed ranging from 17 to 22 mm/s. The comfort speed system may have a maximum electrical motor rotational speed of about 5,500 rpm. The comfort speed system may have a gear ratio of at least 6.5:1 (e.g., 8.5, 7.5, or 6.5). In another implementation, a high speed system may be configured to have an average linear adjustment speed ranging from 55 mm/s to 60 mm/s. The high speed system may have a maximum electrical motor rotational speed of about 5,500 rpm. The high speed system may have a gear ratio of at least 3.2 (e.g., 3.2, 3.25, 3.333, 3.667, 4.333, 4.667, 5.333, or 5.667). In yet another implementation, an ultra-high speed system may be configured to have an average linear adjustment speed ranging from 85 mm/s to 90 mm/s, for example. The ultra-high speed system may have a maximum electrical motor rotational speed of about 5,500 rpm. The ultra-high speed system may have a gear ratio of at least 2.2 (e.g., 2.2, 2.4, 2.6, 2.75, 2.8, or 2.833).

The open architecture power seat length adjuster systems of the present disclosure utilize advantageous combinations of electrical motor rotational velocity and gear ratios, which allow the position of the vehicle seat to be adjusted at desirable linear velocities. Furthermore, utilizing a motor with a maximum rotational velocity of 5,500 rpm will reduce the overall noise of the system and permit implementation of motor sensorless positioning (SLP) function which requires measurement of motor ripple current amplitude.

A universal gearbox according to the principles of the present disclosure may accommodate any combination of the above gear types, strengths, and speeds. That is, two sizes of a single gearbox design may be provided in an assembly setting for subsequently accommodating any combination of the above options. Example implementations are described below.

Referring to FIGS. 15A-15D, an adjustment assembly 24*h* according to the principles of the present disclosure is provided. The structure and function of the adjustment assembly 24*h* may be substantially similar to that of the adjustment assembly 24 (FIGS. 1-3), apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "h") are used to identify those features that have been modified.

The adjustment assembly 24*h* includes a spindle screw or lead screw 56*h* having outer threads 66*h* and an adjustment subassembly 58h. The adjustment subassembly 58h includes a first gear or cylindrical worm 80h having helical outer threads 82h, a second gear or enveloping worm 86h having external teeth 84h and internal thread 90h, a pair of bearing bushings 78, and a gearbox assembly 1200. The gearbox assembly 1200 includes a gearbox 400a and a plurality of fasteners 1202. The gearbox 400a includes first and second portions 402a, 404a. While not shown, the adjustment subassembly 58h may further include a support frame (e.g., support frame 74 of FIGS. 1-3) and a pair of cover shells (e.g., first and second cover shells 116, 118 of FIGS. 1-3). The adjustment assembly 24h may alternatively include any of the other gearbox assemblies described herein.

The threads 66h of the spindle screw 56h may be trapezoidal and defined by Tr 9×3 (P1.5) (9 mm nominal diameter, 3 mm lead, and 1.5 mm pitch). The adjustment assembly 24h may have a minimum axial strength of 25 kN and be considered an enhanced-strength adjustment assembly. The second gear 86h may be a single enveloping worm gear. Therefore, the adjustment assembly 24h may be considered to have a cross-axis single enveloping gear system. The adjustment assembly 24h may be configured to be a comfort speed system via gear ratio and motor parameters.

Alternatively, the threads 66h of the spindle screw 56h may be trapezoidal and defined by Tr 8×3 (P1.5) (8 mm nominal diameter, 3 mm lead, and 1.5 mm pitch), and the adjustment assembly 24h may have a minimum axial strength of 19 kN. In another alternative, the threads 66h of the spindle screw 56h may be trapezoidal and defined by Tr 11×4 (P2) (11 mm nominal diameter, 4 mm lead, and 2 mm pitch), and the adjustment assembly 24h may have a minimum axial strength of 37 kN. In yet another alternative, the threads 66h of the spindle screw 56h may be trapezoidal and defined by Tr 12×4 (P2) (12 mm nominal diameter, 4 mm lead, and 2 mm pitch), and the adjustment assembly 24h may have a minimum axial strength of 45 kN.

With reference to FIGS. 16A-16E, an adjustment assembly 24i according to the principles of the present disclosure is provided. The structure and function of the adjustment assembly 24i may be substantially similar to that of the adjustment assembly 24 (FIGS. 1-3), apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "i") are used to identify those features that have been modified.

The adjustment assembly 24i includes a spindle screw or lead screw 56h having outer threads 66h and an adjustment subassembly 58i. The adjustment subassembly 58i includes a first gear or cylindrical worm 80i having helical outer threads 8i2, a second or helical gear 86i having external teeth 84i and internal thread 90i, a pair of bearing bushings 78, a pair of washers 1600, a gearbox assembly 1200, a pair of cover shells 116, 118, and a support frame 74. The gearbox assembly 1200 includes a gearbox 400a and a plurality of fasteners 1202. The gearbox 400a includes first and second portions 402a, 404a. the adjustment assembly 24i may alternatively include any of the other gearbox assemblies described herein.

The helical gear 86i includes two cylindrical bearing surfaces 162i. The external teeth 84i extend in a space between the bearing surfaces 162i. Each washer 1600 is disposed on a respective one of the bearing surfaces 1602 between the external teeth 84i and a respective one of the bearing bushings 78. Each washer 1600 includes a retention feature, such as a tab 1604, that engages the helical gear 86. The tab 1604 may reduce or prevent rotation of the washer 1600 with respect to the helical gear 86i.

The adjustment assembly 24i includes the spindle screw 56h having the threads 66h defined by Tr 9×3 (P1.5) (9 mm nominal diameter, 3 mm lead, and 1.5 mm pitch). The adjustment assembly 24i may have a minimum axial strength of 25 kN and be considered an enhanced-strength adjustment assembly. The second gear 86i may be a helical gear. Therefore, the adjustment assembly 24i may be considered to have a cross-axis helical gear system. The adjustment assembly 24i may be configured to be a comfort speed system via gear ratios and motor parameters.

Alternatively, the threads 66h of the spindle screw 56h may be trapezoidal and defined by Tr 8×3 (P1.5) (8 mm nominal diameter, 3 mm lead, and 1.5 mm pitch), and the adjustment assembly 24i may have a minimum axial strength of 19 kN. In another alternative, the threads 66h of the spindle screw 56h may be trapezoidal and defined by Tr 11×4 (P2) (11 mm nominal diameter, 4 mm lead, and 2 mm pitch), and the adjustment assembly 24i may have a minimum axial strength of 37 kN. In yet another alternative, the threads 66h of the spindle screw 56h may be trapezoidal and defined by Tr 12×4 (P2) (12 mm nominal diameter, 4 mm lead, and 2 mm pitch), and the adjustment assembly 24i may have a minimum axial strength of 45 kN.

Referring to FIGS. 17A-17D, an adjustment assembly 24j according to the principles of the present disclosure is provided. The structure and function of the adjustment assembly 24j may be substantially similar to that of the adjustment assembly 24 (FIGS. 1-3), apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "j") are used to identify those features that have been modified.

The adjustment assembly 24j includes a spindle screw or lead screw 56j having outer threads 66j and an adjustment subassembly 58j. The adjustment subassembly 58j includes a first gear or cylindrical worm 80j having helical outer threads 82j, a second gear or enveloping worm 86j having external teeth 84j and internal thread 90j, a pair of bearing bushings 78, and a gearbox assembly 1200. The gearbox assembly 1200 includes a gearbox 400a and a plurality of fasteners 1202. The gearbox 400a includes first and second portions 402a, 404a. The adjustment assembly 24j may alternatively include any of the other gearbox assemblies described herein. While not shown, the adjustment subassembly 58j may further include a support frame (e.g., support frame 74 of FIGS. 1-3) and a pair of cover shells (e.g., first and second cover shells 116, 118 of FIGS. 1-3).

The threads 66j of the spindle screw 56j may be trapezoidal and defined by Tr 8×3 (P1.5) (8 mm nominal diameter, 3 mm lead, and 1.5 mm pitch). The adjustment assembly 24j may have a minimum axial strength of 19 kN and be considered a normal-strength adjustment assembly. The second gear 86j may be a single enveloping worm gear. Therefore, the adjustment assembly 24j may be considered to have cross-axis single enveloping orthogonal gear system. The adjustment assembly 24j may be configured to be a high speed system via gear ratios and motor speed.

Alternatively, the threads 66j of the spindle screw 56j may be trapezoidal and defined by Tr 9×3 (P1.5) (9 mm nominal diameter, 3 mm lead, and 1.5 mm pitch), and the adjustment assembly 24j may have a minimum axial strength of 25 kN.

In another alternative, the threads 66*j* of the spindle screw 56*j* may be trapezoidal and defined by Tr 11×4 (P2) (11 mm nominal diameter, 4 mm lead, and 2 mm pitch), and the adjustment assembly 24*j* may have a minimum axial strength of 37 kN. In yet another alternative, the threads 66*j* of the spindle screw 56*j* may be trapezoidal and defined by Tr 12×4 (P2) (12 mm nominal diameter, 4 mm lead, and 2 mm pitch), and the adjustment assembly 24*j* may have a minimum axial strength of 45 kN.

Referring to FIGS. 18A-18D, an adjustment assembly 24*k* according to the principles of the present disclosure is provided. The structure and function of the adjustment assembly 24*k* may be substantially similar to that of the adjustment assembly 24 (FIGS. 1-3), apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "k") are used to identify those features that have been modified.

The adjustment assembly 24*k* includes a spindle screw or lead screw 56*j* having outer threads 66*j* and an adjustment subassembly 58*k*. The adjustment subassembly 58*k* includes a first gear or cylindrical worm 80*k* having helical outer threads 82*k*, a second gear or enveloping worm 86*k* having external teeth 84*j* and internal thread 90*k*, a pair of bearing bushings 78, a pair of washers 1600, and a gearbox assembly 1200. The gearbox assembly 1200 includes a gearbox 400*a* and a plurality of fasteners 1202. The gearbox 400*a* includes first and second portions 402*a*, 404*a*. The adjustment assembly 24*k* may alternatively include any of the other gearbox assemblies described here. While not shown, the adjustment subassembly 58*k* may further include a support frame (e.g., support frame 74 of FIGS. 1-3) a pair of cover shells (e.g., first and second cover shells 116, 118 of FIGS. 1-3).

The threads 66*j* of the spindle screw 56*j* may be trapezoidal and defined by Tr 8×3 (P1.5) (8 mm nominal diameter, 3 mm lead, and 1.5 mm pitch). The adjustment assembly 24*k* may have a minimum axial strength of 19 kN and be considered a normal-strength adjustment assembly. The second gear 86*k* may be a single enveloping worm gear. Therefore, the adjustment assembly 24*k* may be considered to have a cross-axis single enveloping gear system. The adjustment assembly 24*k* may be configured to be a high speed system.

Alternatively, the threads 66*j* of the spindle screw 56*j* may be trapezoidal and defined by Tr 9×3 (P1.5) (9 mm nominal diameter, 3 mm lead, and 1.5 mm pitch), and the adjustment assembly 24*k* may have a minimum axial strength of 25 kN. In another alternative, the threads 66*j* of the spindle screw 56*j* may be trapezoidal and defined by Tr 11×4 (P2) (11 mm nominal diameter, 4 mm lead, and 2 mm pitch), and the adjustment assembly 24*k* may have a minimum axial strength of 37 kN. In yet another alternative, the threads 66*j* of the spindle screw 56*j* may be trapezoidal and defined by Tr 12×4 (P2) (12 mm nominal diameter, 4 mm lead, and 2 mm pitch), and the adjustment assembly 24*k* may have a minimum axial strength of 45 kN.

With reference to FIGS. 19A-19D, an adjustment assembly 24*m* according to the principles of the present disclosure is provided. The structure and function of the adjustment assembly 24*m* may be substantially similar to that of the adjustment assembly 24 (FIGS. 1-3), apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "m") are used to identify those features that have been modified.

The adjustment assembly 24*m* includes a spindle screw or lead screw 56*j* having outer threads 66*j* and an adjustment subassembly 58*m*. The adjustment subassembly 58*m* includes a first gear or cylindrical worm 80*m* having helical outer threads 82*m*, a second gear or enveloping worm 86*m* having external teeth 84*m* and internal thread 90*m*, a pair of bearing bushings 78, a pair of washers 1600, and a gearbox assembly 1200. The gearbox assembly 1200 includes a gearbox 400*a* and a plurality of fasteners 1202. The gearbox 400*a* includes first and second portions 402*a*, 404*a*. The adjustment assembly 24*m* may alternatively include any of the other gearbox assemblies described here. While not shown, the adjustment subassembly 58*m* may further include a support frame (e.g., support frame 74 of FIGS. 1-3) a pair of cover shells (e.g., first and second cover shells 116, 118 of FIGS. 1-3).

The threads 66*j* of the spindle screw 56*j* may be trapezoidal and defined by Tr 8×3 (P1.5) (8 mm nominal diameter, 3 mm lead, and 1.5 mm pitch). The adjustment assembly 24*j* may have a minimum axial strength of 19 kN and be considered a normal-strength adjustment assembly. The second gear 86*m* may be an enveloping worm gear. Therefore, the adjustment assembly 24*k* may be considered to have an enveloping orthogonal gear system. The adjustment assembly 24*m* may be configured to be an ultra-high speed system.

Alternatively, the threads 66*j* of the spindle screw 56*j* may be trapezoidal and defined by Tr 9×3 (P1.5) (9 mm nominal diameter, 3 mm lead, and 1.5 mm pitch), and the adjustment assembly 24*m* may have a minimum axial strength of 25 kN. In another alternative, the threads 66*j* of the spindle screw 56*j* may be trapezoidal and defined by Tr 11×4 (P2) (11 mm nominal diameter, 4 mm lead, and 2 mm pitch), and the adjustment assembly 24*m* may have a minimum axial strength of 37 kN. In yet another alternative, the threads 66*j* of the spindle screw 56*j* may be trapezoidal and defined by Tr 12×4 (P2) (12 mm nominal diameter, 4 mm lead, and 2 mm pitch), and the adjustment assembly 24*m* may have a minimum axial strength of 45 kN.

With reference to FIGS. 20A-20D, an adjustment assembly 24*n* according to the principles of the present disclosure is provided. The structure and function of the adjustment assembly 24*n* may be substantially similar to that of the adjustment assembly 24 (FIGS. 1-3), apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "n") are used to identify those features that have been modified.

The adjustment assembly 24*n* includes a spindle screw or lead screw 56*j* having outer threads 66*j* and an adjustment subassembly 58*n*. The adjustment subassembly 58*n* includes a first gear or cylindrical worm 80*n* having helical outer threads 82*n*, a second gear or enveloping worm 86*n* having external teeth 84*n* and internal thread 90*n*, a pair of bearing bushings 78, a pair of washers 1600, and a gearbox assembly 1200*n*. The gearbox assembly 1200*n* may be a close-type gearbox and may include the gearbox 400 (described above with reference to FIGS. 4A-4E) and fasteners 1202. As described above, the gearbox 400 includes first and second portions 402, 404. The adjustment assembly 24*n* may alternatively include any of the other gearbox assemblies described here. While not shown, the adjustment subassembly 58n may further include a support frame (e.g., support frame 74 of FIGS. 1-3) and a pair of cover shells (e.g., first and second cover shells 116, 118 of FIGS. 1-3).

The threads 66j of the spindle screw 56j may be trapezoidal and defined by Tr 11×4 (P2) (11 mm nominal diameter, 4 mm lead, and 2 mm pitch). The adjustment assembly 24n may have a minimum axial strength of 37 kN and be considered a high-strength adjustment assembly. The second gear 86n may be an enveloping worm gear. Therefore, the adjustment assembly 24n may be considered to have an enveloping orthogonal gear system. The adjustment assembly 24n may be configured to be an ultra-high speed system.

With reference to FIGS. 21A-21D, an adjustment assembly 24p according to the principles of the present disclosure is provided. The structure and function of the adjustment assembly 24p may be substantially similar to that of the adjustment assembly 24 (FIGS. 1-3), apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "p") are used to identify those features that have been modified.

The adjustment assembly 24p includes a spindle screw or lead screw 56j having outer threads 66j and an adjustment subassembly 58p. The adjustment subassembly 58p includes a first gear or cylindrical worm 80p having helical outer threads 82p, a second gear or enveloping worm 86p having external teeth 84p and internal thread 90p, a pair of bearing bushings 78, a pair of washers 1600, and a gearbox assembly 1200p. The gearbox assembly 1200p may be a close-type gearbox and may include the gearbox 400 (described above with reference to FIGS. 4A-4E) and fasteners 1202. As described above, the gearbox 400 includes first and second portions 402, 404. The adjustment assembly 24p may alternatively include any of the other gearbox assemblies described here. While not shown, the adjustment subassembly 58p may further include a support frame (e.g., support frame 74 of FIGS. 1-3) a pair of cover shells (e.g., first and second cover shells 116, 118 of FIGS. 1-3).

The threads 66j of the spindle screw 56j may be trapezoidal and defined by Tr 12×4 (P2) (12 mm nominal diameter, 4 mm lead, and 2 mm pitch). The adjustment assembly 24p may have a minimum axial strength of 45 kN and be considered an ultra-high strength adjustment assembly. The second gear 86p may be an enveloping worm gear. Therefore, the adjustment assembly 24p may be considered to have an enveloping orthogonal gear system. The adjustment assembly 24p may be configured to be an ultra-high speed system.

FIG. 22 illustrates an open architecture of power seat length adjustment assembly 210 that can be incorporated into the seat assembly 10 of FIG. 1 (instead of the assemblies 24) and has nine different worm-worm gear drives 280a-i/282a-i that can be swapped in and out of housing assembly 276 (similar or identical to housing assembly 76 including any of the gearboxes described herein) for one another to pair different combinations of gears. For comfort speed (e.g., where the housing assembly 276, worm and worm gears move linearly along a length of the spindle screw at a velocity of 17-22 millimeters per second), an electric motor having its maximum rotational speed limited to a maximum of 5,500 rpm can be used when paired worm-worm gear drives 280a-c/282a-c with gear ratios of 6.5, 7.5, or 8.5, respectively. For high speed easy-entry function (e.g., where the housing assembly 276, worm and helical gears move linearly along a length of the spindle screw at a velocity of 55-60 millimeters per second), an electric motor having its rotational speed limited to a maximum of 5,500 rpm can be used when paired worm-worm gear drives 280d-i/282d-i with gear ratios of 5.667, 5.333, 4.667, 4.333, 3.667, and 3.333, respectively. As such, a single housing assembly 276 and seat structure, having the same architecture and dimensions, can be used for achieving the whole range of maximum comfort (normal) and high longitudinal adjustment speeds, with vibrations and noise in operation within required limits.

FIG. 23 illustrates another open architecture of power seat length adjuster assembly 310 that can be incorporated into the seat assembly 10 of FIG. 1 (instead of the assemblies 24) and has nine different worm-helical gear drives 380a-i/382a-i that can be swapped in and out of a housing assembly 376 (similar or identical to housing assembly 76, 276 including any of the gearboxes described herein) for one another to pair different combinations of gears. For high speed (e.g., where the housing assembly 376, worm and helical gears move linearly along a length of the spindle screw at a velocity of 55-60 millimeters per second), an electric motor having its maximum (e.g., "no-torque") rotational speed of 5,500 rpm can be used when paired worm-helical gear drives 380a-c/382a-c with gear ratios of 3.333 (e.g., the worm 380a may have 3 starts and the helical gear 382a may have 10 teeth), 3.250 (e.g., the worm 380b may have 4 starts and the helical gear 382b may have 13 teeth), 3.200 (e.g., the worm 380c may have 5 starts and the helical gear 382c may have 16 teeth), respectively. For ultra-high speed (e.g., where the housing assembly 376, worm and helical gears move linearly along a length of the spindle screw at a velocity of 85-90 millimeters per second), an electric motor having its maximum rotational speed of 5,500 rpm can be used when paired worm-helical gear drives 380d-i/382d-i with gear ratios of 2.833 (e.g., the worm 380d may have 6 starts and the helical gear 382d may have 17 teeth), 2.800 (e.g., the worm 380e may have 5 starts and the helical gear 382e may have 14 teeth), 2.750 (e.g., the worm 380f may have 4 starts and the helical gear 382f may have 11 teeth), 2.600 (e.g., the worm 380g may have 5 starts and the helical gear 382g may have 13 teeth), 2.400 (e.g., the worm 380h may have 12 teeth and the helical gear 382h may have 5 teeth), 2.200 (e.g., the worm 380i may have 5 starts and the helical gear 382i may have 11 teeth), respectively. As such, a single housing assembly 376 and seat structure, having the same architecture and dimensions, can be used for achieving the whole range of high speed and ultra-high speed longitudinal adjustment speeds, with vibrations and noise in operation within required limits. The gear ratios listed above allow for the use of a motor with relatively low rotational velocity (e.g., maximum of 5,500 rpm) while still providing the desired speed ranges and while reducing noise and improving quality.

The open architecture power seat length adjuster systems of the present disclosure utilize advantageous combinations of electrical motor rotational velocity and gear ratios, which allow the position of the vehicle seat to be adjusted at desirable linear velocities. Furthermore, utilizing a motor with a maximum rotational velocity of 5,500 rpm will reduce the overall noise of the system and permit implementation of motor sensorless positioning (SLP) function which requires measurement of motor ripple current amplitude.

In accordance with the principles of the present disclosure, a power length adjustment assembly may include a gearbox assembly, a gear system, and a spindle screw. The gearbox assembly may include a gearbox and a plurality of fasteners. The gearbox may be an open-type gearbox or a close-type gearbox. The gearbox may include two parts or portions having mating surfaces with three-dimensional curvature, such as ellipsoidal, conical, or spherical. The fasteners may include screws (e.g., self-tapping screws), rivets (e.g., discrete rivets, integral rivets), bolts, or any combination thereof. The gear system may be an enveloping orthogonal gear system or a helical orthogonal gear system. The gear system may be configured to be a comfort speed system, a high speed system, or a ultra-high speed system. The spindle screw may be a normal-strength lead screw or an enhanced-strength lead screw.

It will be appreciated that any of the assemblies of FIGS. 15A-19D, 22, and 23 may include the close-type gearbox 400 rather than the open-type gearboxes shown in FIGS. 15A-19D, 22, and 23. Furthermore, any of the assemblies of FIGS. 20A-21D may include the open-type gearbox, rather than the close-type gearbox shown.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle seat adjustment mechanism comprising:
a gearbox;
a first gear received in the gearbox and rotatable relative to the gearbox about a first axis;
a second gear received in the gearbox and rotatable relative to the gearbox about a second axis that is perpendicular to the first axis, wherein the first and second gears are meshingly engaged with each other; and
a spindle screw meshingly engaged with the second gear and extending through the second gear along the second axis,
wherein the spindle screw is selected from the group consisting of:
a first spindle screw having trapezoidal threads and defined by Tr 8×3 (P1.5) (8 mm nominal diameter, 3 mm lead, and 1.5 mm pitch),
a second spindle screw having trapezoidal threads and defined by Tr 9×3 (P1.5) (9 mm nominal diameter, 3 mm lead, and 1.5 mm pitch),
a third spindle screw having trapezoidal threads and defined by Tr 11×4 (P2) (11 mm nominal diameter, 4 mm lead, and 2 mm pitch), and
a fourth spindle screw having trapezoidal threads and defined by Tr 12×4 (P2) (12 mm nominal diameter, 4 mm lead, and 2 mm pitch).

2. The vehicle seat adjustment mechanism of claim 1, further comprising a motor driving the first gear, wherein the motor has a maximum rotational velocity of 5,500 revolutions per minute.

3. The vehicle seat adjustment mechanism of claim 2, wherein the gearbox, the first gear, and the second gear are configured to move along the second axis at one of:
(i) a comfort speed having a linear adjusting speed ranging from 17 mm/s to 22 mm/s,
(ii) a high speed having a linear adjusting speed ranging from 55 mm/s to 60 mm/s, or
(iii) a ultra-high speed having a linear adjusting speed ranging from 85 mm/s to 90 mm/s.

4. The vehicle seat adjustment mechanism of claim 3, wherein the first gear is a cylindrical worm gear and the second gear is one of a helical gear or a single enveloping worm gear.

5. The vehicle seat adjustment mechanism of claim 4, wherein a gear ratio of the first gear to the second gear is selected from the group consisting of: 3.333, 3.25, 3.2, 2.833, 2.8, 2.75, 2.6, 2.4, and 2.2.

6. The vehicle seat adjustment mechanism of claim 4, wherein a gear ratio of the first gear to the second gear is selected from the group consisting of: 8.5, 7.5, 6.5, 5.667, 5.333, 4.667, 4.333, 3.667, and 3.333.

7. A seat track assembly comprising the vehicle seat adjustment mechanism of claim 1, and further comprising a lower seat track and an upper seat track that is configured to engage the lower seat track and slide along a length of the lower seat track, wherein the gearbox is configured to be mounted to the upper seat track.

8. The vehicle seat adjustment mechanism of claim 1, wherein the gearbox includes:
a first portion including a first body, the first body defining a first longitudinal recess and a first peripheral recess in fluid communication with the first longitudinal recess; and
a second portion including a second body, the second body define a second longitudinal recess and a second peripheral recess in fluid communication with the second longitudinal recess.

9. The vehicle seat adjustment mechanism of claim 8, wherein:
the first body includes a first curved surface that is concave,
the second body includes a second curved surface, the second curved surface being convex and having an equal and opposite curvature compared to the first curved surface, and
in an assembled configuration:
the first curved surface is in contact with the second curved surface,
the first longitudinal recess communicates with the second longitudinal recess to define a longitudinal passage, and
the first peripheral recess communicates with the second peripheral recess to define a peripheral receptacle.

10. The vehicle seat adjustment mechanism of claim 9, wherein the first curved surface and the second curved surface both define (i) a portion of an ellipsoidal surface, (ii) a portion of a conical surface, or (iii) a portion of a spherical surface.

11. The vehicle seat adjustment mechanism of claim 10, wherein:
one of the first portion and the second portion includes a frusto-conical projection extending from a respective one of the first curved surface and the second curved surface,
the other of the first portion and the second portion includes a frusto-conical receptacle defined by a respective one of the first curved surface and the second curved surface, and
in the assembled configuration, the frusto-conical receptacle receives the frusto-conical projection.

12. The vehicle seat adjustment mechanism of claim 11, wherein:

the one of the first portion and the second portion further includes an annular projection extending from the respective one of the first curved surface and the second curved surface, the annular projection being disposed around a base of the frusto-conical projection and coaxial with the frusto-conical projection, the other of the first portion and the second portion further includes an annular depression defined by a respective one of the first curved surface and the second curved surface, the annular depression coaxial with the frusto-conical receptacle, and in the assembled configuration, the annular depression receives the annular projection.

13. The vehicle seat adjustment mechanism of claim 12, wherein the frusto-conical projection includes a first frusto-conical projection and a second frusto-conical projection, the frusto-conical receptacle includes a first frusto-conical receptacle and a second frusto-conical receptacle, the annular projection includes a first annular projection and a second annular projection, and the annular depression includes a first annular depression and a second annular depression.

14. The vehicle seat adjustment mechanism of claim 9, further comprising an elastic layer disposed on at least one of the first curved surface or the second curved surface.

15. The vehicle seat adjustment mechanism of claim 9, wherein:

one of the first portion and the second portion includes an integral rivet extending from a respective one of the first curved surface and the second curved surface, and the other one of the first portion and the second portion includes an aperture defined in a respective one of the first curved surface and the second curved surface, the aperture being configured to receive a portion of the integral rivet.

16. The vehicle seat adjustment mechanism of claim 1, wherein the spindle screw is the first spindle screw and has a minimum axial strength of 19 kN.

17. The vehicle seat adjustment mechanism of claim 1, wherein the spindle screw is the second spindle screw and has a minimum axial strength of 25 kN.

18. The vehicle seat adjustment mechanism of claim 1, wherein the spindle screw is the third spindle screw and has a minimum axial strength of 37 kN.

19. The vehicle seat adjustment mechanism of claim 1, wherein the spindle screw is the fourth spindle screw and has a minimum axial strength of 45 kN.

20. A vehicle seat adjustment mechanism comprising:

a gearbox;

a first gear received in the gearbox and rotatable relative to the gearbox about a first axis;

a second gear received in the gearbox and rotatable relative to the gearbox about a second axis that is perpendicular to the first axis, wherein the first and second gears are meshingly engaged with each other;

a motor driving the first gear, wherein the motor has a maximum rotational velocity of 5,500 revolutions per minute; and a spindle screw meshingly engaged with the second gear and extending through the second gear along the second axis, wherein the spindle screw is selected from the group consisting of:

a first spindle screw having trapezoidal threads and defined by Tr 8×3 (P1.5) (8 mm nominal diameter, 3 mm lead, and 1.5 mm pitch), a second spindle screw having trapezoidal threads and defined by Tr 9×3 (P1.5) (9 mm nominal diameter, 3 mm lead, and 1.5 mm pitch), a third spindle screw having trapezoidal threads and defined by Tr 11×4 (P2) (11 mm nominal diameter, 4 mm lead, and 2 mm pitch), and a fourth spindle screw having trapezoidal threads and defined by Tr 12×4 (P2) (12 mm nominal diameter, 4 mm lead, and 2 mm pitch), wherein the gearbox includes:

a first portion including a first body, the first body defining a first longitudinal recess and a first peripheral recess in fluid communication with the first longitudinal recess; and a second portion including a second body, the second body define a second longitudinal recess and a second peripheral recess in fluid communication with the second longitudinal recess, wherein the first body includes a first curved surface that is concave, wherein the second body includes a second curved surface, the second curved surface being convex and having an equal and opposite curvature compared to the first curved surface, and wherein in an assembled configuration:

the first curved surface is in contact with the second curved surface, the first longitudinal recess communicates with the second longitudinal recess to define a longitudinal passage, and the first peripheral recess communicates with the second peripheral recess to define a peripheral receptacle.

* * * * *